(12) United States Patent
Wang et al.

(10) Patent No.: US 12,206,609 B2
(45) Date of Patent: Jan. 21, 2025

(54) PHASE-TRACKING REFERENCE SIGNAL CONFIGURATION IN SIDELINK

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 390 days.

(21) Appl. No.: 17/476,230

(22) Filed: Sep. 15, 2021

(65) Prior Publication Data

US 2022/0094499 A1    Mar. 24, 2022

Related U.S. Application Data

(60) Provisional application No. 63/080,612, filed on Sep. 18, 2020.

(51) Int. Cl.
| | |
|---|---|
| *H04W 76/14* | (2018.01) |
| *H04B 7/06* | (2006.01) |
| *H04L 5/00* | (2006.01) |
| *H04W 24/10* | (2009.01) |

(52) U.S. Cl.
CPC ......... *H04L 5/0048* (2013.01); *H04B 7/0626* (2013.01); *H04W 24/10* (2013.01); *H04W 76/14* (2018.02)

(58) Field of Classification Search
CPC .... H04B 7/0626; H04W 24/10; H04W 76/14; H04W 92/18
See application file for complete search history.

(56) References Cited

U.S. PATENT DOCUMENTS

| | | | | |
|---|---|---|---|---|
| 11,211,990 | B2* | 12/2021 | Yi | H04L 5/0053 |
| 2019/0296876 | A1* | 9/2019 | Zhang | H04L 5/0048 |
| 2020/0022089 | A1* | 1/2020 | Guo | H04L 1/0026 |
| 2020/0186208 | A1* | 6/2020 | Molés Cases | H04B 7/0456 |
| 2020/0351136 | A1* | 11/2020 | Hwang | H04L 27/26025 |
| 2020/0359247 | A1* | 11/2020 | Yi | H04W 80/02 |
| 2021/0099265 | A1 | 4/2021 | Shin et al. | |
| 2021/0175937 | A1* | 6/2021 | Yamada | H04W 16/28 |
| 2021/0219268 | A1* | 7/2021 | Li | H04B 17/318 |
| 2022/0045893 | A1* | 2/2022 | Yamada | H04L 1/1896 |
| 2022/0132516 | A1* | 4/2022 | Hwang | H04W 72/563 |

(Continued)

OTHER PUBLICATIONS

International Search Report and Written Opinion—PCT/US2021/050714—ISA/EPO—Dec. 23, 2021.

(Continued)

*Primary Examiner* — Fahmida S Chowdhury
(74) *Attorney, Agent, or Firm* — Loza & Loza, LLP/QUALCOMM Incorporated

(57) ABSTRACT

Aspects relate to configuration of phase-tracking reference signals (PT-RSs) in sidelink networks. A sidelink PT-RS configuration for a transmitting wireless communication device may be configured based on a sidelink channel state information (CSI) report received from a receiving wireless communication device. The transmitting wireless communication device may further transmit the sidelink PT-RS configuration to the receiving wireless communication device.

56 Claims, 20 Drawing Sheets

(56) References Cited

U.S. PATENT DOCUMENTS

2022/0167313 A1* 5/2022 Zhou ................. H04W 72/0453
2022/0279451 A1* 9/2022 Yoshioka ............ H04W 52/383
2022/0302981 A1* 9/2022 Liu ...................... H04L 5/0051
2022/0417867 A1* 12/2022 Yoshioka .......... H04W 72/1263

OTHER PUBLICATIONS

3GPP: "3rd Generation Partnership Project, Technical Specification Group Radio Access Network, NR, Multiplexing and Channel Coding (Release 15)", TS 38.212, V15.9.0, Section 7.3.1.2, Jun. 2020, 16 Pages.

3GPP: "3rd Generation Partnership Project, Technical Specification Group Radio Access Network; NR; Physical Layer Procedures for Data (Release 15)", TS 38.214, V15.10.0, Jun. 2020, Section 6.2.3, 8 Pages.

3GPP: "3rd Generation Partnership Project, Technical Specification Group Radio Access Network, NR, Radio Resource Control (RRC) Protocol Specification (Release 16)", TS 38.331 V16.1.0, Jul. 2020, Section 6.3.5, 72 Pages.

* cited by examiner

PHASE-TRACKING REFERENCE SIGNAL CONFIGURATION IN SIDELINK

CROSS-REFERENCE TO RELATED APPLICATIONS

The present application for patent claims priority to and the benefit of U.S. Provisional Application No. 63/080,612, filed Sep. 18, 2020, and assigned to the assignee hereof and hereby expressly incorporated by reference herein as if fully set forth below in its entirety and for all applicable purposes.

INTRODUCTION

The technology discussed below relates generally to wireless communication networks, and more particularly, to phase-tracking reference signal (PT-RS) design in wireless networks.

Wireless communication between devices may be facilitated by various network configurations. In one configuration, a cellular network may enable wireless communication devices (e.g., user equipment (UEs)) to communicate with one another through signaling with a nearby base station or cell. Another wireless communication network configuration is a device to device (D2D) network, in which wireless communication devices may signal one another directly, rather than via an intermediary base station or cell. For example, D2D communication networks may utilize sidelink signaling to facilitate the direct communication between wireless communication devices. In some sidelink network configurations, wireless communication devices may further communicate in a cellular network, generally under the control of a base station. Thus, the wireless communication devices may be configured for uplink and downlink signaling via a base station and further for sidelink signaling directly between the wireless communication devices without transmissions passing through the base station.

In 5G New Radio (NR) network configurations, including cellular network configurations and sidelink network configurations, higher millimeter wave (mmWave) frequency bands may be employed for communication between devices (e.g., between a base station and a UE or between UEs). However, devices operating on mmWave frequency bands may suffer from phase noise due to a mismatch in oscillator frequencies between transmitter and receiver local oscillators. Therefore, a phase-tracking reference signal (PT-RS) has been introduced in 5G NR to enable devices to estimate and compensate for the phase noise.

BRIEF SUMMARY

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a first wireless communication device configured for wireless communication is disclosed. The first wireless communication device includes a processor and a memory coupled to the processor. The processor and the memory can be configured to transmit a sidelink reference signal to a second wireless communication device, receive a sidelink channel state information report from the second wireless communication device in response to the sidelink reference signal, and transmit a sidelink phase-tracking reference signal (PT-RS) configuration to the second wireless communication device. The sidelink PT-RS configuration can be based on the sidelink channel state information report.

Another example provides a method of sidelink wireless communication at a first wireless communication device. The method includes transmitting a sidelink reference signal to a second wireless communication device, receiving a sidelink channel state information report from the second wireless communication device in response to the sidelink reference signal, and transmitting a sidelink phase-tracking reference signal (PT-RS) configuration to the second wireless communication device. The sidelink PT-RS configuration can be based on the sidelink channel state information report.

Another example provides a first wireless communication device configured for wireless communication. The first wireless communication device can include means for transmitting a sidelink reference signal to a second wireless communication device, means for receiving a sidelink channel state information report from the second wireless communication device in response to the sidelink reference signal, and means for transmitting a sidelink phase-tracking reference signal (PT-RS) configuration to the second wireless communication device. The sidelink PT-RS configuration can be based on the sidelink channel state information report.

Another example provides a non-transitory computer-readable medium having stored therein instructions executable by one or more processors of a first wireless communication device to transmit a sidelink reference signal to a second wireless communication device, receive a sidelink channel state information report from the second wireless communication device in response to the sidelink reference signal, and transmit a sidelink phase-tracking reference signal (PT-RS) configuration to the second wireless communication device. The sidelink PT-RS configuration can be based on the sidelink channel state information report.

Another example provides a radio access network (RAN) entity configured for wireless communication. The RAN entity includes a processor and a memory coupled to the processor. The processor and the memory can be configured to receive a sidelink channel state information report. The sidelink channel state information report can be associated with a sidelink between a first wireless communication device and a second wireless communication device. The processor and the memory can further be configured to transmit sidelink phase-tracking reference signal (PT-RS) configuration information to the first wireless communication device. The sidelink PT-RS configuration information can indicate a sidelink PT-RS configuration for the first wireless communication device. The sidelink PT-RS configuration information can be based on the sidelink channel state information report.

Another example provides a method of wireless communication at a radio access network (RAN) entity. The method includes receiving a sidelink channel state information report. The sidelink channel state information report can be associated with a sidelink between a first wireless communication device and a second wireless communication device. The method further includes transmitting sidelink phase-tracking reference signal (PT-RS) configuration information to the first wireless communication device. The sidelink PT-RS configuration information can indicate a sidelink PT-RS configuration for the first wireless communication device. The sidelink PT-RS configuration information can be based on the sidelink channel state information report.

Another example provides a radio access network (RAN) entity configured for wireless communication. The RAN entity includes means for receiving a sidelink channel state information report. The sidelink channel state information report can be associated with a sidelink between a first wireless communication device and a second wireless communication device. The RAN entity further includes means for transmitting sidelink phase-tracking reference signal (PT-RS) configuration information to the first wireless communication device. The sidelink PT-RS configuration information can indicate a sidelink PT-RS configuration for the first wireless communication device. The sidelink PT-RS configuration information can be based on the sidelink channel state information report.

Another example provides a non-transitory computer-readable medium having stored therein instructions executable by one or more processors of a radio access network (RAN) entity to receive a sidelink channel state information report. The sidelink channel state information report can be associated with a sidelink between a first wireless communication device and a second wireless communication device. The non-transitory computer-readable medium can further include instructions executable by the one or more processors of the RAN entity to transmit sidelink phase-tracking reference signal (PT-RS) configuration information to the first wireless communication device. The sidelink PT-RS configuration can indicate a sidelink PT-RS configuration for the first wireless communication device. The sidelink PT-RS configuration information can be based on the sidelink channel state information report.

Another example provides a second wireless communication device configured for wireless communication. The second wireless communication device includes a processor and a memory coupled to the processor. The processor and the memory can be configured to receive a sidelink reference signal from a first wireless communication device, transmit a sidelink channel state information report to the first wireless communication device generated based on the sidelink reference signal, and receive a sidelink phase-tracking reference signal (PT-RS) configuration from the first wireless communication device. The sidelink PT-RS configuration can be based on the sidelink channel state information report.

Another example provides a method of sidelink wireless communication at a second wireless communication device. The method includes receiving a sidelink reference signal from a first wireless communication device, transmitting a sidelink channel state information report to the first wireless communication device generated based on the sidelink reference signal, and receiving a sidelink phase-tracking reference signal (PT-RS) configuration from the first wireless communication device. The sidelink PT-RS configuration can be based on the sidelink channel state information report.

Another example provides a second wireless communication device configured for wireless communication. The second wireless communication device can include means for receiving a sidelink reference signal from a first wireless communication device, means for transmitting a sidelink channel state information report to the first wireless communication device generated based on the sidelink reference signal, and means for receiving a sidelink phase-tracking reference signal (PT-RS) configuration from the first wireless communication device. The sidelink PT-RS configuration can be based on the sidelink channel state information report.

Another example provides a non-transitory computer-readable medium having instructions therein executable by one or more processors of a second wireless communication device to receive a sidelink reference signal from a first wireless communication device, transmit a sidelink channel state information report to the first wireless communication device generated based on the sidelink reference signal, and receive a sidelink phase-tracking reference signal (PT-RS) configuration from the first wireless communication device. The sidelink PT-RS configuration can be based on the sidelink channel state information report.

In another example, a method of sidelink wireless communication at a first wireless communication device is disclosed. The method can include transmitting a sidelink reference signal to a second wireless communication device, receiving a sidelink channel state information report from the second wireless communication device in response to the sidelink reference signal, identifying a sidelink phase-tracking reference signal (PT-RS) configuration including at least an indication of a number of PT-RS ports based on the sidelink channel state information report, and transmitting the sidelink PT-RS configuration to the second wireless communication device.

Another example provides a first wireless communication device in a wireless communication network. The first wireless communication device includes a memory and a processor coupled to the memory. The processor and the memory can be configured to transmit a sidelink reference signal to a second wireless communication device, receive a sidelink channel state information report from the second wireless communication device in response to the sidelink reference signal, identify a sidelink phase-tracking reference signal (PT-RS) configuration including at least an indication of a number of PT-RS ports based on the sidelink channel state information report, and transmit the PT-RS configuration to the second wireless communication device.

Another example provides a first wireless communication device in a wireless communication network. The first wireless communication device can include means for transmitting a sidelink reference signal to a second wireless communication device, means for receiving a sidelink channel state information report from the second wireless communication device in response to the sidelink reference signal, means for identifying a sidelink phase-tracking reference signal (PT-RS) configuration including at least an indication of a number of PT-RS ports based on the sidelink channel state information report, and means for transmitting the PT-RS configuration to the second wireless communication device.

Another example provides a non-transitory computer-readable medium including code for causing one or more processors of a first wireless communication device to transmit a sidelink reference signal to a second wireless communication device, receive a sidelink channel state information report from the second wireless communication device in response to the sidelink reference signal, identify a sidelink phase-tracking reference signal (PT-RS) configuration including at least an indication of a number of PT-RS ports based on the sidelink channel state information report, and transmit the PT-RS configuration to the second wireless communication device.

In another example, a method of sidelink wireless communication at a first wireless communication device is disclosed. The method can include receiving a sidelink reference signal from a second wireless communication device, transmitting a sidelink channel state information report to the second wireless communication device generated based on the sidelink reference signal, and receiving a sidelink phase-tracking reference signal (PT-RS) configuration from the second wireless communication device. The sidelink PT-RS configuration can include at least an indication of a number of PT-RS ports configured based on the sidelink channel state information report.

Another example provides a first wireless communication device in a wireless communication network. The first wireless communication device includes a memory and a processor coupled to the memory. The processor and the memory can be configured to receive a sidelink reference signal from a second wireless communication device, transmit a sidelink channel state information report to the second wireless communication device generated based on the sidelink reference signal, and receive a sidelink phase-tracking reference signal (PT-RS) configuration from the second wireless communication device. The sidelink PT-RS configuration can include at least an indication of a number of PT-RS ports configured based on the sidelink channel state information report.

Another example provides a first wireless communication device in a wireless communication network. The first wireless communication device can include means for receiving a sidelink reference signal from a second wireless communication device, means for transmitting a sidelink channel state information report to the second wireless communication device generated based on the sidelink reference signal, and means for receiving a sidelink phase-tracking reference signal (PT-RS) configuration from the second wireless communication device. The sidelink PT-RS configuration can include at least an indication of a number of PT-RS ports configured based on the sidelink channel state information report.

Another example provides a non-transitory computer-readable medium including code for causing one or more processors of a first wireless communication device to receive a sidelink reference signal from a second wireless communication device, transmit a sidelink channel state information report to the second wireless communication device generated based on the sidelink reference signal, and receive a sidelink phase-tracking reference signal (PT-RS) configuration from the second wireless communication device. The sidelink PT-RS configuration can include at least an indication of a number of PT-RS ports configured based on the sidelink channel state information report.

In another example, a method of wireless communication at a radio access network (RAN) entity is disclosed. The method can include receiving a sidelink channel state information report associated with a sidelink between a first wireless communication device and a second wireless communication device and generating sidelink phase-tracking reference signal (PT-RS) configuration information indicating a sidelink PT-RS configuration for the first wireless communication device based on the sidelink channel state information report. The sidelink PT-RS configuration includes at least an indication of a number of PT-RS ports. The method can further include transmitting the sidelink PT-RS configuration information to the first wireless communication device.

Another example provides a radio access network (RAN) entity in a wireless communication network. The RAN entity includes a memory and a processor coupled to the memory. The processor and the memory can be configured to receive a sidelink channel state information report associated with a sidelink between a first wireless communication device and a second wireless communication device and generate sidelink phase-tracking reference signal (PT-RS) configuration information indicating a sidelink PT-RS configuration for the first wireless communication device based on the sidelink channel state information report. The sidelink PT-RS configuration includes at least an indication of a number of PT-RS ports. The processor and the memory can further be configured to transmit the sidelink PT-RS configuration information to the first wireless communication device.

Another example provides a radio access network (RAN) entity in a wireless communication network. The RAN entity can include means for receiving a sidelink channel state information report associated with a sidelink between a first wireless communication device and a second wireless communication device and means for generating sidelink phase-tracking reference signal (PT-RS) configuration information indicating a sidelink PT-RS configuration for the first wireless communication device based on the sidelink channel state information report. The sidelink PT-RS configuration includes at least an indication of a number of PT-RS ports. The RAN entity can further include means for transmitting the sidelink PT-RS configuration information to the first wireless communication device.

Another example provides a non-transitory computer-readable medium including code for causing one or more processors of a radio access network (RAN) entity to receive a sidelink channel state information report associated with a sidelink between a first wireless communication device and a second wireless communication device and generate sidelink phase-tracking reference signal (PT-RS) configuration information indicating a sidelink PT-RS configuration for the first wireless communication device based on the sidelink channel state information report. The sidelink PT-RS configuration includes at least an indication of a number of PT-RS ports. The non-transitory computer-readable medium can further include code for causing one or more processors of the RAN entity to transmit the sidelink PT-RS configuration information to the first wireless communication device.

These and other aspects will become more fully understood upon a review of the detailed description, which follows. Other aspects, features, and examples will become apparent to those of ordinary skill in the art, upon reviewing the following description of specific, exemplary aspects of in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects, such exemplary aspects can be implemented in various devices, systems, and methods.

DETAILED DESCRIPTION

Figure 1:
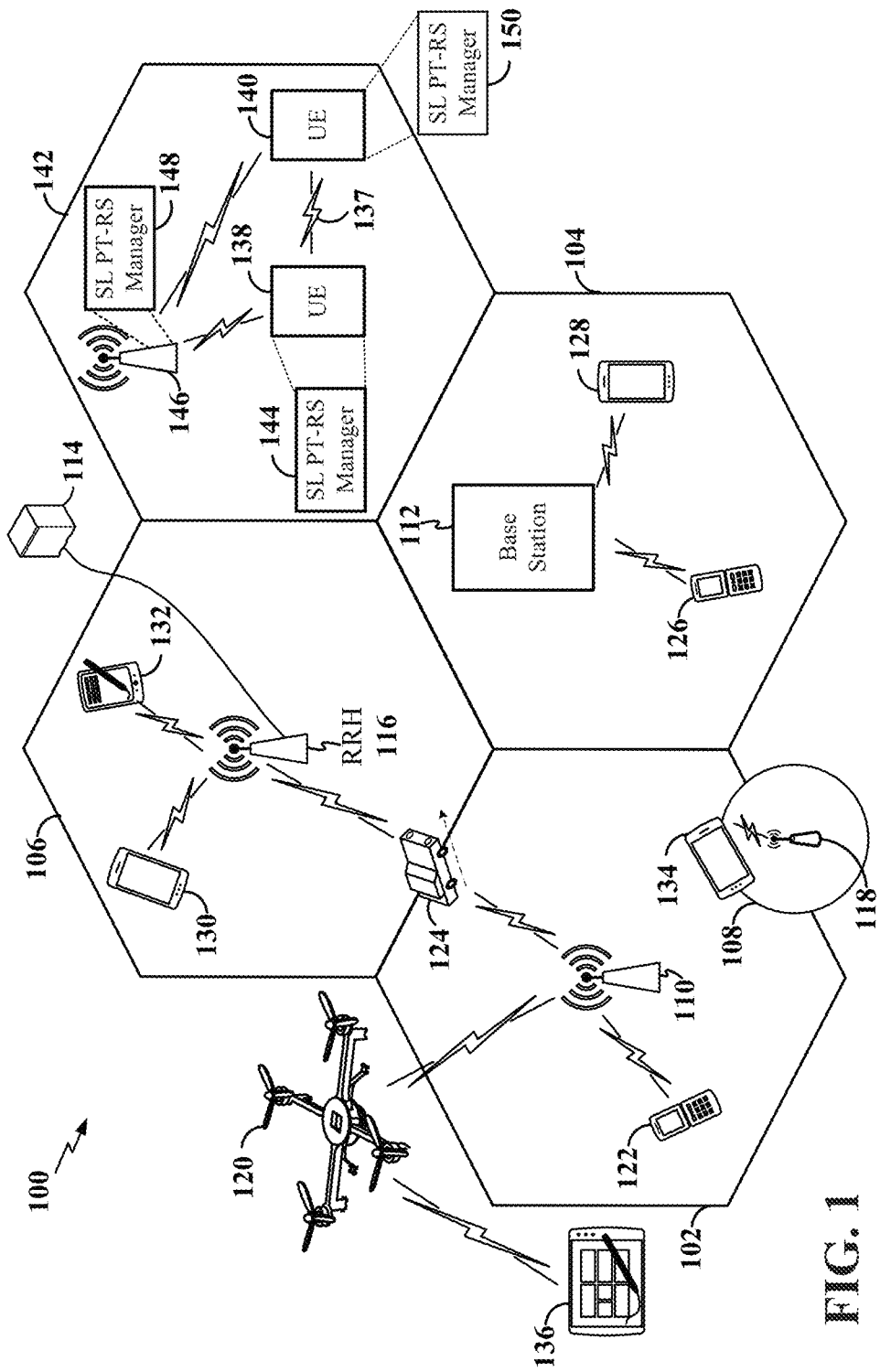
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

While aspects and features are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, aspects and/or uses may come about via integrated chip devices and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described aspects may occur. Implementations may range in spectrum from chip-level or modular components to non-modular, non-chip-level implementations and further to aggregate, distributed, or OEM devices or systems incorporating one or more aspects of the described aspects. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, disaggregated arrangements (e.g., base station and/or UE), end-user devices, etc. of varying sizes, shapes and constitution.

On the sidelink, a phase-tracking reference signal (PT-RS) may be transmitted between wireless communication devices to enable correction of phase noise errors that may occur, for example, while operating on mmWave frequency bands. A PT-RS configuration may be configured via radio resource control (RRC) signaling and may include PT-RS resource element (RE) information including the time density, frequency density, and RE offset, along with PT-RS port information including the number of PT-RS ports and the port association between the PT-RS ports and demodulation reference signal (DM-RS) ports on the sidelink. In some examples, the number of PT-RS ports may be fixed to be the same as the number of DM-RS ports and the port association between a PT-RS port and a corresponding DM-RS port may also fixed. For example, on the sidelink, the number of supported DM-RS ports may be two, and as such, the number of PT-RS ports may be fixed to two with a one-to-one mapping between the DM-RS ports and the PT-RS ports.

In various aspects of the disclosure, to support a variable number of DM-RS ports, including more than two DM-RS ports, with variable mapping between PT-RS ports and DM-RS ports on the sidelink, the number of PT-RS ports may be configurable. In addition, the PTRS-DMRS port association may further be configurable.

Various aspects of the disclosure relate to configuration of phase-tracking reference signals (PT-RSs) in sidelink networks. A sidelink PT-RS configuration may include a configurable number of PT-RS ports and/or a configurable port association between PT-RS ports and demodulation reference signal (DM-RS) ports. The sidelink PT-RS configuration for a transmitting wireless communication device (e.g., a transmitting (Tx) UE) may be configured based on a sidelink channel state information (CSI) report received from a receiving wireless communication device (e.g., a receiving (Rx) UE). For example, the sidelink PT-RS configuration may be configured based on at least one of a precoding matrix indicator (PMI) or rank indicator (RI) included in the sidelink CSI report. In some examples, the Tx UE may transmit a plurality of sidelink channel state information reference signals (CSI-RSs) to the Rx UE, each associated with a different CSI-RS resource (e.g., a different beam). The Rx UE may then generate and transmit the CSI report based on measurements obtained from the received sidelink CSI-RSs.

In some examples, the Tx UE may transmit the PT-RS configuration to the Rx UE for use in communicating sidelink PT-RSs from the Tx UE to the Rx UE. For example, the PT-RS configuration may be transmitted within second stage sidelink control information (SCI) carried in a data region of a slot. In some examples, SCI may include two SCI stages. Stage 1 sidelink control information (first stage SCI) may be referred to herein as SCI-1. Stage 2 sidelink control information (second stage SCI) may be referred to herein as SCI-2. SCI-1 may be transmitted on a physical sidelink control channel (PSCCH) and may include information for resource allocation of a sidelink resource and for decoding of the second stage of sidelink control information (i.e., SCI-2). SCI-2 may be transmitted on a physical sidelink shared channel (PSSCH) and may contain information for decoding the PSSCH.

In some examples, the PT-RS configuration may include both PT-RS port information, including the number of PT-RS ports and port association, and PT-RS resource element (RE) information indicating, for example, a time density, frequency density, and RE offset of the PT-RSs.

In some examples, the Tx UE may select the number of PT-RS ports based on at least one of the RI and PMI. For example, the Tx UE may select the number of ports based on the number of layers indicated by the RI and PMI. In some examples, the Tx UE may further determine the port association based on the number of PT-RS ports. For example, the Tx UE may access a table including a predetermined (e.g., fixed) mapping between the number of ports and the corresponding port association. As another example, the Tx UE may dynamically determine the port association to indicate a respective DM-RS port associated with each of the PT-RS ports.

In some examples, the Tx UE or Rx UE may forward the CSI report to a radio access network (RAN) entity (e.g., a base station) for PT-RS configuration. For example, the RAN entity may generate PT-RS configuration information from the CSI report and transmit the PT-RS configuration information to the Tx UE. In some examples, the PT-RS configuration information includes the PT-RS configuration. For example, the PT-RS configuration information may include the number of PT-RS ports and/or port association. In other examples, the PT-RS configuration information may include the PMI and/or RI from the CSI report. In this example, the Tx UE may select the number of PT-RS ports based on the PMI and/or RI and determine the port association based on the number of PT-RS ports.

According to one or more examples, by providing a flexible PT-RS configuration, UEs with different numbers of antenna ports may be supported. For example, UEs may be configured with additional antenna ports for communication over sidelink millimeter wave (mmWave) frequency bands. In addition, a flexible PT-RS configuration may support UEs that are configured to communicate over different frequency bands (e.g., FR1 and FR2). In such mmWave communication scenarios, a flexible PT-RS configuration may reduce phase noise errors by enabling the PT-RS to be transmitted over more than two PT-RS ports. A flexible PT-RS configuration may also enable power savings on the UE. For example, for a rank-2 transmission of a sidelink data channel, the PT-RS configuration may configure a single PT-RS port instead of both PT-RS ports, thus reducing the transmit power of the PT-RS.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, 106, and 142, and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element or entity in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114/116, and 146 provide wireless access points to a core network for any number of mobile apparatuses.

FIG. 1 further includes an unmanned aerial vehicle (UAV) 120, such as a quadcopter or drone, which may be configured to function as a base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 via RRH 116; UEs 138 and 140 may be in communication with base station 146; and UE 136 may be in communication with mobile base station 120. Here, each base station 110, 112, 114, 118, 120, and 146 may be configured to provide an access point to a core network (not shown) for all the UEs in the respective cells. In another example, a mobile network node (e.g., UAV 120) may be configured to function as a UE. For example, the UAV 120 may operate within cell 102 by communicating with base station 110.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or data (e.g., user data traffic or other type of traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex (FD).

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station 112) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 126), which may be scheduled entities, may utilize resources allocated by the scheduling entity 112.

Base stations are not the only entities that may function as scheduling entities. That is, in some examples, a UE may function as a scheduling entity, scheduling resources for one or more scheduled entities (e.g., one or more other UEs). For example, two or more UEs (e.g., UEs 138 and 140) may communicate with each other using peer to peer (P2P) or sidelink signals 137 without relaying that communication through a base station (e.g., base station 146). In some examples, the UEs 138 and 140 may each function as a scheduling entity or transmitting sidelink device and/or a scheduled entity or a receiving sidelink device to communicate sidelink signals 137 therebetween without relying on scheduling or control information from a base station (e.g., base station 146). In other examples, the base station 146 may allocate resources to the UEs 138 and 140 for sidelink communication. For example, the UEs 138 and 140 may communicate using sidelink signaling in a P2P network, a device-to-device (D2D) network, vehicle-to-vehicle (V2V) network, a vehicle-to-everything (V2X), a mesh network, or other suitable network.

In some examples, a D2D relay framework may be included within a cellular network to facilitate relaying of communication to/from the base station 112 via D2D links (e.g., sidelinks 127 or 137). For example, one or more UEs (e.g., UE 138) within the coverage area of the base station 146 may operate as relaying UEs to extend the coverage of the base station 146, improve the transmission reliability to one or more UEs (e.g., UE 140), and/or to allow the base station to recover from a failed UE link due to, for example, blockage or fading.

To enable phase noise compensation by UEs (e.g., UE 138 and 140) communicating over a sidelink over a mmWave frequency band, sidelink phase-tracking reference signals (PT-RSs) may be communicated between the UEs 138 and 140 using the sidelink signaling 137. In various aspects of the disclosure, sidelink PT-RSs may be configurable by the UEs 138 and 140 and/or a base station (e.g., base station 146) overseeing sidelink communication between the UEs 138 and 140. In some examples, a transmitting UE (e.g., UE 138) may include a sidelink (SL) PT-RS manager 144 configured to provide a SL PT-RS configuration of the Tx UE to a receiving UE (e.g., UE 140). In addition, the receiving UE 140 may include a SL PT-RS manager 150 configured to receive the SL PT-RS configuration and to receive and process SL PT-RSs from the transmitting UE 138 using the SL PT-RS configuration. The SL PT-RS configuration may include, for example, SL PT-RS port information and SL PT-RS resource element (RE) information. The SL PT-RS RE information may include a time density, frequency density, and/or RE offset of SL PT-RSs transmitted by the Tx UE 138. The SL PT-RS port information may include a number of PT-RS ports used for transmission of SL PT-RSs by the Tx UE 138 and/or a port association indicating a respective association between each SL PT-RS port and a SL demodulation reference signal (DM-RS) port on the Tx UE 138. In some examples, the number of SL PT-RS ports and/or the port association may be configurable.

In some examples, the SL PT-RS manager 144 may be configured to select the number of SL PT-RS ports. For example, the SL PT-RS manager 144 may be configured to select the number of SL PT-RS ports based on a sidelink channel state information (CSI) report received from the Rx UE 140. The sidelink CSI report may be generated by the Rx UE 140 in response to receiving a sidelink reference signal (e.g., a sidelink channel state information reference signal (CSI-RS)) from the Tx UE 138. The sidelink CSI report may include, for example, a precoding matrix indicator (PMI) and a rank indicator (RI). In an aspect, the SL PT-RS manager 144 may select the number of SL PT-RS ports based on at least one of the PMI or RI. In addition, the SL PT-RS manager 144 may further determine the port association based on the number of SL PT-RS ports.

In some examples, the base station 146 may further include a SL PT-RS manager 148 configured to determine SL PT-RS configuration information and to provide the SL PT-RS configuration information to the Tx UE 138 for use by the SL PT-RS manager 144 of the Tx UE 138 in generating and transmitting the SL PT-RS configuration to the Rx UE 140. For example, the SL PT-RS manager 148 at the base station 146 may be configured to receive the CSI report generated by the Rx UE 140 (e.g., either from the Rx UE 140 or the Tx UE 138) and to determine the SL PT-RS configuration information based on the CSI report. The SL PT-RS configuration information may include the SL PT-RS configuration (e.g., the number of SL PT-RS ports and/or port association) or at least one of the PMI or RI from the CSI report. In the latter case, the SL PT-RS manager 144 at the Tx UE 138 may utilize the PMI and/or RI provided by the base station 146 to select the number of PT-RS ports and/or the port association.

Figure 2:
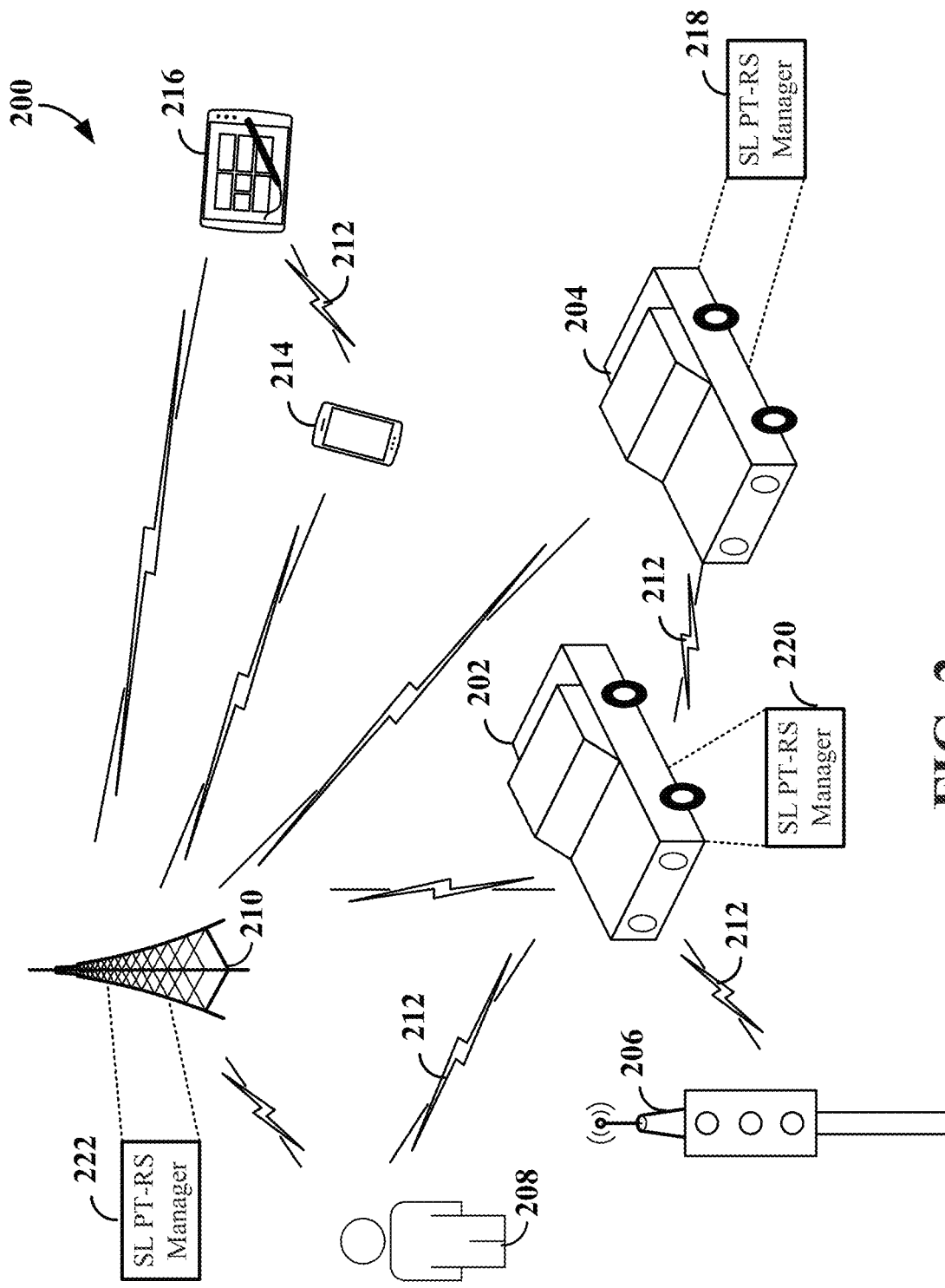
FIG. 2 is a diagram illustrating an example of a wireless communication network employing sidelink communication according to some aspects.

FIG. 2 illustrates an example of a wireless communication network 200 configured to support D2D or sidelink communication. In some examples, sidelink communication may include V2X communication. V2X communication involves the wireless exchange of information directly between not only vehicles (e.g., vehicles 202 and 204) themselves, but also directly between vehicles 202/204 and infrastructure (e.g., roadside units (RSUs) 206), such as streetlights, buildings, traffic cameras, tollbooths or other stationary objects, vehicles 202/204 and pedestrians 208, and vehicles 202/204 and wireless communication networks (e.g., base station 210). In some examples, V2X communication may be implemented in accordance with the New Radio (NR) cellular V2X standard defined by 3GPP, Release 16, or other suitable standard.

V2X communication enables vehicles 202 and 204 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 202 and 204 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 208 may be utilized to trigger a warning sound, vibration, flashing light, etc., in case of imminent danger.

The sidelink communication between vehicle-UEs (V-UEs) 202 and 204 or between a V-UE 202 or 204 and either an RSU 206 or a pedestrian-UE (P-UE) 208 may occur over a sidelink 212 utilizing a proximity service (ProSe) PC5 interface. In various aspects of the disclosure, the PC5 interface may further be utilized to support D2D sidelink 212 communication in other proximity use cases. Examples of other proximity use cases may include public safety or commercial (e.g., entertainment, education, office, medical, and/or interactive) based proximity services. In the example shown in FIG. 2, ProSe communication may further occur between UEs 214 and 216.

ProSe communication may support different operational scenarios, such as in-coverage, out-of-coverage, and partial coverage. Out-of-coverage refers to a scenario in which UEs (e.g., V-UEs 202 and 204 and P-UE 208) are outside of the coverage area of a base station (e.g., base station 210), but each are still configured for ProSe communication. Partial coverage refers to a scenario in which some of the UEs (e.g., V-UE 204) are outside of the coverage area of the base station 210, while other UEs (e.g., V-UE 202 and P-UE 208) are in communication with the base station 210. In-coverage refers to a scenario in which UEs (e.g., UEs 214 and 216) are in communication with the base station 210 (e.g., gNB) via a Uu (e.g., cellular interface) connection to receive ProSe service authorization and provisioning information to support ProSe operations.

In 5G NR V2X, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., pre-loaded on the UE) or configured by a base station (e.g., base station 210).

In addition, there may be two main resource allocation modes of operation for sidelink (e.g., PC5) communications. In a first mode, Mode 1, a base station (e.g., gNB) 210 may allocate resources to V-UEs (and other V2X devices, such as P-UEs and RSUs) for sidelink communication between the V2X devices in various manners. For example, the base station 210 may allocate sidelink resources dynamically (e.g., a dynamic grant) to V2X devices, in response to requests for sidelink resources from the V2X devices. The base station 210 may further activate preconfigured sidelink grants (e.g., configured grants) for sidelink communication among the V2X devices. In Mode 1, sidelink feedback may be reported back to the base station 210 by a transmitting V2X device.

In a second mode, Mode 2, the V2X devices may autonomously select sidelink resources for sidelink communication therebetween. In some examples, a transmitting V2X device may perform resource/channel sensing to select resources (e.g., sub-channels) on the sidelink channel that are unoccupied. Signaling on the sidelink 212 is the same between the two modes. Therefore, from a receiver's point of view, there is no difference between the modes.

In either Mode 1 or Mode 2, V2X devices (e.g., V-UEs 202 and 204) communicating over a sidelink 212 may utilize sidelink phase-tracking reference signals (PT-RSs) to compensate for the phase noise experienced by the V2X devices 202 and 204 when operating in a mmWave frequency band. In various aspects of the disclosure, the sidelink (SL) PT-RSs communicated by a transmitting V-UE (e.g., Tx UE 204) to a receiving V-UE (e.g., Rx UE 202) may be configurable by the Tx UE 204 and/or the base station 210, depending on whether Mode 1 or Mode 2 is implemented.

In Mode 2, the Tx UE 204 may include a sidelink (SL) PT-RS manager 218 configured to select the number of SL PT-RS ports and/or the port association between the SL PT-RS ports and SL DM-RS ports. The SL PT-RS manager 218 may further be configured to transmit a SL PT-RS configuration of the Tx UE including the number of SL PT-RS ports and/or the port association to the Rx UE 202. The Rx UE 202 further includes a SL PT-RS manager 220 configured to receive the SL PT-RS configuration and to receive and process SL PT-RSs from the Tx UE 204 based on the SL PT-RS configuration.

In some examples, the SL PT-RS manager 218 may be configured to select the number of SL PT-RS ports based on a sidelink channel state information (CSI) report received from the Rx UE 202. The sidelink CSI report may be generated by the Rx UE 202 in response to receiving a sidelink reference signal (e.g., a sidelink channel state information reference signal (CSI-RS)) from the Tx UE 204. The sidelink CSI report may include, for example, a precoding matrix indicator (PMI) and a rank indicator (RI). In an aspect, the SL PT-RS manager 218 may select the number of SL PT-RS ports based on at least one of the PMI or RI. In addition, the SL PT-RS manager 218 may further determine the port association based on the number of SL PT-RS ports.

In Mode 1, the base station 210 may further include a SL PT-RS manager 222 configured to determine SL PT-RS configuration information and to provide the SL PT-RS configuration information to the Tx UE 204 for use by the SL PT-RS manager 218 of the Tx UE 204 in generating and transmitting the SL PT-RS configuration to the Rx UE 202. For example, the SL PT-RS manager 222 at the base station 210 may be configured to receive the CSI report from the Rx UE 202 or the Tx UE 204 and to determine the SL PT-RS configuration information based on the CSI report. The SL PT-RS configuration information may include the SL PT-RS configuration (e.g., the number of SL PT-RS ports and/or port association) or at least one of the PMI or RI from the CSI report for use by the SL PT-RS manager 218 at the Tx UE 204 in configuring the SL PT-RS configuration.

Figure 3:
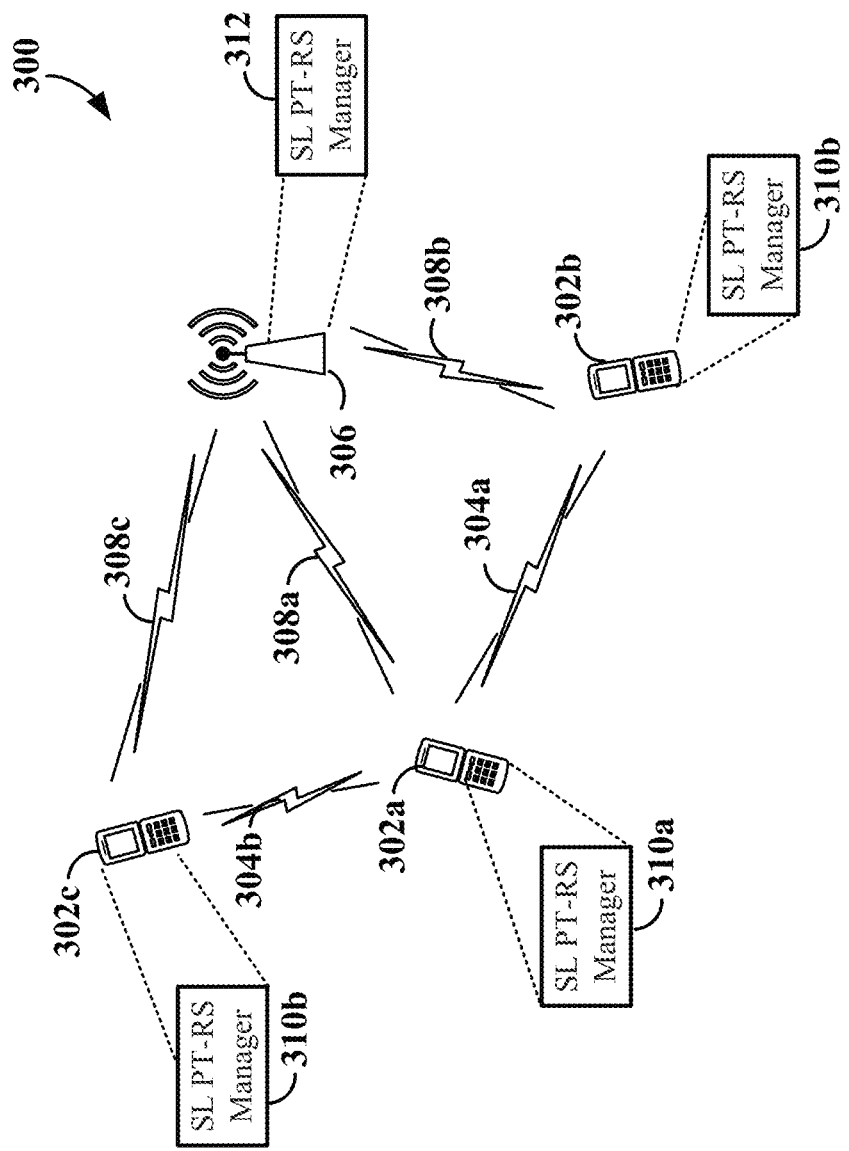
FIG. 3 is a diagram illustrating an example of a wireless communication system for facilitating both cellular and sidelink communication according to some aspects.

FIG. 3 is a diagram illustrating an example of a wireless communication network 300 for facilitating both cellular and sidelink communication. The wireless communication network 300 may correspond, for example, to the RAN illustrated in FIG. 1. The wireless communication network 300 includes a plurality of wireless communication devices 302a, 302b, and 302c and a base station (e.g., eNB or gNB) 306. In some examples, the wireless communication devices 302a, 302b, and 302c may be UEs capable of implementing sidelink communication (e.g., V2X or other D2D).

The wireless communication devices 302a and 302b may communicate over a first sidelink 304a, while wireless communication devices 302a and 302c may communicate over a second sidelink 304b. Each of the sidelinks 304a and 304b may utilize, for example, a PC5 interface. Wireless communication devices 302a, 302b, and 302c may further communicate with the base station 306 over respective Uu links 308a, 308b, and 308c. The sidelink communication over the sidelinks 304a and 304b may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

In some examples, a common carrier may be shared between the sidelinks 304a and 304b and Uu links 308a-308c, such that resources on the common carrier may be allocated for both sidelink communication between wireless communication devices 302a-302c and cellular communication (e.g., uplink and downlink communication) between the wireless communication devices 302a-302c and the base station 306. For example, the wireless communication system 300 may be configured to support a Mode 1 sidelink (e.g., V2X) network in which resources for both sidelink and cellular communication are scheduled by the base station 306. In other examples in which Mode 2 V2X is implemented on the sidelinks 304a and 304b, the wireless communication devices 302a-302c may autonomously select sidelink resources (e.g., from one or more frequency bands or sub-bands designated for sidelink communication) for communication therebetween. In this example, the wireless communication devices 302a-302c may function as both scheduling entities and scheduled entities scheduling sidelink resources for communication with each other.

In some examples, the wireless communication devices 302a-302c may utilize sidelink phase-tracking reference signals (PT-RSs) to compensate for the phase noise experienced by the wireless communication devices 302a-302c when operating in a mmWave frequency band. In various aspects of the disclosure, a wireless communication device (e.g., wireless communication device 302a) may include a sidelink (SL) PT-RS manager 310a to configure and provide a respective SL PT-RS configuration to each of the other wireless communication devices 302b and 302c for communication of respective SL PT-RSs to each of the wireless communication devices 302b and 302c. For example, the SL PT-RS manager 310a may configure a first SL PT-RS configuration for communication of SL PT-RSs to wireless communication device 302b over sidelink 304a and a second SL PT-RS configuration for communication of SL PT-RSs to wireless communication device 302c over sidelink 304b. Each of the receiving wireless communication devices 302b and 302c may further include a respective SL PT-RS manager 310b and 310c configured to receive the respective SL PT-RS configuration from the transmitting wireless communication device 302a and to receive and process respective SL PT-RSs from the wireless communication device 302a based on the respective SL PT-RS configurations.

In some examples, the SL PT-RS manager 310a may be configured to select the number of SL PT-RS ports and/or the port association between the SL PT-RS ports and SL DM-RS ports for each of the first and second SL PT-RS configurations. Each of the first and second SL PT-RS configurations may include the same or different numbers of SL PT-RS ports and/or the same or different port associations. In some examples, the SL PT-RS manager 310a may be configured to select the respective number of SL PT-RS ports for each of the first and second SL PT-RS configurations based on a respective sidelink channel state information (CSI) report received from each of the wireless communication devices 302b and 302c. For example, wireless communication device 302b may provide a first CSI report including first CSI (e.g., first PMI, first RI, etc.) to the wireless communication device 302a. In addition, wireless communication device 302c may provide a second CSI report including second CSI (e.g., second PMI, second RI, etc.) to the wireless communication device 302a. The SL PT-RS manager 310a may then determine a first number of SL PT-RS ports for the SL PT-RS configuration based on the first CSI report (e.g., the first PMI and/or the first RI) and a second number of SL PT-RS ports for the second SL PT-RS configuration based on the second CSI report (e.g., the second PMI and/or the second RI). In addition, the SL PT-RS manager 310a may further determine the respective port association for each of the first and second SL PT-RS configurations based on the first and second numbers of SL PT-RS ports.

In some examples, such as when the wireless communication devices 302a-302c are operating in Mode 1 V2X, the base station 306 may include a SL PT-RS manager 312 configured to determine respective SL PT-RS configuration information (e.g., first and second SL PT-RS configuration information) for each of the first SL PT-RS configuration and the second SL PT-RS configuration and to provide the first and second SL PT-RS configuration information to the wireless communication device 302a for use by the SL PT-RS manager 310a of the wireless communication device 302a in generating and transmitting the first SL PT-RS configuration to the wireless communication device 302b and the second SL PT-RS configuration to the wireless communication device 302c. For example, the SL PT-RS manager 312 at the base station 306 may be configured to receive the first and second CSI reports from the wireless communication devices 302b and 302c or the wireless communication device 302a and to determine the first and second SL PT-RS configuration information based on the first and second CSI reports, respectively. The first and second SL PT-RS configuration information may include the respective first and second SL PT-RS configuration (e.g., the number of SL PT-RS ports and/or port association) or at least one of the PMI or RI from the respective CSI report for use by the SL PT-RS manager 310a at the wireless communication device 302a in configuring the first and second SL PT-RS configurations.

Figure 4:
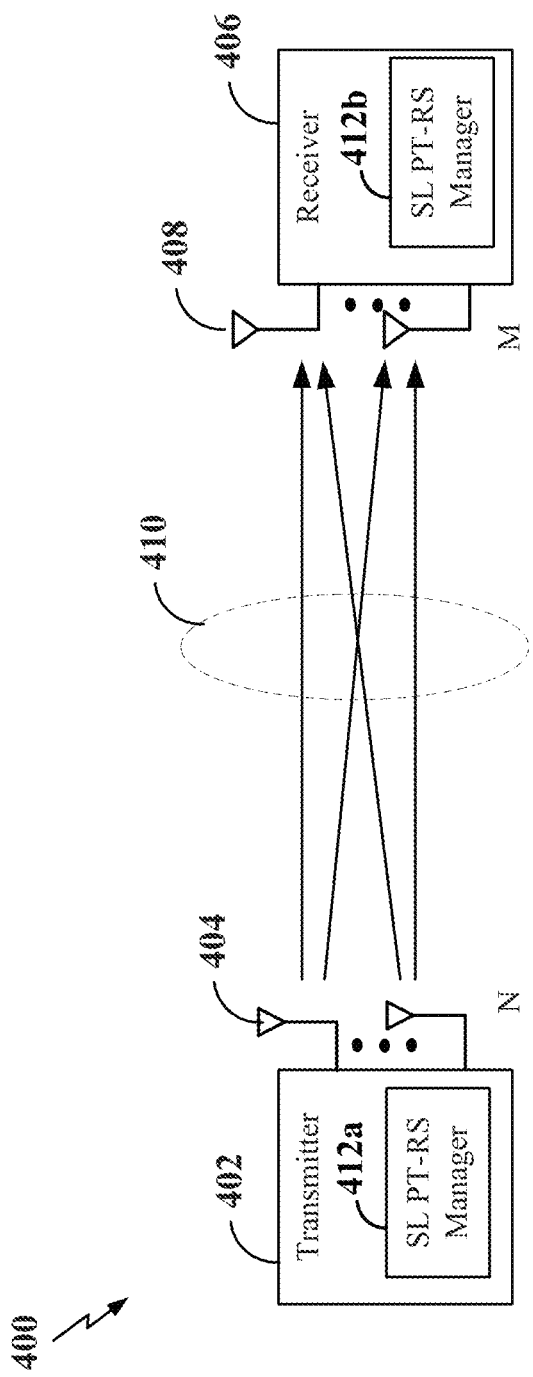
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable device. In some examples, the transmitter and receiver are each wireless communication devices (e.g., UEs or V2X devices) communicating over a sidelink channel.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for FR2 or higher (millimeter wave) systems, beamformed signals may be utilized for most downlink channels, including the physical downlink control channel (PDCCH) and physical downlink shared channel (PDSCH). In addition, broadcast control information, such as the synchronization signal block (SSB), slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). In addition, beamformed signals may further be utilized in D2D systems, such as NR SL or V2X, utilizing FR2 or other higher mmWave frequency band.

The transmit and receive antennas 404 and 408 may each correspond to respective transmit and receive antenna ports. Here, the term antenna port refers to a logical port (e.g., a beam) over which a signal (e.g., a data stream or layer) may be transmitted. In an example, each of the transmitter 402 and receiver 406 may include one or more antenna arrays (or antenna panels), each including a plurality of antenna elements. The antenna elements of an antenna panel may be mapped to antenna ports on the antenna panel by antenna element combiners. In some examples, one or more of the antenna ports on the transmitter 402 may be configured for transmission of demodulation reference signals (DM-RSs) to the receiver 406. In some examples, the DM-RS configuration may be specific to the receiver 406 (e.g., a different DM-RS configuration may be provided for each receiver). To support MIMO transmissions from the transmitter 402 to the receiver 406, multiple orthogonal DM-RS ports can be scheduled, one for each layer. The DM-RS ports may further be used for communication of phase-tracking reference signals (PT-RSs). In some examples, the number of PT-RS ports is the same as the number of DM-RS ports. In other examples, the number of PT-RS ports is less than the number of DM-RS ports. For example, if the transmitter 402 is configured with two DM-RS ports, one or both of the DM-RS ports may be further be configured as a PT-RS port.

In some examples, the transmitter 402 may be a transmitting (Tx) UE and the receiver 406 may be a receiving (Rx) UE in a D2D or V2X network utilizing sidelink signals for communication therebetween. In this example, the Tx UE 402 may include a SL PT-RS manager 412*a* configured to provide a SL PT-RS configuration of the Tx UE 402 to the Rx UE 406. In addition, the Rx UE 406 may further include a SL PT-RS manager 412*b* configured to receive the SL PT-RS configuration and to receive and process SL PT-RSs from the Tx UE 402 based on the SL PT-RS configuration. The SL PT-RS configuration may include, for example, SL PT-RS port information and SL PT-RS resource element (RE) information. The SL PT-RS RE information may include a time density, frequency density, and/or RE offset of SL PT-RSs transmitted by the Tx UE 402. The SL PT-RS port information may include a number of PT-RS ports used for transmission of SL PT-RSs by the Tx UE 402 and/or a port association indicating a respective association between each SL PT-RS port and a SL demodulation reference signal (DM-RS) port on the Tx UE 402.

In some examples, the number of SL PT-RS ports and/or the port association may be configurable by the SL PT-RS manager 412*a* or a base station (not shown) based on a SL CSI report provided by the Rx UE 406. For example, the SL PT-RS manager 412*a* may be configured to select the number of SL PT-RS ports based on the SL CSI report received from the Rx UE 406. The SL CSI report may be generated by the Rx UE 406 in response to receiving a sidelink reference signal (e.g., a sidelink channel state information reference signal (CSI-RS)) from the Tx UE 402. The sidelink CSI report may include, for example, a PMI and a RI. In an aspect, the SL PT-RS manager 412*a* may select the number of SL PT-RS ports based on at least one of the PMI or RI. In addition, the SL PT-RS manager 412*a* may further determine the port association based on the number of SL PT-RS ports.

Figure 5:
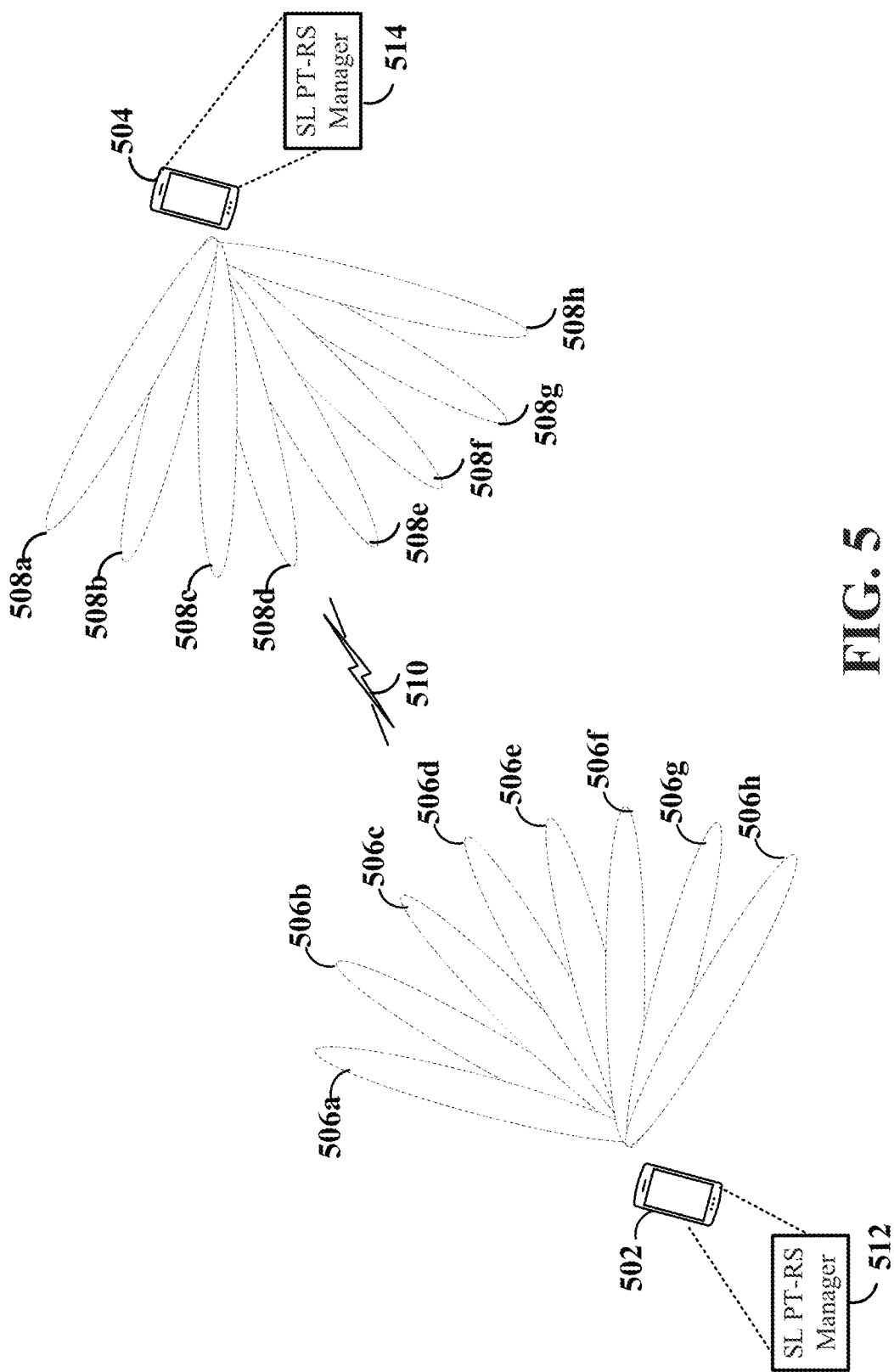
FIG. 5 is a diagram illustrating beamforming in a sidelink network according to some aspects.

FIG. 5 is a diagram illustrating communication between wireless communication devices 502 and 504 using beamformed sidelink signals according to some aspects. Each of the wireless communication devices 502 and 504 may be any of the UEs, V2X devices, transmitting devices or receiving devices illustrated in any of FIGS. 1-4.

In the example shown in FIG. 5, wireless communication device 502 may be configured to communicate sidelink signals with wireless communication device 504 on one or more of a plurality of beams 506a-506h. In addition, wireless communication device 504 may be configured to communicate sidelink signals over a sidelink 510 with wireless communication device 502 on one or more of a plurality of beams 508a-508h. For example, each wireless communication device 502 and 504 may select one or more beams to transmit sidelink signals to the other wireless communication device. In some examples, due to channel reciprocity, the selected beam(s) on each wireless communication device 502 and 504 may be used for both transmission and reception of sidelink signals. It should be noted that while some beams are illustrated as adjacent to one another, such an arrangement may be different in different aspects. In some examples, the wireless communication devices 502 and 504 may generate more or less beams distributed in different directions and in three-dimensional space.

The number of beams on which a particular wireless communication device 502 or 504 may simultaneously communicate may be defined based on NR SL standards and specifications and the capabilities of the wireless communication devices 502 and 504. For example, the number of beams may be determined based on a number of antenna panels configured on the wireless communication device 502 or 504. As an example, a wireless communication device 502 or 504 may include one or two (or more) antenna panels, and as such, may be configured to communicate on one or two (or more) beams, respectively, at a time. Each beam may be utilized to transmit a respective layer for MIMO communication. Other numbers of simultaneous beams are also possible in the present disclosure.

In some examples, to select one or more beams for communication on a sidelink between the two wireless communication devices 502 and 504, a first wireless communication device (e.g., wireless communication device 502) may transmit a sidelink reference signal, such as a sidelink synchronization signal block (SSB) or sidelink channel state information (CSI) reference signal (RS), on each of a plurality of transmit beams 506a-506h in a beam-sweeping manner towards a second wireless communication device (e.g., wireless communication device 504). The second wireless communication device 504 then performs beam measurements (e.g., reference signal received power (RSRP), signal-to-interference-plus-noise ratio (SINR), etc.) on the beam reference signals to determine the respective beam quality of each of the transmit beams. In some examples, the second wireless communication device 504 may utilize a single receive beam (e.g., beam 508d) to obtain the beam measurements on each of the transmit beams. In other examples, the second wireless communication device 504 may beam sweep on receive beams 508a-508h to obtain a respective beam measurement for each of the plurality of transmit beams 506a-506h on each of the receive beams 508a-508h.

The second wireless communication device 504 may then transmit a beam measurement report (e.g., a Layer 1 (L1) measurement report) to the first wireless communication device 502 indicating the beam quality of one or more of the measured beams 506a-506h. The first wireless communication device 502 or a radio access network (RAN) node (e.g., a base station, such as a gNB) may then select the particular beam(s) for communication between the first and second wireless communication devices on the sidelink based on the beam measurement report. For example, the first wireless communication device 502 may forward the beam measurement report to the base station for selection of the beam(s). The base station may then signal the selected beam(s) via, for example, a radio resource control (RRC) message or via a medium access control (MAC) control element (CE).

Each selected beam (e.g., beam 506d) on one of the wireless communication devices (e.g., wireless communication device 502) may form a beam pair link (BPL) with a corresponding selected beam (e.g., beam 508d) on the other wireless communication device 504. Thus, each BPL includes corresponding transmit and receive beams on the wireless communication devices 502 and 504. For example, a BPL may include a first transmit/receive beam 506d on the first wireless communication device 502 and a second transmit/receive beam 508d on the second wireless communication device 504. To increase the data rate, multiple BPLs can be used to facilitate spatial multiplexing of multiple data streams. In some examples, the different BPLs can include beams from different antenna panels.

In some examples, the wireless communication device 502 may be a transmitting (Tx) UE and the wireless communication device 504 may be a receiving (Rx) UE in the SL network. In this example, the Tx UE 502 may include a SL PT-RS manager 512 configured to provide a SL PT-RS configuration of the Tx UE 502 to the Rx UE 504. In addition, the Rx UE 504 may further include a SL PT-RS manager 514 for receiving the SL PT-RS configuration and receiving and processing SL PT-RSs from the Tx UE 502 based on the SL PT-RS configuration. The SL PT-RS configuration may include, for example, SL PT-RS port information and SL PT-RS resource element (RE) information. The SL PT-RS RE information may include a time density, frequency density, and/or RE offset of SL PT-RSs transmitted by the Tx UE 502. The SL PT-RS port information may include a number of PT-RS ports used for transmission of SL PT-RSs by the Tx UE 502 and/or a port association indicating a respective association between each SL PT-RS port and a SL demodulation reference signal (DM-RS) port on the Tx UE 502.

In some examples, the number of SL PT-RS ports and/or the port association may be configurable by the SL PT-RS manager 512 or a base station (not shown) based on a SL CSI report provided by the Rx UE 504. For example, the SL PT-RS manager 512 may be configured to select the number of SL PT-RS ports based on the SL CSI report received from the Rx UE 504. The SL CSI report may be generated by the Rx UE 504 in response to receiving a sidelink reference signal (e.g., a sidelink CSI-RS) from the Tx UE 502. In some examples, the Tx UE 502 may transmit a plurality of CSI-RSs on a plurality of transmit beams. The transmit beams may include, for example, beams swept from one or more antenna panels of the Tx UE 502. Each CSI-RS may be associated with a respective CSI-RS resource that indicates a time-frequency resource of the corresponding CSI-RS and a spatial direction of the corresponding transmit beam. Each CSI-RS resource may be identified by a CSI-RS resource indicator (CRI).

The Rx UE 504 may estimate the channel quality of the sidelink channel between the Rx UE 504 and the Tx UE 502. For example, the Rx UE 504 may measure the SINR of each received CSI-RS and generate a CSI report based on the measured SINR. The CSI report may include, for example, a channel quality indicator (CQI), rank indicator (RI), precoding matrix indicator (PMI), and/or strongest layer indicator (SLI). The Tx UE 502 (or a base station) may use the CSI report to select a rank (e.g., number of layers) for communication with the Rx UE 504, along with a precoding matrix and a modulation and coding scheme (MCS) to use for transmissions to the Rx UE 504. For MIMO transmissions, each layer (or data stream) may be mapped to one of the antenna ports. For example, the Tx UE 502 may maintain a codebook of precoding matrices and map the different transmission layers to a set of antenna ports on the Tx UE 502 using a selected precoding matrix. The precoding matrix provides the appropriate weightings to be applied to each layer for generation of the respective beam for each layer. The precoding matrix may be selected based on the PMI fed back from the Rx UE 504 in the SL CSI report. For example, using the PMI, the Tx UE 502 may select a particular precoding matrix from a codebook for a MIMO transmission.

The MCS may be selected from one or more MCS tables, each associated with a particular type of coding (e.g., polar coding, LDPC, etc.) or modulation (e.g., binary phase shift keying (BPSK), quadrature phase shift keying (QPSK), 16 quadrature amplitude modulation (QAM), 64 QAM, 256 QAM, etc.). The SLI may be utilized to indicate which column of the precoding matrix of the reported PMI corresponds to the strongest layer codeword corresponding to the largest reported wideband CQI.

In an aspect, the SL PT-RS manager 512 may select the number of SL PT-RS ports based on at least one of the PMI or RI. For example, the SL PT-RS manager 512 may select the number of SL PT-RS ports based on the number of layers indicated by the RI and/or PMI. In some examples, the number of SL PT-RS ports may be equivalent to the number of layers. In addition, the SL PT-RS manager 512 may further determine the port association based on the number of SL PT-RS ports. For example, the SL PT-RS manager 512 may access a table of preconfigured mappings between the number of SL PT-RS ports and the port association. As another example, the SL PT-RS manager 512 may dynamically select the port association based on the number of SL PT-RS ports.

Various aspects of the present disclosure will be described with reference to an OFDM waveform, schematically illustrated in FIG. 6. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 6:
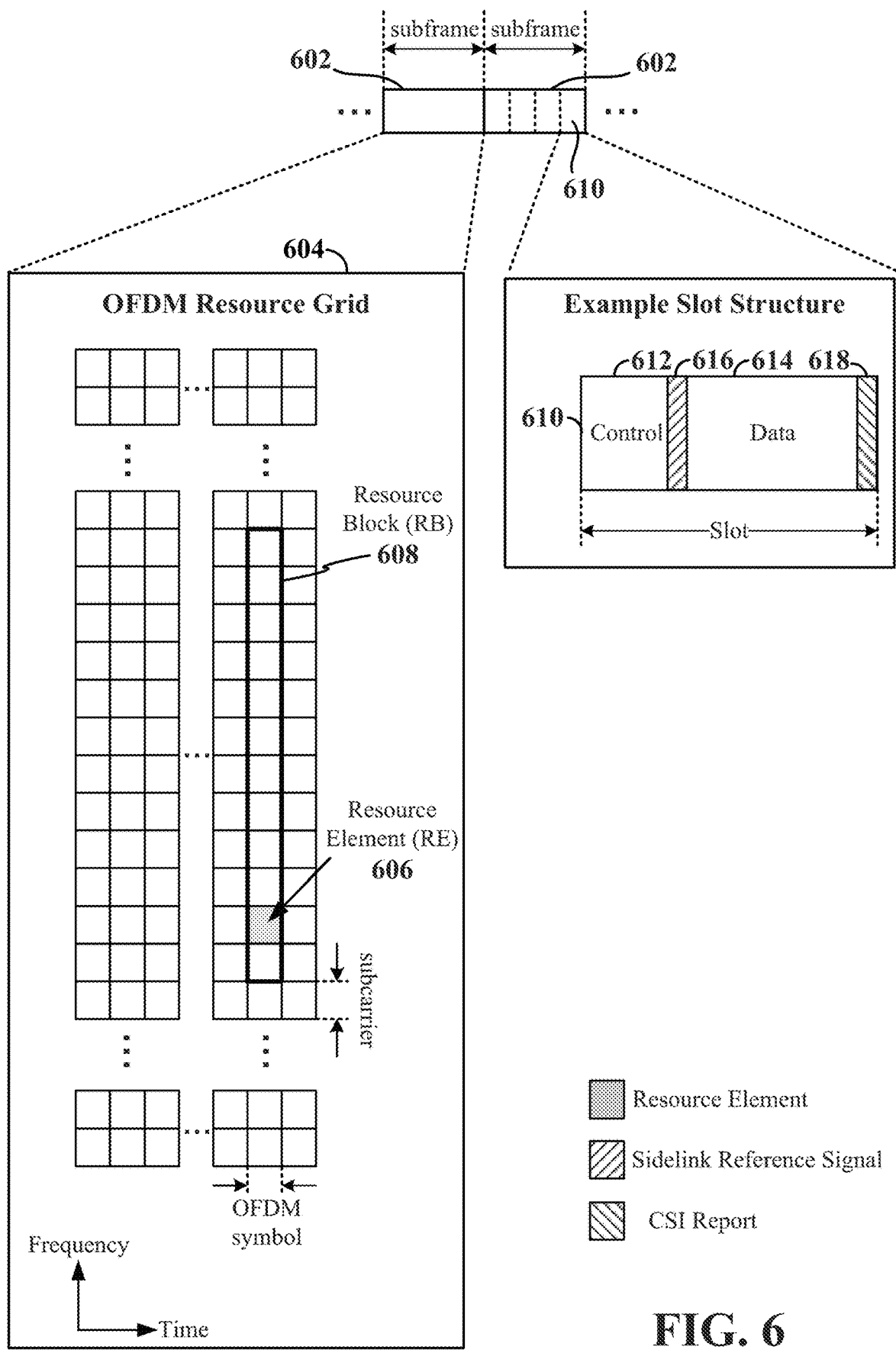
FIG. 6 is a diagram illustrating an example of a frame structure for use in a wireless communication network according to some aspects.

Referring now to FIG. 6, an expanded view of an exemplary subframe 602 is illustrated, showing an OFDM resource grid. However, as those skilled in the art will readily appreciate, the PHY transmission structure for any particular Applications may vary from the example described here, depending on any number of factors. Here, time is in the horizontal direction with units of OFDM symbols; and frequency is in the vertical direction with units of subcarriers of the carrier.

The resource grid 604 may be used to schematically represent time-frequency resources for a given antenna port. That is, in a multiple-input-multiple-output (MIMO) implementation with multiple antenna ports available, a corresponding multiple number of resource grids 604 may be available for communication. The resource grid 604 is divided into multiple resource elements (REs) 606. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 608, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 608 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 606 within one or more sub-bands. Thus, a UE generally utilizes only a subset of the resource grid 604. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 608 is shown as occupying less than the entire bandwidth of the subframe 602, with some subcarriers illustrated above and below the RB 608. In a given implementation, the subframe 602 may have a bandwidth corresponding to any number of one or more RBs 608. Further, in this illustration, the RB 608 is shown as occupying less than the entire duration of the subframe 602, although this is merely one possible example.

Each 1 ms subframe 602 may consist of one or multiple adjacent slots. In the example shown in FIG. 6, one subframe 602 includes four slots 610, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 610 illustrates the slot 610 including a control region 612 and a data region 614. In general, the control region 612 may carry control channels, and the data region 614 may carry data channels. Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Although not illustrated in FIG. 6, the various REs 606 within a RB 608 may be scheduled to carry one or more physical channels, including control channels, shared channels, data channels, etc. Other REs 606 within the RB 608 may also carry pilots or reference signals. These pilots or reference signals may provide for a receiving device to perform channel estimation of the corresponding channel, which may enable coherent demodulation/detection of the control and/or data channels within the RB 608.

In some examples, the slot 610 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 606 (e.g., within the control region 612) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 606 (e.g., in the control region 612 or the data region 614) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 606 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 606 (e.g., within the data region 614) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 606 within the data region 614 may be configured to carry other signals, such as one or more SIBs and DMRSs.

In an example of sidelink communication over a sidelink carrier via a PC5 interface, the control region 612 of the slot 610 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). In some examples, the SCI may include a PT-RS configuration of PT-RSs to be communicated from the Tx UE to the Rx UE. The data region 614 of the slot 610 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 606 within slot 610. For example, HARQ feedback information may be transmitted in a physical sidelink feedback channel (PSFCH) within the slot 610 from the receiving sidelink device to the transmitting sidelink device.

For beamforming on the sidelink, one or more sidelink reference signals 616 (e.g., SSBs and/or CSI-RSs) may be utilized with beam sweeping for sidelink beam selection and sidelink CSI reporting. For example, a transmitting (Tx) UE may beam sweep a set of sidelink CSI-RSs towards a receiving (Rx) UE. Depending on the configured number of ports at the Tx UE, a CSI-RS resource may start at any symbol of a slot and may occupy, for example, one, two or four symbols. The Rx UE may obtain CSI (e.g., CQI, PMI, RI, LI, L1-RSRP, L1-SINR, etc.) based on the CSI-RS beams and transmit a CSI report 618 to the Tx UE including the CSI.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 6 are not necessarily all of the channels or carriers that may be utilized between devices, and those of ordinary skill in the art will recognize that other channels or carriers may be utilized in addition to those illustrated, such as other traffic, control, and feedback channels.

Figure 7:
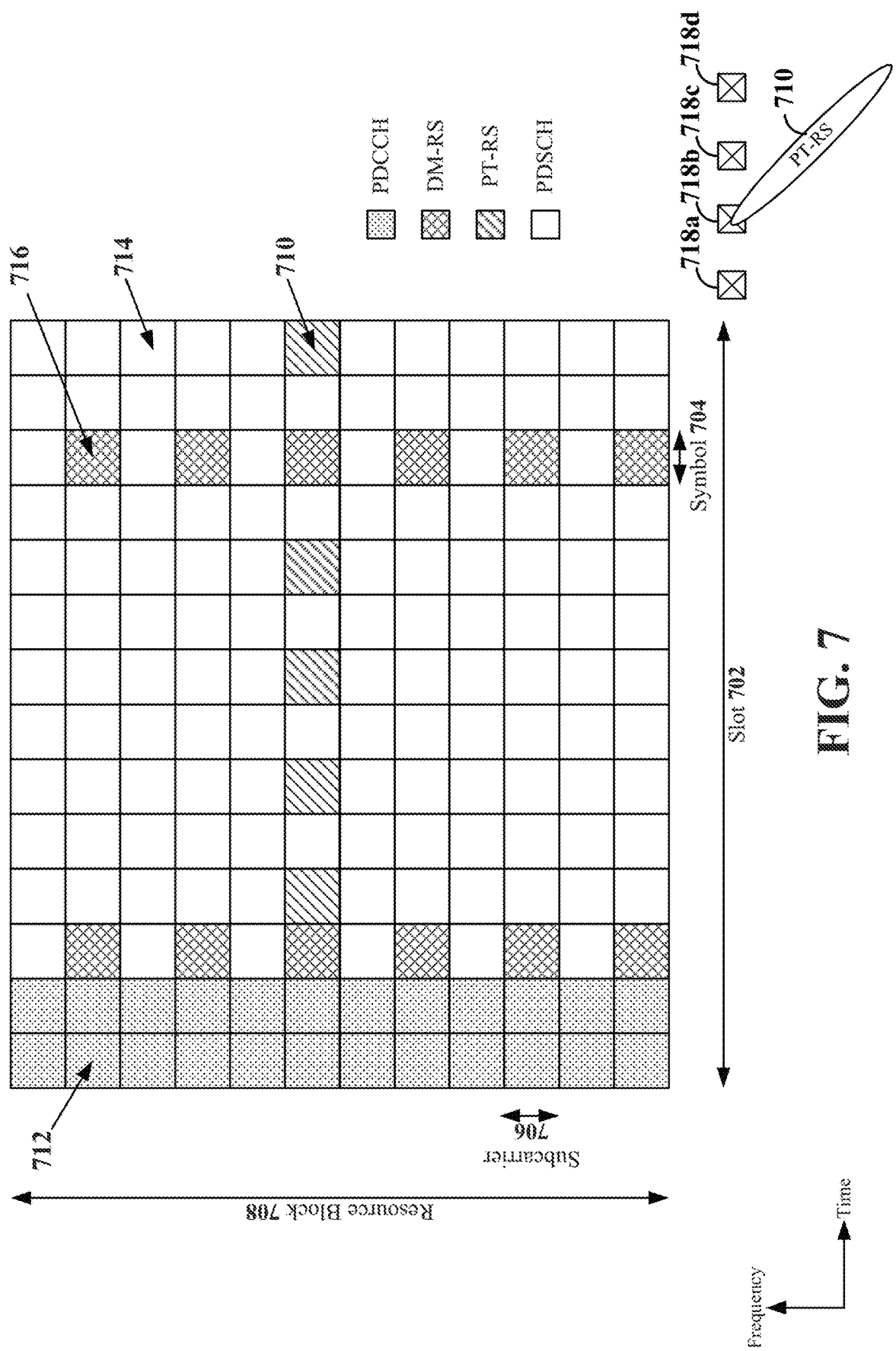
FIG. 7 is a diagram illustrating an example of a slot carrying a phase-tracking reference signal (PT-RS) according to some aspects.

FIG. 7 is a diagram illustrating an example of a slot 702 carrying a phase-tracking reference signal (PT-RS) 710 according to some aspects. In the example shown in FIG. 7, time is illustrated along the horizontal axis in units of symbols 704 and frequency is illustrated along the vertical axis in units of subcarriers 706. A single RB 708 of twelve subcarriers 706 is illustrated, for simplicity. In some examples, the slot 702 may correspond to a downlink-centric slot including a PDCCH 712 carrying DCI, a PDSCH 714 carrying user data traffic, the PT-RS 710, and a DM-RS 716. Here, the term downlink-centric refers to a slot including more downlink symbols than uplink symbols. In the example shown in FIG. 7, the slot 702 includes all downlink symbols.

On the downlink, as shown in FIG. 7, a single PT-RS port (e.g., port 718b) of a plurality of PT-RS ports (e.g., ports 718a-718d) of a TRP may be used for a UE regardless of the number of scheduled DM-RS ports (e.g., ports 718b and 718c). The PT-RS port 718b is associated with one of the scheduled DM-RS ports. For example, for a single codeword PT-RS, the PT-RS port 718b may be associated with the scheduled DM-RS port having the lowest index. As another example, for a two codeword PT-RS, the PT-RS port 718b may be associated with the scheduled DM-RS having the lowest index among the scheduled DM-RS ports used for higher MCS codewords.

The frequency density of the PT-RS 710 may be a function of the scheduled bandwidth. For example, a PT-RS 710 may be scheduled in every two RBs or every four RBs. The example shown in FIG. 7 illustrates one of the RBs that includes a PT-RS 710, where the frequency density may be two or four. The time density of the PT-RS 710 may be a function of the scheduled MCS and may be equal to one (e.g., every OFDM symbol 704), two (e.g., every other OFDM symbol 704), or four (e.g., every fourth symbol 704). In the example shown in FIG. 7, the time density is two (e.g., every other symbol in the PDSCH 714 that does not include a DM-RS 716). The PT-RS 710 may further be configured with a resource element (RE) offset via RRC signaling.

On the uplink, the time and frequency density of the PT-RS may be determined based on the MCS and scheduled bandwidth, respectively, similar to the downlink example described above. In addition, the PT-RS ports are also associated with scheduled DM-RS ports. However, there may be one or two PT-RS ports based on the UE capability. In one example, a UE including two local oscillators (LOs) (e.g., includes two antenna panels for uplink transmissions) may utilize a single PT-RS port when the LOs are fully coherent in phase or two PT-RS ports when the LOs are partially coherent or non-coherent in phase. In another example, for non-codebook based uplink transmissions, the number of PT-RS ports (e.g., one or two PT-RS ports) may be determined based on the sounding reference signal (SRS) resource indicator (SRI). For example, each SRS resource may include a Ptrs-PortIndex field indicating the number of PT-RS ports. In another example, for partial-coherent and non-coherent codebook-based uplink transmissions, the number of PT-RS ports may be determined based on the transmit precoding matrix indicator (TPMI)/number of layers utilized for the uplink transmission. For example, first and second DM-RS ports may be associated with a first PT-RS port for a first uplink layer and third and fourth DM-RS ports may be associated with a second PT-RS port for a second layer. In some examples, two bits in the DCI format 0_1 may be used to indicate the PTRS-DMRS association. For example, for a single PT-RS port, the DCI may indicate one of four DM-RS ports, while for two PT-RS ports, the most significant bit (MSB) and least significant bit (LSB) each indicate one of the DM-RS ports for PT-RS ports 0/1.

On the sidelink, the PT-RS may be configured via RRC signaling and may include PT-RS resource element (RE) information including the time density, frequency density, and RE offset, along with PT-RS port information including the number of PT-RS ports and the port association between the PT-RS ports and DM-RS ports on the sidelink. In some examples, the number of PT-RS ports may be fixed to be the same as the number of DM-RS ports and the port association between a PT-RS port and a corresponding DM-RS port may also fixed. For example, on the sidelink, the number of supported DM-RS ports may be two, and as such, the number of PT-RS ports may be fixed to two with a one-to-one mapping between the DM-RS ports and the PT-RS ports.

In various aspects of the disclosure, to support a variable number (e.g., more than two) DM-RS ports on the sidelink and to support wireless communication devices (e.g., V2X or other D2D devices) including multiple LOs (multiple antenna panels), the number of PT-RS ports may be configurable. In addition, the PTRS-DMRS port association may further be configurable. For example, a transmitting wireless communication device (e.g., Tx UE) or a base station in wireless communication with the Tx UE may be configured to select the number of SL PT-RS ports based on a SL CSI report received from a receiving wireless communication device (e.g., Rx UE). The SL CSI report may be generated by the Rx UE in response to receiving a sidelink reference signal (e.g., a sidelink CSI-RS) from the Tx UE. The CSI report may include, for example, a rank indicator (RI) and a precoding matrix indicator (PMI). The Tx UE or base station may select the number of SL PT-RS ports based on at least one of the PMI or RI. For example, the Tx UE or base station may select the number of SL PT-RS ports based on the number of layers indicated by the RI and/or PMI. In some examples, the number of SL PT-RS ports may be equivalent to the number of layers. In addition, the Tx UE or base station may further determine the port association based on the number of SL PT-RS ports. For example, the Tx UE or base station may access a table of preconfigured mappings between the number of SL PT-RS ports and the port association. As another example, the Tx UE or base station may dynamically select the port association based on the number of SL PT-RS ports.

Figure 8:
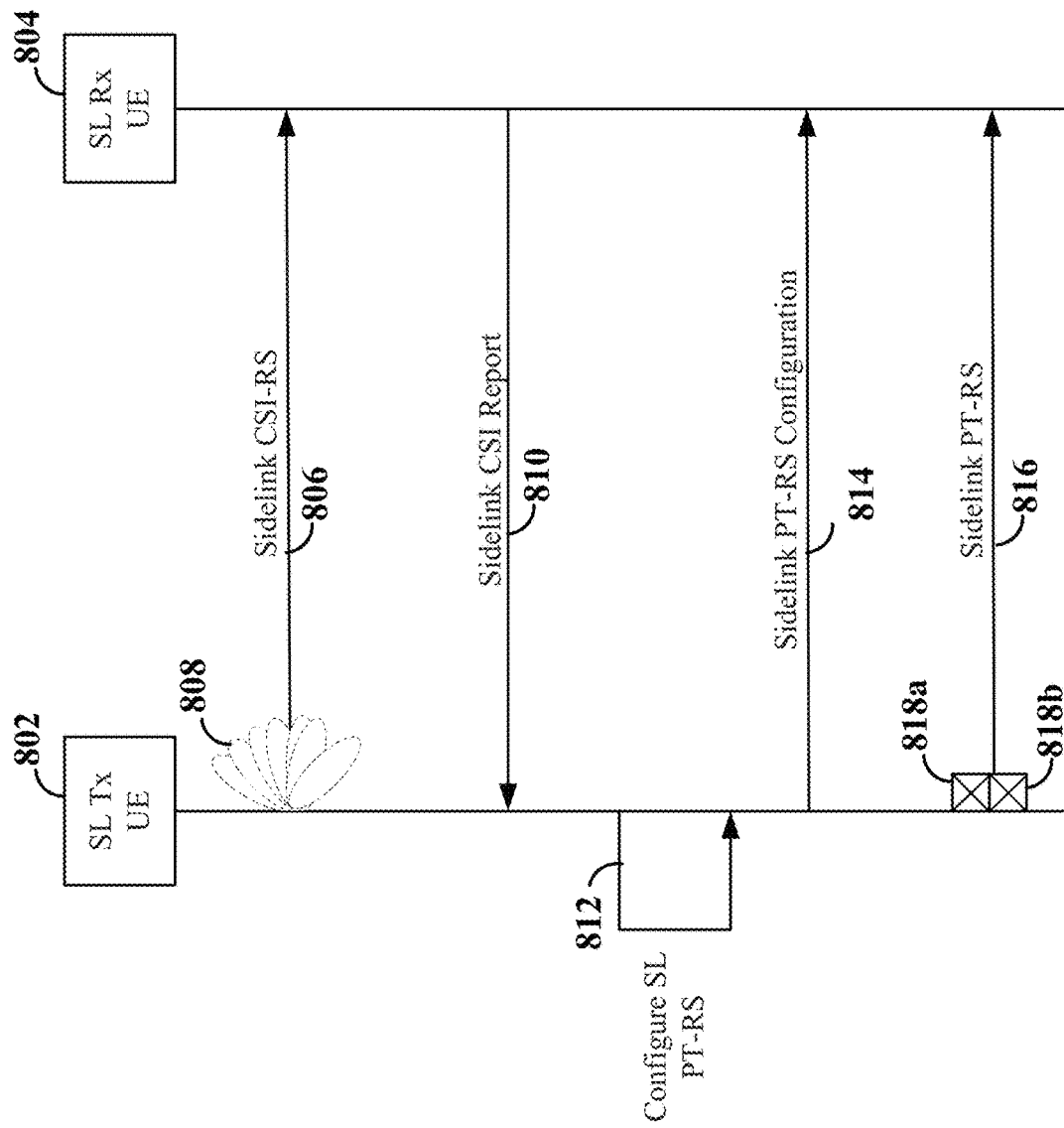
FIG. 8 is a signaling diagram illustrating an example of PT-RS configuration in a sidelink network according to some aspects.

FIG. 8 is a signaling diagram illustrating an example of PT-RS configuration in a sidelink network according to some aspects. In the example shown in FIG. 8, a transmitting sidelink wireless communication device (SL Tx UE) 802 is in wireless communication with a receiving wireless communication device (SL Rx UE) 804 over a sidelink (e.g., PC5 interface). The SL Tx UE 802 and SL Rx UE 804 may each correspond to any of the UEs or other wireless communication devices (e.g., V2X or D2D devices) shown in any of FIGS. 1-5. In the example shown in FIG. 8, the SL Tx UE 802 and SL Rx UE 804 may be configured for sidelink communication utilizing, for example, Mode 2.

At 806, the SL Tx UE 802 may generate and transmit a plurality of sidelink CSI-RSs on a plurality of sidelink transmit beams (e.g., beams 808) to the SL Rx UE 804. Each of the sidelink CSI-RSs may be configured by a CSI-RS resource indicating a respective time-frequency resource of the corresponding CSI-RS and a spatial direction of the corresponding sidelink transmit beam 808. Each CSI-RS resource may be identified, for example, by a CSI-RS resource indicator (CRI).

At 810, the SL Rx UE 804 may obtain CSI (e.g., CQI, PMI, RI, LI, L1-RSRP, L1-SINR, etc.) based on the CSI-RS beams and transmit a CSI report to the SL Tx UE 802 including the CSI. Here, the CSI includes at least the PMI and RI. The CSI report may further include the CRI of the measured CSI-RS beams. For example, the Rx UE 804 may estimate the channel quality of the sidelink channel between the SL Rx UE 804 and the SL Tx UE 802 using the CSI-RS beams and generate the CSI based on the channel quality. In some examples, the SL Rx UE 804 may measure the SINR of each received CSI-RS and generate the CSI report based on the measured SINR. The CSI report may be transmitted from the SL Rx UE 804 to the SL Tx UE 802 within, for example, a sidelink medium access control-control element (MAC-CE).

At 812, the SL Tx UE 802 may configure sidelink PT-RSs for the SL Rx UE 804 and generate a sidelink PT-RS configuration based on the CSI report. The sidelink PT-RS configuration may include, for example, SL PT-RS port information and SL PT-RS resource element (RE) information. The SL PT-RS RE information may include a time density, frequency density, and/or RE offset of SL PT-RSs transmitted by the SL Tx UE 802 to the SL Rx UE 804. The SL PT-RS port information may include a number of PT-RS ports used for transmission of SL PT-RSs by the SL Tx UE 802 and/or a port association indicating a respective association between each SL PT-RS port and a SL demodulation reference signal (DM-RS) port on the SL Tx UE 802. In some examples, the SL PT-RS RE information may be configured via RRC signaling and may be the same for both the SL Tx UE 802 and the SL Rx UE 804.

In some examples, the number of SL PT-RS ports and/or the port association may be configurable by the SL Tx UE 802 based on the SL CSI report provided by the SL Rx UE 804. For example, the SL Tx UE 802 may be configured to select the number of SL PT-RS ports based on the SL CSI report received from the SL Rx UE 804. In an aspect, the SL Tx UE 802 may select the number of SL PT-RS ports based on at least one of the PMI or RI. For example, the SL Tx UE may select the number of SL PT-RS ports based on the number of layers indicated by the RI and/or PMI. In some examples, the number of SL PT-RS ports may be equivalent to the number of layers. In addition, the SL Tx UE 802 may further determine the port association based on the number of SL PT-RS ports. For example, the SL Tx UE 802 may access a table of preconfigured mappings between the number of SL PT-RS ports and the port association. As another example, the SL Tx UE 802 may dynamically select the port association based on the number of SL PT-RS ports.

At 814, the SL Tx UE 802 may transmit the sidelink PT-RS configuration to the SL Rx UE 804. In some examples, the sidelink PT-RS configuration may be transmitted within second stage sidelink control information (SCI) within a data region of a slot (e.g., within the physical sidelink shared channel (PSSCH)). In some examples, the second stage SCI (SCI-2) may be modulated using QPSK, and therefore, the SL Rx UE 804 may be capable of decoding the sidelink PT-RS configuration without compensating for the phase noise.

In some examples, the sidelink PT-RS configuration may include the PT-RS RE information and the PT-RS port information. The PT-RS port information may include the configured number of PT-RS ports and the selected port association. In an example, the number of PT-RS ports and the PTRS-DMRS port association may be indicated by two bits in the second stage SCI. For example, a bit string of 00 may indicate one PT-RS port mapped to DM-RS port 0. A bit string of 01 may indicate one PT-RS port mapped to DM-RS port 1. A bit string of 10 may indicate two PT-RS ports, mapped to DM-RS ports 0 and 1, respectively. A bit string of 11 may indicate that PT-RS is not present.

At 816, the SL Tx UE 802 may transmit sidelink PT-RSs to the SL Rx UE 804 using the sidelink PT-RS configuration. For example, the SL Tx UE 802 may utilize the number of PT-RS ports and PTRS-DMRS port association indicated in the PT-RS configuration to transmit sidelink PT-RSs on sidelink PT-RS ports (e.g., ports 818*a* and 818*b*) to the SL Rx UE 804. The SL Tx UE 802 may further utilize the time density, frequency density, and RE offset indicated in the PT-RS configuration to transmit the sidelink PT-RSs to the SL Rx UE 804.

Figure 9:
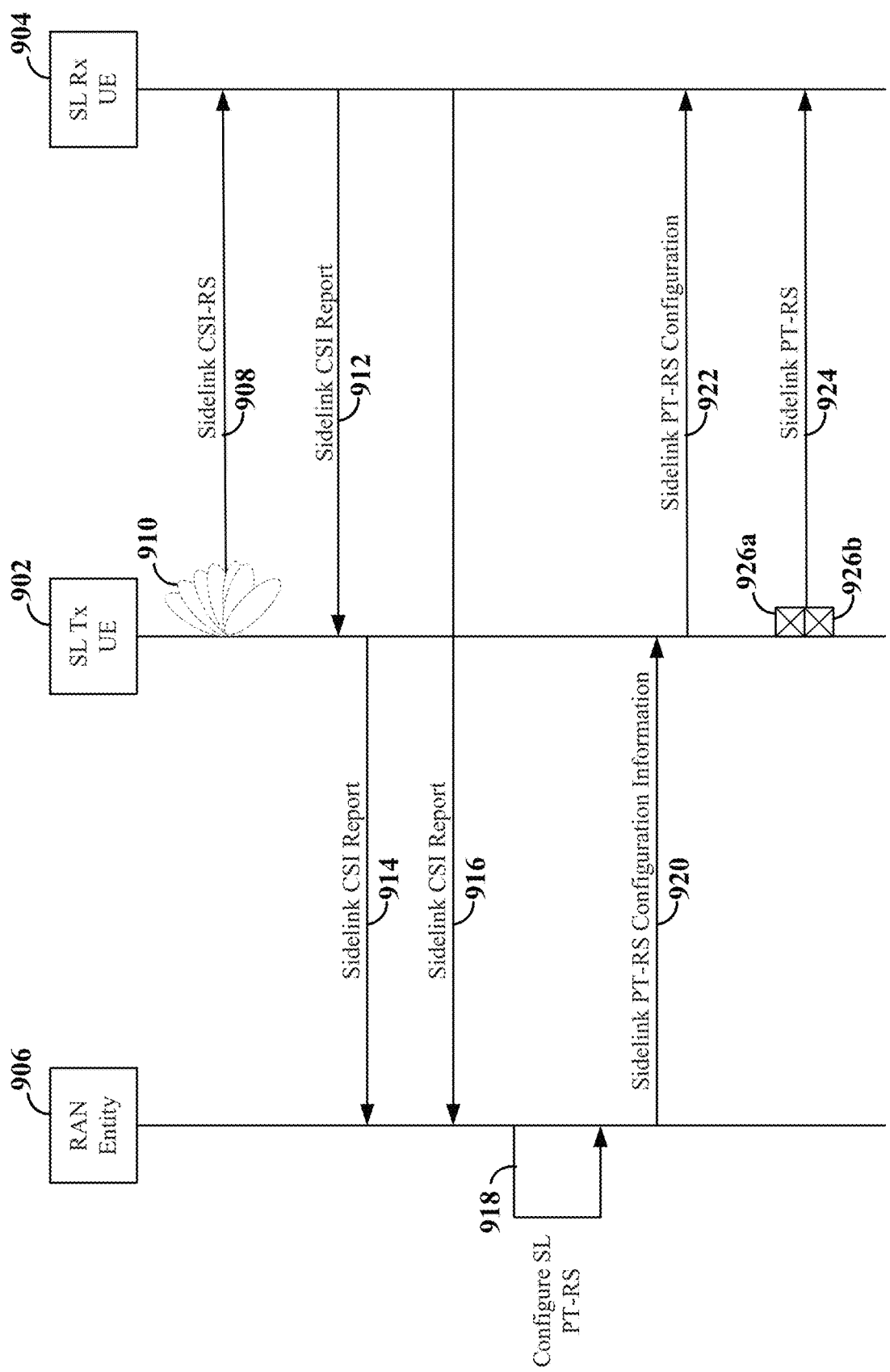
FIG. 9 is a signaling diagram illustrating an example of PT-RS configuration in a sidelink network according to some aspects.

FIG. 9 is a signaling diagram illustrating an example of PT-RS configuration in a sidelink network according to some aspects. In the example shown in FIG. 9, a transmitting sidelink wireless communication device (SL Tx UE) 902 is in wireless communication with a receiving wireless communication device (SL Rx UE) 904 over a sidelink (e.g., PC5 interface). The SL Tx UE 902 and SL Rx UE 904 may each correspond to any of the UEs or other wireless communication devices (e.g., V2X or D2D devices) shown in any of FIGS. 1-5. In addition, the Tx UE 902 and Rx UE 904 are further in wireless communication with a radio access network (RAN) entity 906 over respective Uu interfaces. The RAN entity 906 may correspond to any of the base stations (e.g., eNBs, gNBs, TRPs, etc.) shown in any of FIGS. 1-5. In the example shown in FIG. 9, the SL Tx UE 902 and SL Rx UE 904 may be configured for sidelink communication utilizing, for example, Mode 1.

At 908, the SL Tx UE 902 may generate and transmit a plurality of sidelink CSI-RSs on a plurality of sidelink transmit beams (e.g., beams 910) to the SL Rx UE 904. Each of the sidelink CSI-RSs may be configured by a CSI-RS resource indicating a respective time-frequency resource of the corresponding CSI-RS and a spatial direction of the corresponding sidelink transmit beam 910. Each CSI-RS resource may be identified, for example, by a CSI-RS resource indicator (CRI).

At 912, the SL Rx UE 904 may obtain CSI (e.g., CQI, PMI, RI, LI, L1-RSRP, L1-SINR, etc.) based on the CSI-RS beams and transmit a CSI report to the SL Tx UE 902 including the CSI. Here, the CSI includes at least the PMI and RI. The CSI report may further include the CRI of the measured CSI-RS beams. For example, the SL Rx UE 904 may estimate the channel quality of the sidelink channel between the SL Rx UE 904 and the SL Tx UE 902 using the CSI-RS beams and generate the CSI based on the channel quality. In some examples, the SL Rx UE 904 may measure the SINR of each received CSI-RS and generate the CSI report based on the measured SINR. The CSI report may be transmitted from the SL Rx UE 904 to the SL Tx UE 902 within, for example, a sidelink medium access control-control element (MAC-CE).

At 914 and 916, one or both of the SL Tx UE 902 and the SL Rx UE 904 may forward the CSI report to the RAN entity 906. For example, the SL Tx UE 902 and/or SL Rx UE 904 may forward the CSI report to the RAN entity within a MAC-CE or within uplink control information (UCI).

At 918, the RAN entity 906 may configure sidelink PT-RSs for the Tx UE 902 to send to the Rx UE 904 and generate sidelink PT-RS configuration information based on the CSI report. In some examples, the sidelink PT-RS configuration information may include SL PT-RS port information. The SL PT-RS port information may include a number of PT-RS ports used for transmission of SL PT-RSs by the Tx UE 902 to the SL Rx UE 904 and/or a port association indicating a respective association between each SL PT-RS port and a SL demodulation reference signal (DM-RS) port on the Tx UE 902. In some examples, the number of SL PT-RS ports and/or the port association may be configurable by the RAN entity 906 based on the SL CSI report. For example, the RAN entity 906 may be configured to select the number of SL PT-RS ports based on the SL CSI report (e.g., based on at least one of the PMI or RI). For example, the RAN entity 906 may select the number of SL PT-RS ports based on the number of layers indicated by the RI and/or PMI. In some examples, the number of SL PT-RS ports may be equivalent to the number of layers. In addition, the RAN entity 906 may further determine the port association based on the number of SL PT-RS ports. For example, the RAN entity 906 may access a table of preconfigured mappings between the number of SL PT-RS ports and the port association. As another example, the RAN entity may dynamically select the port association based on the number of SL PT-RS ports.

In some examples, the sidelink PT-RS configuration information may further include SL PT-RS resource element (RE) information. The SL PT-RS RE information may include a time density, frequency density, and/or RE offset of SL PT-RSs transmitted by the SL Tx UE 902 to the SL Rx UE 904. In some examples, the SL PT-RS RE information is the same for both the SL Tx UE 902 and SL Rx UE 904 and may be configured by the RAN entity 906 via RRC signaling prior to the RAN entity 906 receiving the CSI report. In this example, the PT-RS configuration information may not include the PT-RS RE information.

In some examples, the PT-RS configuration information generated by the RAN entity 906 may include the PMI and/or RI instead of the number of SL PT-RS ports and the port association. In this example, the number PT-RS ports and/or the PTRS-DMRS port association may be selected by the SL Tx UE 902 based on the PMI and/or RI, as discussed above. In addition, the PT-RS configuration information may include the PT-RS RE information, along with the PMI and/or RI.

At 920, the RAN entity 906 may transmit the sidelink PT-RS configuration information to the SL Tx UE 902. The sidelink PT-RS configuration information may be transmitted to the SL Tx UE 902 within an RRC message or DCI. In examples in which the sidelink PT-RS configuration information is included within an RRC message, the RRC message may further include a sidelink identifier identifying the sidelink between the SL Tx UE 902 and the SL Rx UE 904 or a device identifier identifying the SL Rx UE 904 (e.g., a destination ID of the Rx UE 904) to differentiate between sidelinks of the SL Tx UE 902 (e.g., when the SL Tx UE 902 is communicating with multiple SL Rx UEs over respective sidelinks) In examples in which the sidelink PT-RS configuration information is included within DCI, the DCI may include DCI format 3_0 to configure the individual sidelink between the SL Tx UE 902 and the SL Rx UE 904.

At 922, the SL Tx UE 902 may transmit a sidelink PT-RS configuration to the SL Rx UE 904. In some examples, the SL Tx UE 902 may extract the sidelink PT-RS configuration from the sidelink PT-RS configuration information received from the RAN entity 906 and transmit the sidelink PT-RS configuration to the SL Rx UE 904. In other examples, the SL Tx UE 902 may utilize the PMI and/or RI included in the sidelink PT-RS configuration information received from the RAN entity 906 to select the number of PT-RS ports and determine the PTRS-DMRS port association. The SL Tx UE 902 may then include the selected number of PT-RS ports and the port association in the sidelink PT-RS configuration transmitted to the SL Rx UE 904. In some examples, the sidelink PT-RS configuration may further include the sidelink PT-RS RE information, as discussed above.

In some examples, the sidelink PT-RS configuration may be transmitted within second stage sidelink control information (SCI) within a data region of a slot (e.g., within the physical sidelink shared channel (PSSCH)). In some examples, the second stage SCI (SCI-2) may be modulated using QPSK, and therefore, the SL Rx UE 904 may be capable of decoding the sidelink PT-RS configuration without compensating for the phase noise.

At 924, the SL Tx UE 902 may transmit sidelink PT-RSs to the SL Rx UE 904 using the sidelink PT-RS configuration. For example, the SL Tx UE 902 may utilize the number of PT-RS ports and PTRS-DMRS port association indicated in the PT-RS configuration to transmit sidelink PT-RSs on sidelink PT-RS ports (e.g., ports 926a and 926b) to the SL Rx UE 904. The SL Tx UE 902 may further utilize the time density, frequency density, and RE offset indicated in the PT-RS configuration to transmit the sidelink PT-RSs to the SL Rx UE 904.

As indicated above, a wireless communication device (e.g., V2X or other D2D device) may schedule sidelink communication (e.g., PC5) by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the size of SCI-2 by indicating an amount of time-frequency resources that are allotted for SCI-2, a number of a PSSCH DMRS port(s), and a modulation and coding scheme (MCS) index. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource. In various aspects of the disclosure, the SCI-2 may further include the SL PT-RS configuration indicating a configurable number of PT-RS ports and a PTRS-DMRS port association.

Figures 10A, 10B:
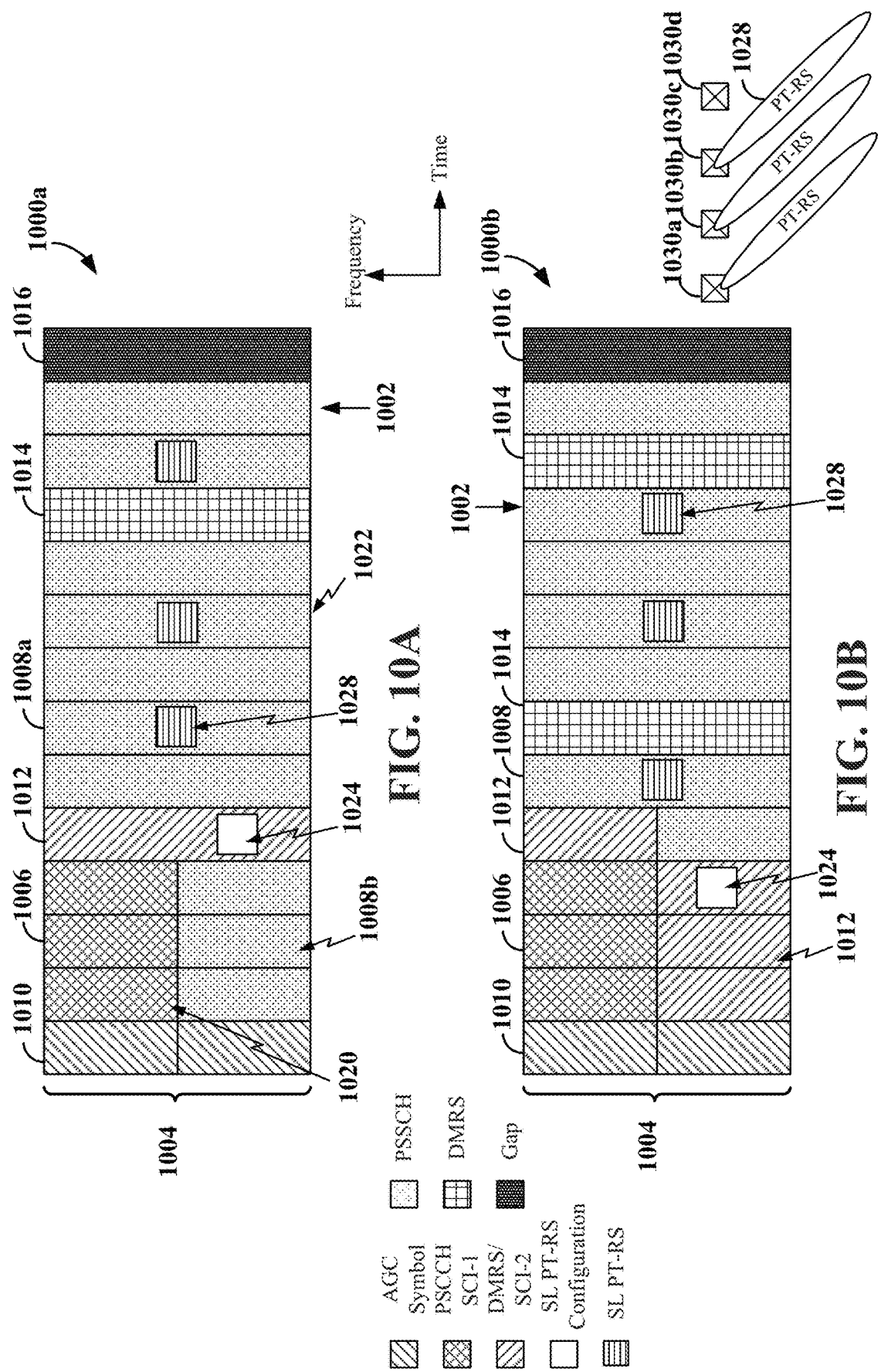
FIGS. 10A and 10B illustrate examples of sidelink slot structures including a PT-RS configuration according to some aspects.

FIGS. 10A and 10B illustrate examples of sidelink slot structures according to some aspects. The sidelink slot structures may be utilized, for example, in a V2X or other D2D network implementing sidelink. In the examples shown in FIGS. 10A and 10B, time is in the horizontal direction with units of symbols 1002 (e.g., OFDM symbols); and frequency is in the vertical direction. Here, a carrier bandwidth 1004 allocated for sidelink communication is illustrated along the frequency axis. The carrier bandwidth 1004 may include a plurality of sub-channels, where each sub-channel may include a configurable number of PRBs (e.g., 10, 15, 20, 25, 50, 75, or 100 PRBs).

Each of FIGS. 10A and 10B illustrate an example of a slot 1000a and 1000b including fourteen symbols 1002 that may be used for sidelink communication. However, it should be understood that sidelink communication can be configured to occupy fewer than fourteen symbols in a slot 1000a and 1000b, and the disclosure is not limited to any particular number of symbols 1002. Each sidelink slot 1000a and 1000b includes a physical sidelink control channel (PSCCH) 1006 occupying a control region 1020 of the slot 1000a and 1000b and a physical sidelink shared channel (PSSCH) 1008 occupying a data region 1022 of the slot 1000a and 1000b. The PSCCH 1006 and PSSCH 1008 are each transmitted on one or more symbols 1002 of the slot 1000a. The PSCCH 1006 includes, for example, SCI-1 that schedules transmission of data traffic on time-frequency resources of the corresponding PSSCH 1008. As shown in FIGS. 10A and 10B, the PSCCH 1006 and corresponding PSSCH 1008 are transmitted in the same slot 1000a and 1000b.

In some examples, the PSCCH 1006 duration is configured to be two or three symbols. In addition, the PSCCH 1006 may be configured to span a configurable number of PRBs, limited to a single sub-channel. For example, the PSCCH 1006 may span 10, 12, 15, 20, or 25 PRBs of a single sub-channel. A DM-RS may further be present in every PSCCH symbol. In some examples, the DM-RS may be placed on every fourth RE of the PSCCH 1006. A frequency domain orthogonal cover code (FD-OCC) may further be applied to the PSCCH DM-RS to reduce the impact of colliding PSCCH transmissions on the sidelink channel. For example, a transmitting wireless communication device may randomly select the FD-OCC from a set of pre-defined FD-OCCs. In each of the examples shown in FIGS. 10A and 10B, the starting symbol for the PSCCH 1006 is the second symbol of the corresponding slot 1000a and 1000b and the PSCCH 1006 spans three symbols 1002.

The PSSCH 1008 may be time-division multiplexed (TDMed) with the PSCCH 1006 and/or frequency-division multiplexed (FDMed) with the PSCCH 1006. In the example shown in FIG. 10A, the PSSCH 1008 includes a first portion 1008a that is TDMed with the PSCCH 1006 and a second portion 1008b that is FDMed with the PSCCH 1006.

One and two layer transmissions of the PSSCH 1008 may be supported with various modulation orders (e.g., QPSK, 16-QAM, 64-QAM and 256-QAM). In addition, the PSSCH 1008 may include DM-RSs 1014 configured in a two, three, or four symbol DM-RS pattern. For example, slot 1000a shown in FIG. 10A illustrates a two symbol DM-RS pattern, while slot 1000b shown in FIG. 10B illustrates a three symbol DM-RS pattern. In some examples, the transmitting wireless communication device can select the DM-RS pattern and indicate the selected DM-RS pattern in SCI-1, according to channel conditions. The DM-RS pattern may be selected, for example, based on the number of PSSCH 1008 symbols in the slot 1000a and 1000b. In addition, a gap symbol 1016 is present after the PSSCH 1008 in each slot 1000a and 1000b.

Each slot 1000a and 1000b further includes SCI-2 1012 mapped to contiguous RBs in the PSSCH 1008 starting from the first symbol containing a PSSCH DM-RS. In the example shown in FIG. 10A, the first symbol containing a PSSCH DM-RS is the fifth symbol occurring immediately after the last symbol carrying the PSCCH 1006. Therefore, the SCI-2 1012 is mapped to RBs within the fifth symbol. In the example shown in FIG. 10B, the first symbol containing a PSSCH DM-RS is the second symbol, which also includes the PSCCH 1006. In addition, the SCI-2/PSSCH DM-RS 1012 are shown spanning symbols two through five. As a result, the SCI-2/PSSCH DM-RS 1012 may be FDMed with the PSCCH 1006 in symbols two through four and TDMed with the PSCCH 1006 in symbol five.

The SCI-2 may be scrambled separately from the sidelink shared channel. In addition, the SCI-2 may utilize QPSK. When the PSSCH transmission spans two layers, the SCI-2 modulation symbols may be copied on both layers. The SCI-1 in the PSCCH 1006 may be blind decoded at the receiving wireless communication device. However, since the format, starting location, and number of REs of the SCI-2 1012 may be derived from the SCI-1, blind decoding of SCI-2 is not needed at the receiver (receiving wireless communication device).

In each of FIGS. 10A and 10B, the second symbol of each slot 1000a and 1000b is copied onto (repeated on) a first symbol 1010 thereof for automatic gain control (AGC) settling. For example, in FIG. 10A, the second symbol containing the PSCCH 1006 FDMed with the PSSCH 1008b may be transmitted on both the first symbol and the second symbol. In the example shown in FIG. 10B, the second symbol containing the PSCCH 1006 FDMed with the SCI-2/PSSCH DMRS 1012 may be transmitted on both the first symbol and the second symbol.

In addition, in each of FIGS. 10A and 10B, the SCI-2 1012 may include a SL PT-RS configuration 1024 of SL PT-RSs 1028 to be transmitted from the transmitting wireless communication device to the receiving wireless communication device for phase noise compensation. The SL PT-RS configuration 1024 may include, for example, PT-RS RE information (e.g., time density, frequency density, and RE offset) and PT-RS port information (e.g., number of PT-RS ports 1030a-1030d and PTRS-DMRS port association). For example, as shown in FIGS. 10A and 10B, the SL PT-RS configuration 1024 may indicate that the SL PT-RSs 1028 may be transmitted on three PT-RS ports 1030a, 1030b, and 1030c within the PSSCH 1008. The PT-RS port information may be configurable by the transmitting wireless communication device and/or a base station, depending on whether Mode 1 or Mode 2 is configured for resource allocation on the sidelink between the transmitting and receiving wireless communication devices, as described above.

Figure 11:
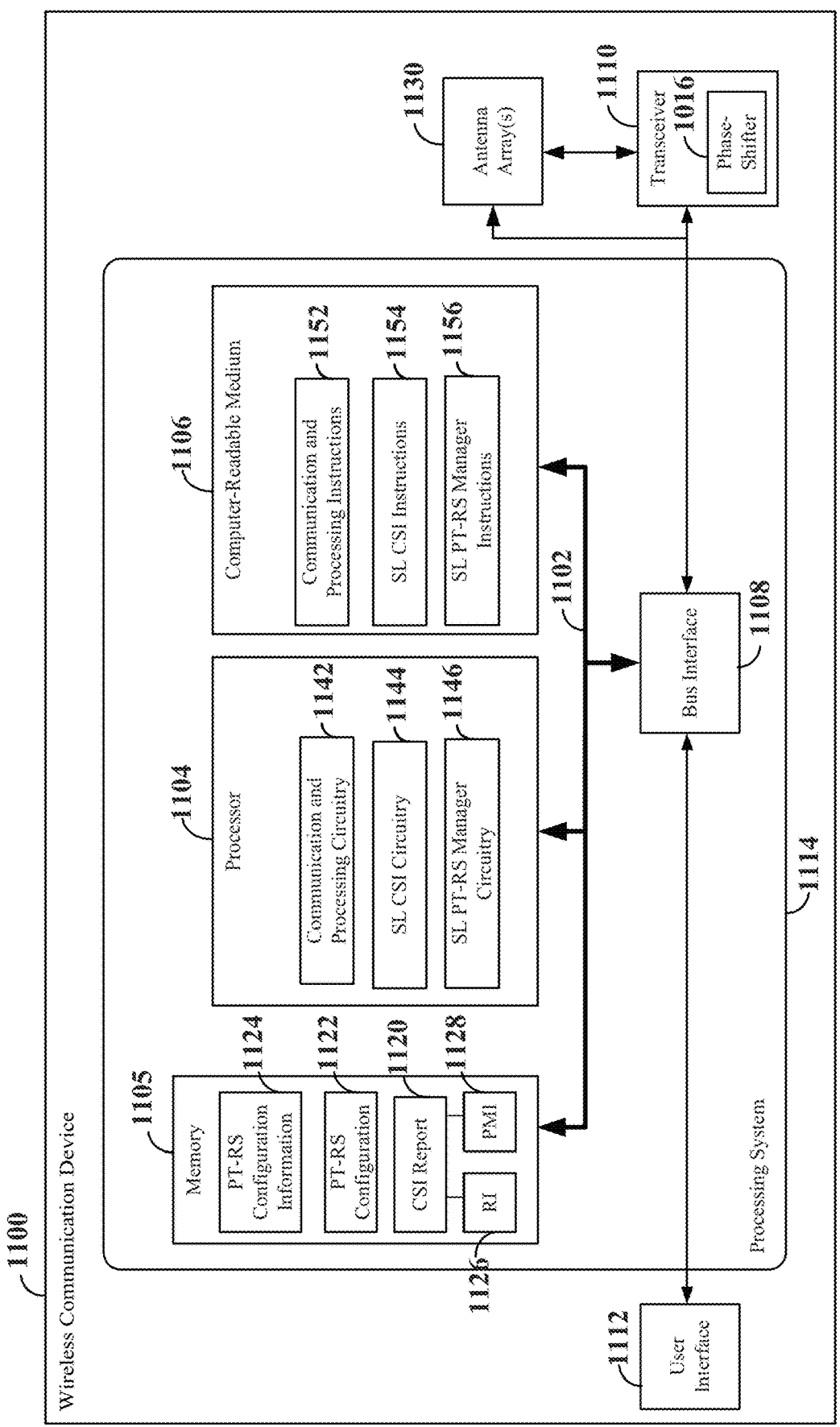
FIG. 11 is a block diagram illustrating an example of a hardware implementation for a wireless communication device employing a processing system according to some aspects.

FIG. 11 is a block diagram illustrating an example of a hardware implementation for a wireless communication device 1100 employing a processing system 1114. For example, the wireless communication device 1100 may correspond to a UE, V2X device, D2D device or other scheduled entity, as shown and described above in reference to FIGS. 1-5, 8 and/or 9. In addition, the wireless communication device 1100 may correspond to a transmitting wireless communication device or a receiving wireless communication on a sidelink.

The wireless communication device 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1100 may be configured to perform any one or more of the functions described herein. That is, the processor 1104, as utilized in the wireless communication device 1100, may be used to implement any one or more of the processes and procedures described below.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further.

A bus interface 1108 provides an interface between the bus 1102 and a transceiver 1110 and one or more antenna arrays 1130 (e.g., one or more antenna panels). The transceiver 1110 provides a means for communicating with various other apparatus over a transmission medium (e.g., air interface). Depending upon the nature of the apparatus, a user interface 1112 (e.g., keypad, display, touch screen, speaker, microphone, control knobs, etc.) may also be provided. Of course, such a user interface 1112 is optional, and may be omitted in some examples.

The processor 1104 is responsible for managing the bus 1102 and general processing, including the execution of software stored on the computer-readable medium 1106. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. In some examples, the computer-readable medium 1106 may be part of the memory 1105. Those skilled in the art will recognize how best to implement the described functionality presented throughout this disclosure depending on the particular application and the overall design constraints imposed on the overall system.

In some aspects of the disclosure, the processor 1104 may include circuitry configured for various functions. For example, the processor 1104 may include communication and processing circuitry 1142, configured to communicate with a RAN entity (e.g., a base station, such as a gNB) via a cellular (e.g., Uu) interface and one or more other wireless communication devices via a sidelink (e.g., PC5) interface. In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1142 may be configured to generate and transmit sidelink reference signals (e.g., sidelink SSB and/or sidelink CSI-RS) on one or more sidelink beams in a beam-sweep manner using the transceiver 1110 and the antenna array(s) 1130 to a receiving wireless communication device. The communication and processing circuitry 1142 may further be configured to receive a CSI report 1120 from the receiving wireless communication device in response to the sidelink reference signals. The CSI report 1120 may include, for example, a channel quality indicator (CQI), rank indicator (RI) 1126, precoding matrix indicator (PMI) 1128, strongest layer indicator (SLI), L1-SINR, and/or L1-RSRP. In some examples, the CSI report 1120 includes at least the PMI and RI. The CSI report 1120 may further be stored, for example, in memory 1105. In some examples, the CSI report 1120 may be received in a sidelink MAC-CE. In addition, when the wireless communication device 1100 is operating in an in-coverage or partial coverage D2D or sidelink environment, such as Mode 1 V2X, the communication and processing circuitry 1142 may further be configured to transmit the received CSI report to the RAN entity. For example, the received CSI report 1120 may be transmitted to the RAN entity within a Uu MAC-CE or UCI.

In some examples, the communication and processing circuitry 1142 may be configured to receive the sidelink reference signals from a transmitting wireless communication device using the transceiver 1110 and antenna array(s) 1130, measure a channel quality of the sidelink between the transmitting wireless communication device and the receiving wireless communication (e.g., by measuring the SINR of each of the sidelink reference signal beams) and to generate and transmit the CSI report 1120 to the transmitting wireless communication device via the transceiver 1110 and antenna array(s) 1130. The CSI report 1120 may be transmitted to the transmitting wireless communication device within, for example, a sidelink MAC-CE. In some examples, the CSI report 1120 includes at least the PMI 1128 and RI 1126. In addition, when the wireless communication device 1100 is operating in an in-coverage or partial coverage D2D or sidelink environment, such as Mode 1 V2X, the communication and processing circuitry 1142 may further be configured to transmit the generated CSI report to the RAN entity. For example, the generated CSI report 1120 may be transmitted to the RAN entity within a Uu MAC-CE or UCI.

The communication and processing circuitry 1142 may further be configured to transmit a sidelink PT-RS configuration 1122 to a receiving wireless communication device via the transceiver 1110 and antenna array(s) 1130. The sidelink PT-RS configuration 1122 may include, for example, SL PT-RS port information and SL PT-RS RE information. The SL PT-RS RE information may include a time density, frequency density, and/or RE offset of SL PT-RSs transmitted by the wireless communication device 1100. The SL PT-RS port information may include a number of PT-RS ports used for transmission of SL PT-RSs by the wireless communication device 1100 and/or a port association indicating a respective association between each SL PT-RS port and a SL demodulation reference signal (DM-RS) port on the wireless communication device. In some examples, the number of SL PT-RS ports and/or the port association may be configurable.

In some examples, the communication and processing circuitry 1142 may be configured to transmit the sidelink PT-RS configuration 1122 within second stage SCI (SCI-2) within a data region of a slot. For example, the communication and processing circuitry 1142 may be configured to transmit a PSCCH including SCI-1 and a PSSCH including SCI-2, one or more DMRS, and sidelink data traffic to a receiving wireless communication device using the transceiver 1110 and the antenna array(s) 1130. Here, the SCI-2 may further include the sidelink PT-RS configuration 1122.

The communication and processing circuitry 1142 may further be configured to transmit one or more sidelink PT-RSs to the receiving wireless communication device based on the sidelink PT-RS configuration 1122. For example, the communication and processing circuitry 1142 may be configured to transmit the one or more PT-RSs having a frequency density, time density, RE offset, number of PT-RS ports and port association indicated by the sidelink PT-RS configuration 1122.

The communication and processing circuitry 1142 may further be configured to receive the sidelink PT-RS configuration 1122 from a transmitting wireless communication device and to store the received sidelink PT-RS configuration 1122 within, for example, the memory 1105. For example, the communication and processing circuitry 1142 may be configured to receive and process the SCI-1, SCI-2 (e.g., including the sidelink PT-RS configuration 1122), and sidelink data traffic from the transmitting wireless communication device using the transceiver 1110 and antenna array(s) 1130. In addition, the communication and processing circuitry 1142 may be configured to receive the one or more PT-RSs from the transmitting wireless communication device based on the sidelink PT-RS configuration 1122.

The communication and processing circuitry 1142 may further be configured to receive sidelink PT-RS configuration information 1124 from the RAN entity and to store the sidelink PT-RS configuration information 1124 within, for example, memory 1105. In some examples, the communication and processing circuitry 1142 may be configured to receive the sidelink PT-RS configuration information 1124 within, for example, an RRC message or DCI. For example, the communication and processing circuitry 1142 may be configured to receive the sidelink PT-RS configuration information 1124 in examples in which the wireless communication device 1100 or the receiving wireless communication device forwarded the CSI report of the receiving wireless communication device to the RAN entity. The communication and processing circuitry 1142 may further be configured to execute communication and processing instructions (software) 1152 stored in the computer-readable medium 1106 to implement one or more of the functions described herein.

The processor 1104 may further include sidelink (SL) CSI circuitry 1144, configured to generate and/or process a CSI report 1120. In some examples, the SL CSI circuitry 1144 may be configured to operate together with the communication and processing circuitry 1142 to generate and transmit a sidelink reference signal (e.g., sidelink CSI-RS) to a receiving wireless communication device. In some examples, the sidelink reference signal may include a plurality of sidelink CSI-RSs, each associated with a different one of a plurality of CSI-RS resources. The SL CSI circuitry 1144 may further be configured to receive and process a sidelink CSI report 1120 from the receiving wireless communication device. In some examples, the received sidelink CSI report may include at least the RI 1126 and PMI 1128. The sidelink CSI report 1120 may be received, for example, within a sidelink MAC-CE. In addition, the SL CSI circuitry 1144 may further be configured to operate together with the communication and processing circuitry 1142 to forward the received CSI report 1120 to the RAN entity via, for example, a Uu MAC-CE or UCI.

The SL CSI circuitry 1144 may further be configured to receive the sidelink reference signal (e.g., sidelink CSI-RS) from a transmitting wireless communication device and to transmit a CSI report 1120 generated from the sidelink reference signal to the transmitting wireless communication device. For example, the SL CSI circuitry 1144 may be configured to receive a plurality of sidelink CSI-RSs from the transmitting wireless communication device, each associated with a different one of a plurality of CSI-RS resources. The SL CSI circuitry 1144 may further be configured to estimate the channel quality of the sidelink channel by measuring the SINR of each received CSI-RS. The SL CSI circuitry 1144 may then generate the CSI report 1120 based on the measured SINR. The CSI report 1120 may include, for example, at least the RI and PMI. The sidelink CSI report 1120 may be transmitted, for example, within a sidelink MAC-CE. In addition, the SL CSI circuitry 1144 may further be configured to operate together with the communication and processing circuitry 1142 to forward the generated CSI report 1120 to the RAN entity via, for example, a Uu MAC-CE or UCI. The SL CSI circuitry 1144 may further be configured to execute SL CSI instructions (software) 1154 stored in the computer-readable medium 1106 to implement one or more of the functions described herein.

The processor 1104 may further include sidelink (SL) PT-RS manager circuitry 1146, configured to manage the configuration and transmission/reception of SL PT-RSs on a sidelink between the wireless communication device 1100 and another wireless communication device. The SL PT-RS manager circuitry 1146 may correspond, for example, to any of the SL PT-RS managers of wireless communication devices illustrated in any one or more of FIGS. 1-5.

In some examples, the SL PT-RS manager circuitry 1146 may be configured to identify the SL PT-RS configuration 1122 including at least a number of PT-RS ports based on the CSI report 1120 received from the other wireless communication device (e.g., the receiving wireless communication device). For example, the SL PT-RS manger circuitry 1146 may be configured to select the number of PT-RS ports based on at least one of the RI 1126 or PMI 1128 included in the CSI report 1120. In some examples, the SL PT-RS configuration 1122 further includes a port association indicating a respective association between each PT-RS port and a corresponding one of a plurality of demodulation reference signal (DM-RS) ports utilized for the sidelink. The SL PT-RS manager circuitry 1146 may further be configured to determine the port association based on the number of PT-RS ports. For example, the SL PT-RS manger circuitry 1146 may access a look-up table of the number of PT-RS ports and the corresponding port association to determine the port association for the SL PT-RS configuration 1122 associated with the receiving wireless communication device. As another example, the SL PT-RS manager circuitry 1146 may dynamically determine the port association for the selected number of PT-RS ports.

In some examples, the SL PT-RS manager circuitry 1146 may further be configured to identify the SL PT-RS configuration including both SL PT-RS port information indicating the number of PT-RS ports and port association and SL PT-RS RE information indicating the time density, frequency density, and RE offset of SL PT-RSs to be communicated to the receiving wireless communication device. In some examples, the SL PT-RS RE information may be pre-configured on the wireless communication device 1100 (e.g., via standards or specifications or via the RAN entity).

In some examples, the SL PT-RS manager circuitry 1146 may further be configured to receive the SL PT-RS configuration information 1124 from the RAN entity. In some examples, the SL PT-RS configuration information 1124 includes at least a portion of the SL PT-RS configuration 1122. For example, the SL PT-RS configuration information 1124 received from the RAN entity may include the number of PT-RS ports and the port association. In other examples, the SL PT-RS configuration information 1124 may include the RI 1126 and PMI 1128 from the CSI report 1120 forwarded to the RAN entity. In this example, the SL PT-RS manager circuitry 1146 may be configured to select the number of PT-RS ports based on at least one of the RI 1126 and PMI 1128 received from the RAN entity and to determine the port association based on the number of PT-RS ports.

In some examples, the SL PT-RS manager circuitry 1146 may operate together with the communication and processing circuitry 1142 to receive the SL PT-RS configuration information 1124 within an RRC message or DCI. The RRC message may further include a sidelink identifier identifying the sidelink between the wireless communication device 1100 and the receiving wireless communication device or a device identifier identifying the receiving wireless communication device.

In some examples, the SL PT-RS manager circuitry 1146 may further be configured to operate together with the communication and processing circuitry 1142 to transmit the SL PT-RS configuration 1122 to the receiving wireless communication device. For example, the SL PT-RS configuration 1122 may be transmitted to the receiving wireless communication device within SCI-2 in a data region of a slot. Here, the transmitted SL PT-RS configuration 1122 includes the PT-RS port information including at least the number of PT-RS ports and the PT-RS RE information.

In some examples, the SL PT-RS manager circuitry 1146 may further be configured to operate together with the communication and processing circuitry 1142 to generate and transmit one or more SL PT-RSs to the receiving wireless communication device using the SL PT-RS configuration 1122. For example, the SL PT-RS manager circuitry 1146 may be configured to generate the SL PT-RSs at a time density, frequency density, RE offset, number of PT-RS ports, and port association indicated by the SL PT-RS configuration 1122.

The SL PT-RS manager circuitry 1146 may further be configured to operate together with the communication and processing circuitry 1142 to receive and store the SL PT-RS configuration 1122 from the transmitting wireless communication device. For example, the SL PT-RS configuration 1122 may include the number of PT-RS ports and port association. The SL PT-RS configuration 1122 may further include the PT-RS RE information. The SL PT-RS configuration 1122 may be received, for example, within SCI-2 in a data region of a slot.

The SL PT-RS manager circuitry 1146 may further be configured to operate together with the communication and processing circuitry 1142 to receive a SL PT-RS from the transmitting wireless communication device based on the SL PT-RS configuration. For example, the SL PT-RS manager circuitry 1146 may be configured to receive the SL PT-RSs at a time density, frequency density, RE offset, number of PT-RS ports, and port association indicated by the SL PT-RS configuration 1122. The SL PT-RS manager circuitry 1146 may further be configured to execute SL PT-RS manager instructions (software) 1156 stored in the computer-readable medium 1106 to implement one or more of the functions described herein.

Figure 12:
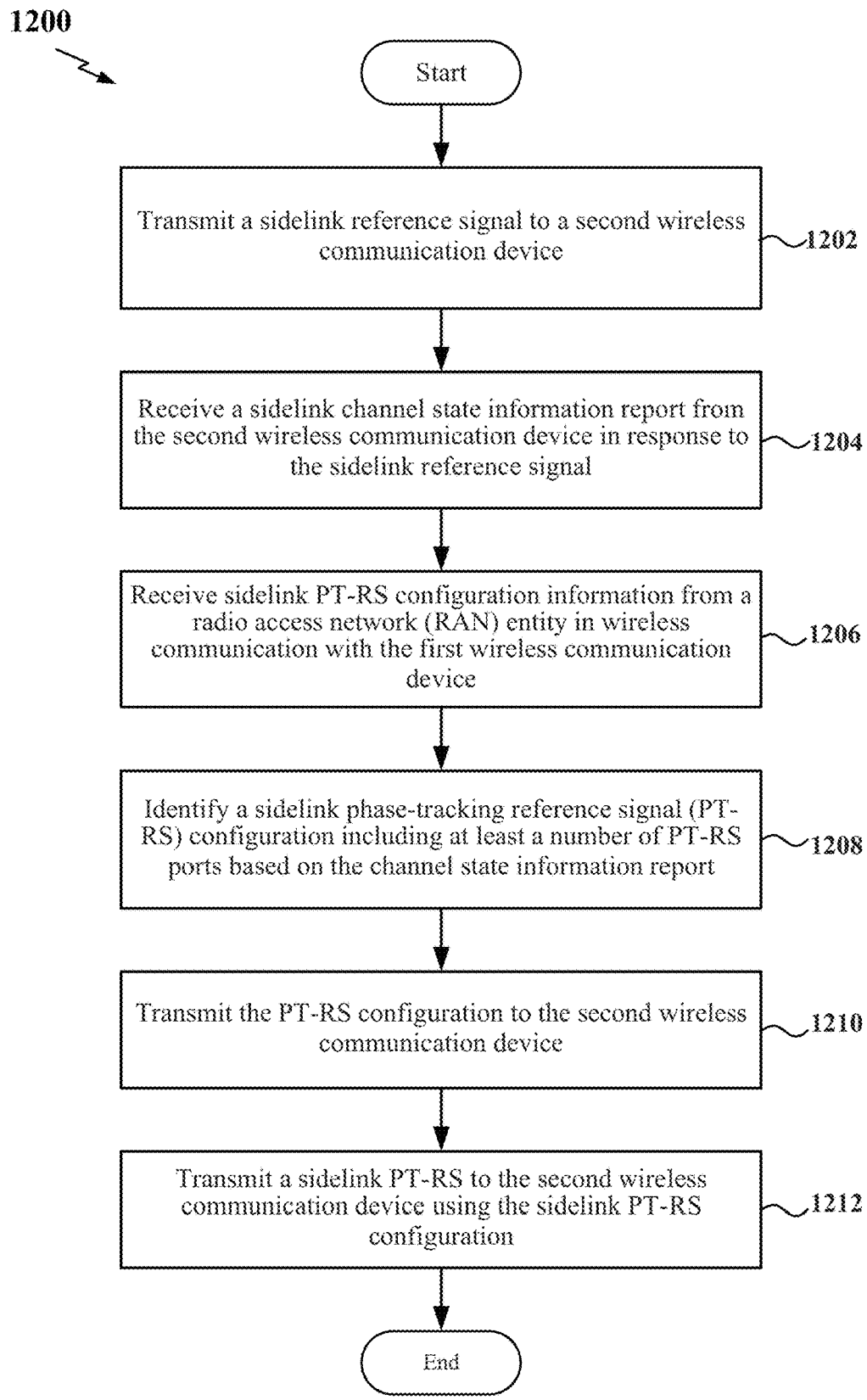
FIG. 12 is a flow chart of an exemplary method for PT-RS configuration in a sidelink network according to some aspects.

FIG. 12 is a flow chart of an exemplary method 1200 for PT-RS configuration in a sidelink network according to some aspects. As described below, some or all illustrated features may be omitted in a particular implementation within the scope of the present disclosure, and some illustrated features may not be required for implementation of all examples. In some examples, the method may be performed by the wireless communication device 1100, as described above and illustrated in FIG. 11, by a processor or processing system, or by any suitable means for carrying out the described functions.

At block 1202, a first wireless communication device may transmit a sidelink reference signal to a second wireless communication device. In some examples, the sidelink reference signal may include a sidelink CSI-RS. In some examples, the first wireless communication device may transmit a plurality of sidelink CSI-RSs, each associated with a different one of a plurality of sidelink CSI-RS resources. For example, the SL CSI circuitry 1144, together with the communication and processing circuitry 1142, transceiver 1110 and antenna array(s) 1130, shown and described above in connection with FIG. 11 may provide a means to transmit the sidelink reference signal to the second wireless communication device.

At block 1204, the first wireless communication device may further receive a sidelink CSI report from the second wireless communication device in response to the sidelink reference signal. In some examples, the sidelink CSI report may include at least a rank indicator (RI) and precoding matrix indicator (PMI). For example, the sidelink CSI circuitry 1144, together with the communication and processing circuitry 1142, transceiver 1110 and antenna array(s) 1130, shown and described above in connection with FIG. 11 may provide a means to receive the sidelink CSI report from the second wireless communication device.

At block 1206, the first wireless communication device may optionally receive sidelink PT-RS configuration information from a radio access network (RAN) entity in wireless communication with the first wireless communication device. In some examples, the sidelink PT-RS configuration information may include a sidelink PT-RS configuration including at least a number of PT-RS ports and a port association indicating a respective association between each PT-RS port and a corresponding one of a plurality of demodulation reference signal (DM-RS) ports. In some examples, the sidelink PT-RS configuration information may include at least one of the RI or the PMI included in the sidelink CSI report generated by the second wireless communication device. In some examples, the first wireless communication device may transmit the sidelink CSI report received from the second wireless communication device to the RAN entity. In some examples, the first wireless communication device may receive the sidelink PT-RS configuration information within an RRC message or DCI. In examples in which the sidelink PT-RS configuration information is included within an RRC message, the RRC message may further include a sidelink identifier identifying a sidelink between the first wireless communication device and the second wireless communication device or a device identifier identifying the second wireless communication device. For example, the SL PT-RS manager circuitry 1146, together with the communication and processing circuitry 1142, transceiver 1110, and antenna array(s) 1130, shown and described above in connection with FIG. 11, may provide a means to receive the sidelink PT-RS configuration information from the RAN entity.

At block 1208, the first wireless communication device may identify a sidelink phase-tracking reference signal (PT-RS) configuration including at least a number of PT-RS ports based on the CSI report. In some examples, the first wireless communication device may select the number of PT-RS ports based on at least one of the RI and PMI. In some examples, the sidelink PT-RS configuration further includes a port association indicating a respective association between each PT-RS port and a corresponding one of a plurality of demodulation reference signal (DM-RS) ports. In this example, the first wireless communication device may determine the port association based on the number of PT-RS ports (e.g., either dynamically or statically via a look-up table).

In some examples, the first wireless communication device may identify the sidelink PT-RS configuration from the sidelink PT-RS configuration information received from the RAN entity. For example, the sidelink PT-RS configuration information may include the sidelink PT-RS configuration including at least the number of PT-RS ports and the port association. As another example, the sidelink PT-RS configuration information may include at least one of the RI and PMI from the CSI report of the second wireless communication device. In this example, the first wireless communication device may select the number of PT-RS ports based on at least one of the RI and PMI included in the sidelink PT-RS configuration information. The first wireless communication device may further determine the port association based on the number of PT-RS ports. For example, the SL PT-RS manager circuitry 1146 shown and described above in connection with FIG. 11 may provide a means to identify the sidelink PT-RS configuration.

At block 1210, the first wireless communication device may transmit the PT-RS configuration to the second wireless communication device. In some examples, the first wireless communication device may transmit the sidelink PT-RS configuration to the second wireless communication device within second stage sidelink control information (SCI) in a data region of a slot. For example, the SL PT-RS manager circuitry 1146, together with the communication and processing circuitry 1142, transceiver 1110, and antenna array(s) 1130, shown and described above in connection with FIG. 11, may provide a means to transmit the sidelink PT-RS configuration to the second wireless communication device.

At block 1212, the first wireless communication device may optionally transmit a sidelink PT-RS to the second wireless communication device using the sidelink PT-RS configuration. For example, the SL PT-RS manager circuitry 1146, together with the communication and processing circuitry 1142, transceiver 1110, and antenna array(s) 1130, shown and described above in connection with FIG. 11, may provide a means to transmit the sidelink PT-RS to the second wireless communication device.

Figure 13:
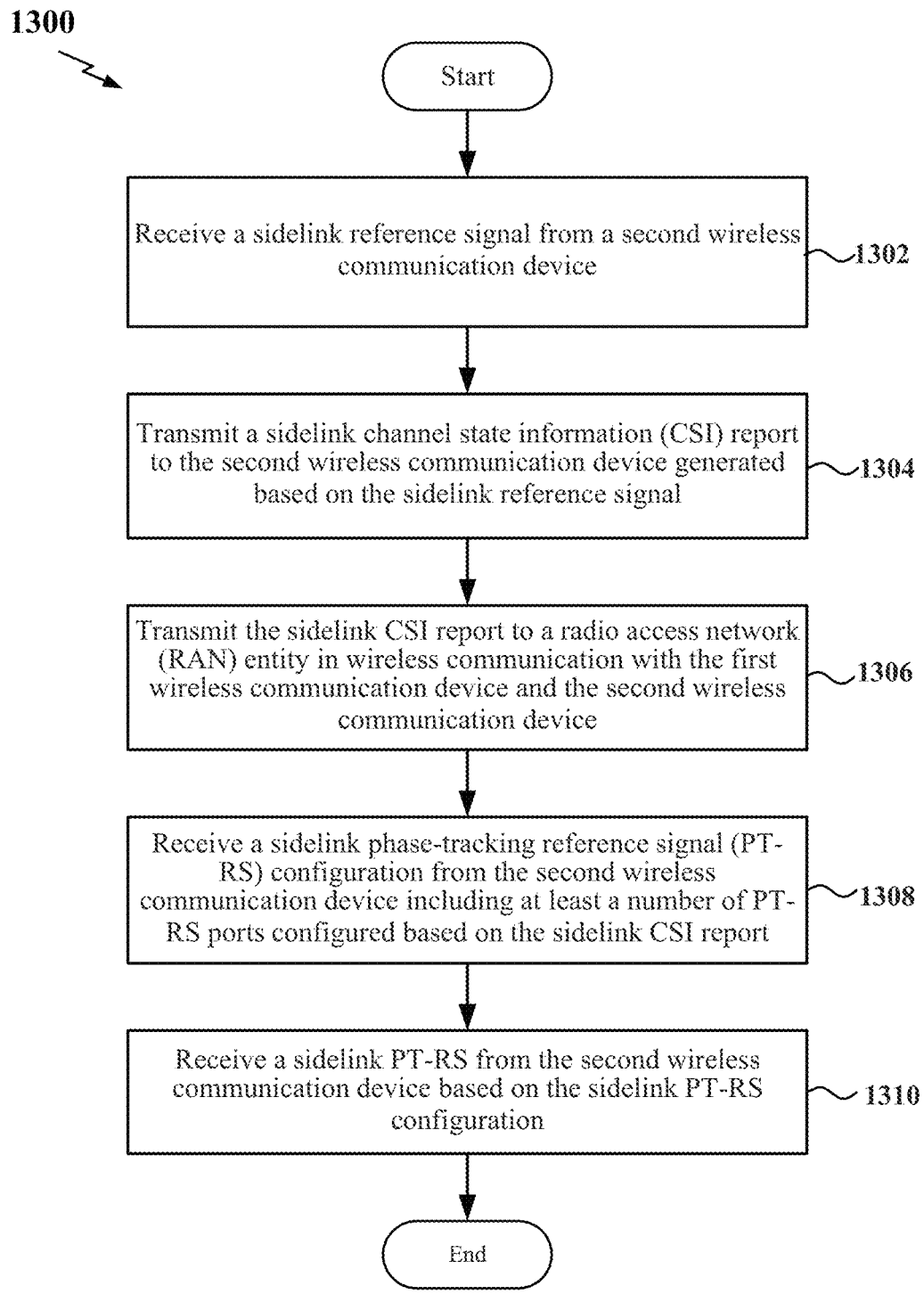
FIG. 13 is a flow chart of another exemplary method for PT-RS configuration in a sidelink network according to some aspects.

FIG. 13 is a flow chart of another exemplary method 1300 for PT-RS configuration in a sidelink network according to some aspects. As described below, some or all illustrated features may be omitted in a particular implementation within the scope of the present disclosure, and some illustrated features may not be required for implementation of all examples. In some examples, the method may be performed by the wireless communication device 1100, as described above and illustrated in FIG. 11, by a processor or processing system, or by any suitable means for carrying out the described functions.

At block 1302, a first wireless communication device may receive a sidelink reference signal from a second wireless communication device. In some examples, the sidelink reference signal may include a sidelink CSI-RS. In some examples, the first wireless communication device may receive a plurality of sidelink CSI-RSs, each associated with a different one of a plurality of sidelink CSI-RS resources. For example, the SL CSI circuitry 1144, together with the communication and processing circuitry 1142, transceiver 1110 and antenna array(s) 1130, shown and described above in connection with FIG. 11 may provide a means to receive the sidelink reference signal from the second wireless communication device.

At block 1304, the first wireless communication device may transmit a sidelink channel state information (CSI) report to the second wireless communication device generated based on the sidelink reference signal. In some examples, the sidelink CSI report may include at least a rank indicator (RI) and precoding matrix indicator (PMI). For example, the sidelink CSI circuitry 1144, together with the communication and processing circuitry 1142, transceiver 1110 and antenna array(s) 1120, shown and described above in connection with FIG. 11 may provide a means to transmit the sidelink CSI report to the second wireless communication device.

At block 1306, the first wireless communication device may optionally transmit the sidelink channel state information report to a radio access network (RAN) entity in wireless communication with the first wireless communication device and the second wireless communication device. For example, the sidelink CSI circuitry 1144, together with the communication and processing circuitry 1142, transceiver 1110 and antenna array(s) 1130, shown and described above in connection with FIG. 11 may provide a means to transmit the sidelink CSI report to the RAN entity.

At block 1308, the first wireless communication device may receive a sidelink phase-tracking reference signal (PT-RS) configuration from the second wireless communication device including at least a number of PT-RS ports configured based on the sidelink CSI report. In some examples, the sidelink PT-RS configuration further includes a port association indicating a respective association between each PT-RS port and a corresponding one of a plurality of demodulation reference signal ports. In some examples, the first wireless communication device may receive the sidelink PT-RS configuration from the second wireless communication device within second stage sidelink control information (SCI) in a data region of a slot. In some examples, the sidelink PT-RS configuration includes PT-RS port information including the number of PT-RS ports and PT-RS resource element information. For example, the sidelink CSI circuitry 1144, together with the communication and processing circuitry 1142, transceiver 1110 and antenna array(s) 1130, shown and described above in connection with FIG. 11 may provide a means to receive the sidelink PT-RS configuration from the second wireless communication device.

At block 1310, the first wireless communication device may optionally receive a sidelink PT-RS from the second wireless communication device based on the sidelink PT-RS configuration. For example, the sidelink CSI circuitry 1144, together with the communication and processing circuitry 1142, transceiver 1110 and antenna array(s) 1130, shown and described above in connection with FIG. 11 may provide a means to receive the sidelink PT-RS from the second wireless communication device.

In one configuration, the wireless communication device 1100 includes means for PT-RS configuration in a sidelink network as described in the present disclosure. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1-5, 8, and/or 9, and utilizing, for example, the processes and/or algorithms described herein in relation to FIGS. 12 and 13.

Figure 14:
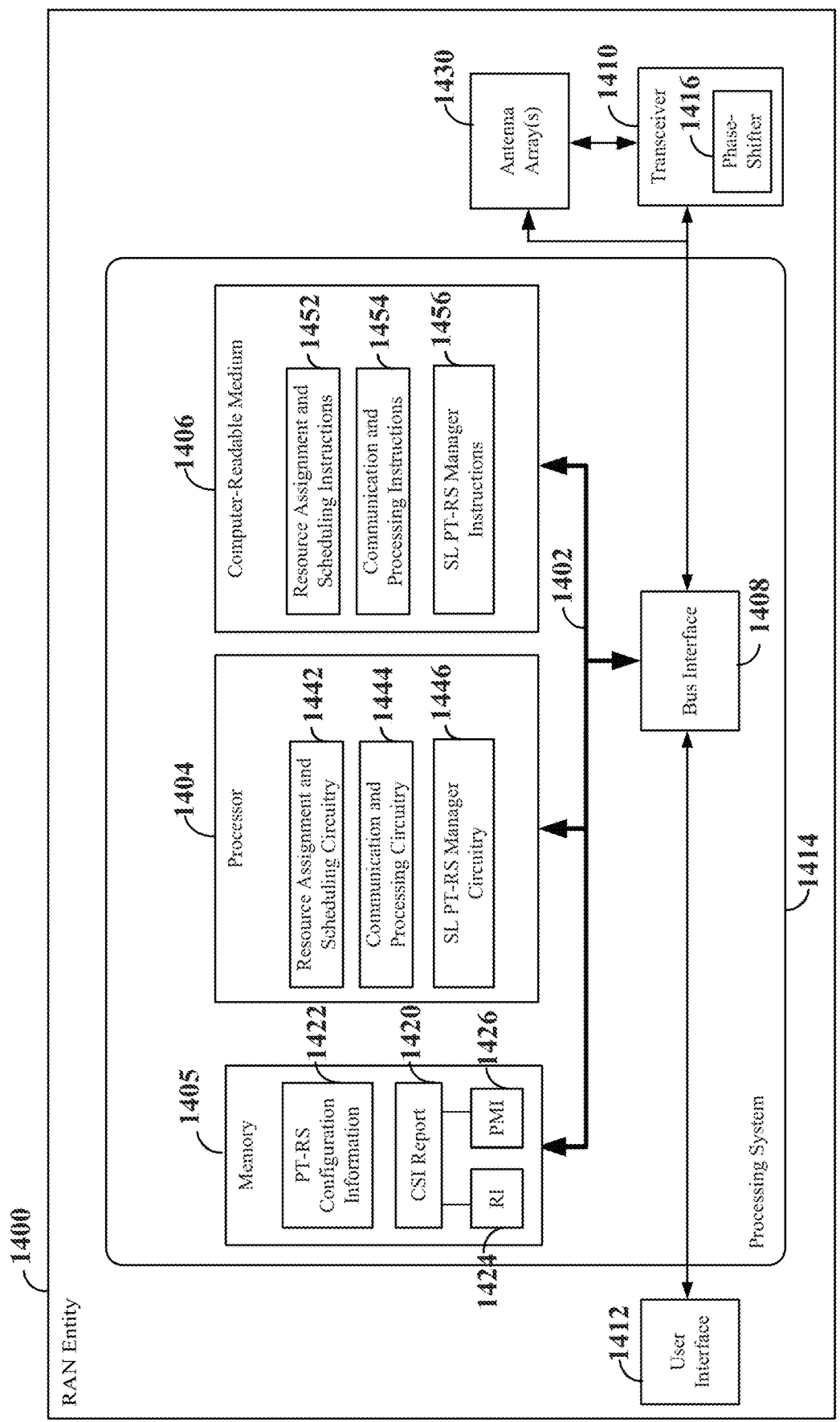
FIG. 14 is a block diagram illustrating an example of a hardware implementation for a radio access network (RAN) entity employing a processing system according to some aspects.

FIG. 14 is a conceptual diagram illustrating an example of a hardware implementation for an exemplary radio access network (RAN) entity 1400 employing a processing system 1414. For example, the RAN entity 1400 may correspond to any of the base stations (e.g., gNBs) or other scheduling entities illustrated in any one or more of FIGS. 1-5, and/or 9.

In accordance with various aspects of the disclosure, an element, or any portion of an element, or any combination of elements may be implemented with a processing system 1414 that includes one or more processors 1404. The processing system 1414 may be substantially the same as the processing system 1114 illustrated in FIG. 11, including a bus interface 1408, a bus 1402, memory 1405, a processor 1404, and a computer-readable medium 1406. Furthermore, the RAN entity 1400 may include an optional user interface 1412 and a transceiver 1410 substantially similar to those described above in FIG. 11. In some examples, the transceiver 1410 may include a phase-shifter 1416 for digital and/or analog beamforming via one or more antenna array(s) 1430. The processor 1404, as utilized in a RAN entity 1400, may be used to implement any one or more of the processes described below.

In some aspects of the disclosure, the processor 1404 may include circuitry configured for various functions. For example, the processor 1404 may include resource assignment and scheduling circuitry 1442, configured to generate, schedule, and modify a resource assignment or grant of time-frequency resources (e.g., a set of one or more resource elements). For example, the resource assignment and scheduling circuitry 1442 may schedule time-frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 1442 may be configured to schedule resources for the transmission of a sidelink channel state information (CSI) report 1420 from a wireless communication device in wireless communication with another wireless communication device over a sidelink. For example, the resource assignment and scheduling circuitry 1442 may schedule resources for the transmission of the sidelink CSI report 1420 from a first wireless communication device that received the sidelink CSI report 1420 from a second wireless communication device or resources for the transmission of the CSI report directly from the second wireless communication device. In some examples, the resources may correspond to resources scheduled for a Uu MAC-CE or UCI carrying the sidelink CSI report 1420.

The resource assignment and scheduling circuitry 1442 may further be configured to schedule resources for the transmission of sidelink PT-RS configuration information 1422 to the first wireless communication device. The sidelink PT-RS configuration information may indicate a sidelink PT-RS configuration for the first wireless communication device including at least a number of PT-RS ports to be utilized by the first wireless communication device in transmitting one or more PT-RSs to the second wireless communication device over the sidelink therebetween. In some examples, the resources may correspond to resources scheduled for an RRC message or DCI carrying the sidelink PT-RS configuration information.

The resource assignment and scheduling circuitry 1442 may further be configured to allocate resources to the first and second wireless communication devices for sidelink communication therebetween when the first and second wireless communication devices are configured for Mode 1 sidelink communication. For example, the resource assignment and scheduling circuitry 1442 may be configured to allocate sidelink resources dynamically (e.g., a dynamic grant) to the first and second wireless communication devices, in response to requests for sidelink resources from the wireless communication devices. The resource assignment and scheduling circuitry 1442 may further be configured to activate preconfigured sidelink grants (e.g., configured grants) for sidelink communication among the wireless communication devices. The resource assignment and scheduling circuitry 1442 may further be configured to schedule resources for the communication of sidelink feedback reported from the wireless communication devices back to the RAN entity 1400. The resource assignment and scheduling circuitry 1442 may further be configured to execute resource assignment and scheduling instructions (software) 1452 stored in the computer-readable medium 1406 to implement one or more of the functions described herein.

The processor 1404 may further include communication and processing circuitry 1444, configured to communicate with the first and second wireless communication devices. For example, the first and second wireless communication devices may communicate using a Mode 1 sidelink configuration in which resources for sidelink communication may be scheduled by the resource assignment and scheduling circuitry 1442. In some examples, the communication and processing circuitry 1444 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1444 may be configured to receive and process uplink beamformed signals at a mmWave frequency or a sub-6 GHz frequency via the transceiver 1410 and the antenna array 1430 (e.g., using the phase-shifter 1416). In addition, the communication and processing circuitry 1444 may be configured to generate and transmit uplink beamformed signals at a mmWave frequency or a sub-6 GHz frequency via the transceiver 1410 and antenna array 1430 (e.g., using the phase-shifter 1416).

The communication and processing circuitry 1444 may further be configured to receive the sidelink CSI report 1420 from the first or second wireless communication device and to store the sidelink CSI report 1420 within, for example, memory 1405 for subsequent processing. For example, the communication and processing circuitry 1444 may be configured to receive the sidelink CSI report from the first wireless communication device (e.g., the wireless communication device to which the sidelink PT-RS configuration information is transmitted) within a MAC-CE or UCI. As another example, the communication and processing circuitry 1444 may be configured to receive the sidelink CSI report from the second wireless communication device (e.g., the wireless communication device that generated the sidelink CSI report) within a MAC-CE or UCI.

The communication and processing circuitry 1444 may further be configured to transmit the sidelink PT-RS configuration information 1422 to the first wireless communication device. In some examples, the communication and processing circuitry 1444 may be configured to transmit the sidelink PT-RS configuration information 1422 to the first wireless communication device within an RRC message or DCI. In examples in which the sidelink PT-RS configuration information 1422 is transmitted within an RRC message, the RRC message may further include a sidelink indicator identifying the sidelink between the first wireless communication device and the second wireless communication device or a device identifier identifying the second wireless communication device. The communication and processing circuitry 1444 may further be configured to execute communication and processing instructions (software) 1454 stored in the computer-readable medium 1406 to implement one or more of the functions described herein.

The processor 1404 may further include sidelink (SL) PT-RS manager circuitry 1446, configured to manage the configuration and transmission/reception of SL PT-RSs on the sidelink between the first and second wireless communication devices. The SL PT-RS manager circuitry 1446 may correspond, for example, to any of the SL PT-RS managers of RAN entities shown in any one or more of FIGS. 1-5.

The SL PT-RS manager circuitry 1446 may be configured to generate the SL PT-RS configuration information 1422 for the first wireless communication device based on the received sidelink CSI report 1420 indicating the channel quality of the sidelink channel between the first and second wireless communication devices. The SL PT-RS configuration information 1422 may indicate, for example, a sidelink PT-RS configuration for the first wireless communication device including at least a number of PT-RS ports.

In some examples, the SL PT-RS manager circuitry 1446 may be configured to generate the SL PT-RS configuration information 1422 including the SL PT-RS configuration. The SL PT-RS manager circuitry 1446 may be configured to select the number of PT-RS ports based on the sidelink CSI report. For example, the sidelink CSI report 1420 may include at least the RI 1424 and PMI 1426, and the SL PT-RS manager circuitry 1446 may be configured to select the number of PT-RS ports based on at least one of the RI 1424 or PMI 1426. In some examples, the sidelink PT-RS configuration further includes a port association indicating a respective association between each PT-RS port and a corresponding one of a plurality of demodulation reference signal ports. The SL PT-RS manager circuitry 1446 may further be configured to determine the port association based on the number of PT-RS ports (e.g., either dynamically or statically via a table look-up).

In some examples, the SL PT-RS manager circuitry 1446 may be configured to generate the SL PT-RS configuration information 1422 including at least one of the RI 1424 or PMI 1426. In this example, the first wireless communication device may select the number of PT-RS ports and determine the port associated based on the RI 1424 and/or PMI 1426 included in the SL PT-RS configuration information 1422, as described above.

Figure 15:
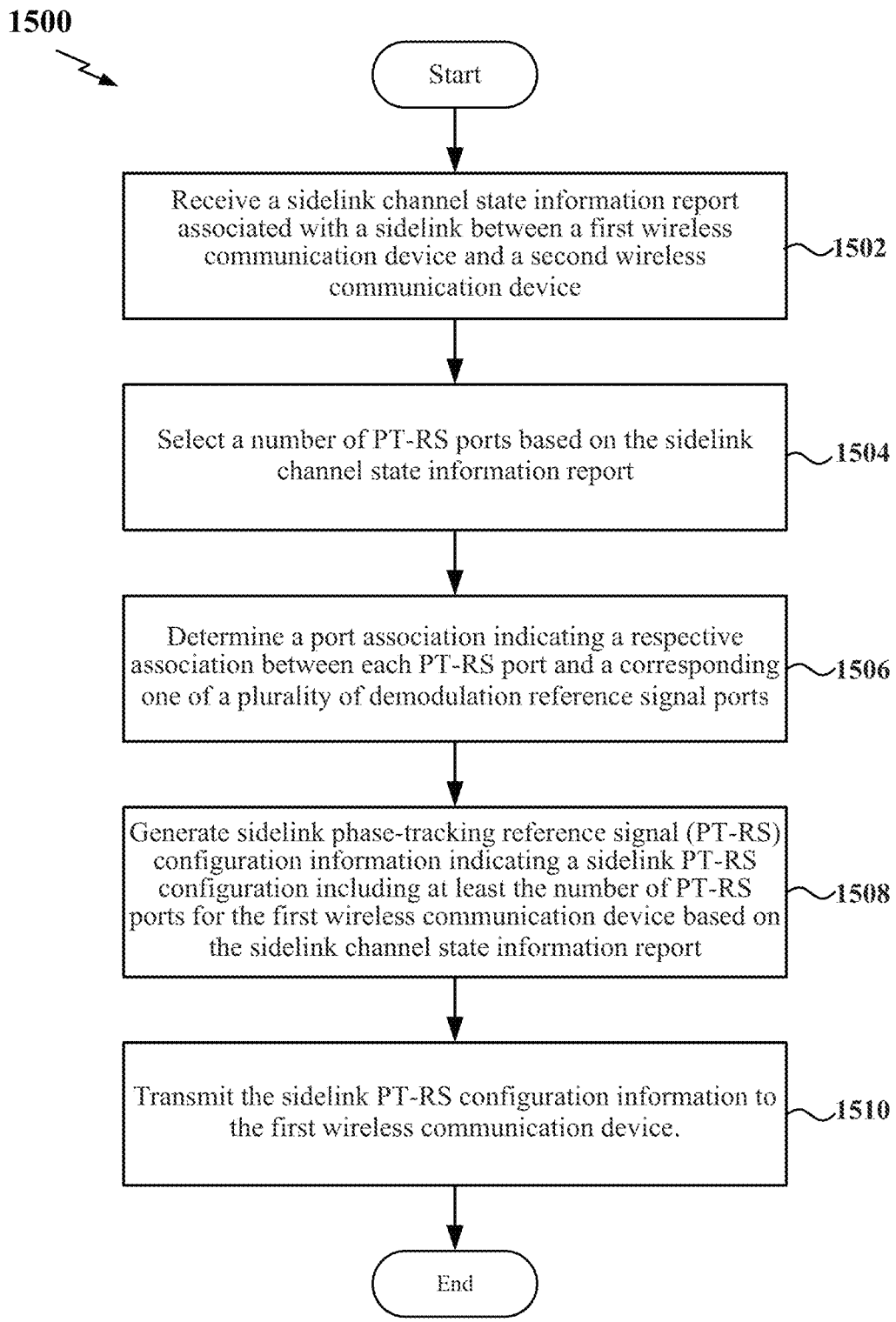
FIG. 15 is a flow chart of another exemplary method for PT-RS configuration in a sidelink network according to some aspects.

In some examples, the SL PT-RS manager circuitry 1446 may further operate together with the communication and processing circuitry 1444 to transmit the SL PT-RS configuration information 1422 to the first wireless communication device. For example, the SL PT-RS manager circuitry 1446 may be configured to transmit the SL PT-RS configuration information 1422 within an RRC message or DCI. In examples in which the SL PT-RS configuration information 1422 is transmitted within an RRC message, the SL PT-RS manager circuitry 1446 may further be configured to include the sidelink indicator or device identifier of the second wireless communication device in the RRC message. The SL PT-RS manager circuitry 1446 may further be configured to execute SL PT-RS manager instructions (software) 1456 stored in the computer-readable medium 1406 to implement one or more of the functions described herein FIG. 15 is a flow chart of another exemplary method 1500 for PT-RS configuration in a sidelink network according to some aspects. As described below, some or all illustrated features may be omitted in a particular implementation within the scope of the present disclosure, and some illustrated features may not be required for implementation of all examples. In some examples, the method may be performed by the RAN entity 1400, as described above and illustrated in FIG. 14, by a processor or processing system, or by any suitable means for carrying out the described functions.

At block 1502, the RAN entity may receive a sidelink channel state information (CSI) report associated with a sidelink between a first wireless communication device and a second wireless communication device. In some examples, the RAN entity may receive the sidelink CSI report from the first wireless communication in a MAC-CE or UCI. In some examples, the RAN entity may receive the sidelink CSI report from the second wireless communication device in a MAC-CE or UCI. For example, the communication and processing circuitry 1444, together with the transceiver 1410 and antenna array(s) 1430, shown and described above in connection with FIG. 14 may provide a means to receive the sidelink CSI report.

At block 1504, the RAN entity may optionally select a number of PT-RS ports of a SL PT-RS configuration for the first wireless communication device based on the sidelink CSI report. In some examples, the sidelink CSI report includes at least a rank indicator (RI) and precoding matrix indicator (PMI) and the number of PT-RS ports is selected based on at least one of the RI and PMI. For example, the SL PT-RS manager circuitry 1446 shown and described above in connection with FIG. 14 may provide a means to select the number of PT-RS ports.

At block 1506, the RAN entity may optionally determine a port association indicating a respective association between each PT-RS port and a corresponding one of a plurality of demodulation reference signal (DM-RS) ports. In some examples, the port association may be determined based on the number of PT-RS ports. For example, the SL PT-RS manager circuitry 1446 shown and described above in connection with FIG. 14 may provide a means to determine the port association.

At block 1508, the RAN entity may generate sidelink phase-tracking reference signal (PT-RS) configuration information indicating a sidelink PT-RS configuration including at least the number of PT-RS ports for the first wireless communication device based on the sidelink CSI report. In some examples, the sidelink PT-RS configuration information includes the sidelink PT-RS configuration. For example, the sidelink PT-RS configuration may include the number of PT-RS ports and the port association, as determined in blocks 1504 and 1506. In other examples, the sidelink PT-RS configuration information may include at least one of the RI and PMI from the CSI report. For example, the SL PT-RS manager circuitry 1446 shown and described above in connection with FIG. 14 may generate the sidelink PT-RS configuration information.

At block 1510, the RAN entity may transmit the sidelink PT-RS configuration information to the first wireless communication device. In some examples, the RAN entity may transmit the sidelink PT-RS configuration information to the first wireless communication device within an RRC message or DCI. In examples in which the sidelink PT-RS configuration information is transmitted within the RRC message, the RAN entity may further include a sidelink indicator identifying the sidelink between the first wireless communication device and the second wireless communication device or a device identifier identifying the second wireless communication device in the RRC message. For example, the SL PT-RS manager circuitry 1446, together with the communication and processing circuitry 1444, transceiver 1410, and antenna array(s) 1430, shown and described above in connection with FIG. 14, may provide a means to transmit the sidelink PT-RS configuration information to the first wireless communication device.

In one configuration, the RAN entity 1400 includes means for PT-RS configuration in a sidelink network as described in the present disclosure. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1-5, and/or 9, and utilizing, for example, the processes and/or algorithms described herein in relation to FIG. 15.

Figure 16:
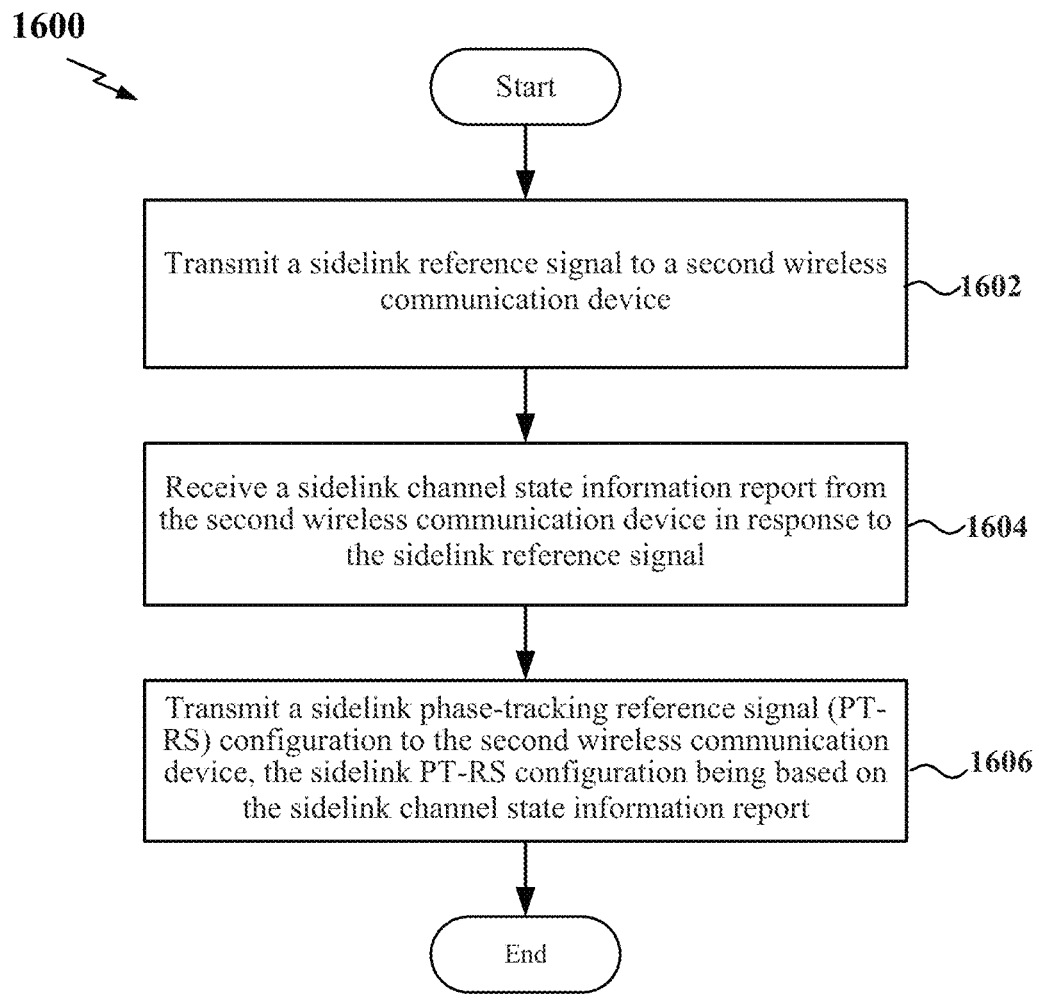
FIG. 16 is a flow chart of another exemplary method for PT-RS configuration in a sidelink network according to some aspects.

FIG. 16 is a flow chart of an exemplary method 1600 for PT-RS configuration in a sidelink network according to some aspects. As described below, some or all illustrated features may be omitted in a particular implementation within the scope of the present disclosure, and some illustrated features may not be required for implementation of all examples. In some examples, the method may be performed by the wireless communication device 1100, as described above and illustrated in FIG. 11, by a processor or processing system, or by any suitable means for carrying out the described functions.

At block 1602, a first wireless communication device may transmit a sidelink reference signal to a second wireless communication device. In some examples, the sidelink reference signal may include a sidelink CSI-RS. In some examples, the first wireless communication device may transmit a plurality of sidelink CSI-RSs, each associated with a different one of a plurality of sidelink CSI-RS resources. For example, the SL CSI circuitry 1144, together with the communication and processing circuitry 1142, transceiver 1110 and antenna array(s) 1130, shown and described above in connection with FIG. 11 may provide a means to transmit the sidelink reference signal to the second wireless communication device.

At block 1604, the first wireless communication device may further receive a sidelink CSI report from the second wireless communication device in response to the sidelink reference signal. In some examples, the sidelink CSI report may include at least a rank indicator (RI) and precoding matrix indicator (PMI). For example, the sidelink CSI circuitry 1144, together with the communication and processing circuitry 1142, transceiver 1110 and antenna array(s) 1130, shown and described above in connection with FIG. 11 may provide a means to receive the sidelink CSI report from the second wireless communication device.

At block 1606, the first wireless communication device may transmit a sidelink phase-tracking reference signal (PT-RS) configuration to the second wireless communication device, the sidelink PT-RS configuration being based on the sidelink channel state information report. In some examples, the sidelink PT-RS configuration comprises at least an indication of a number of PT-RS ports, the number of PT-RS ports being based on the sidelink channel state information report. In some examples, the first wireless communication device may select the number of PT-RS ports based on at least one of the RI or the PMI. In some examples, the sidelink PT-RS configuration further comprises a port association indicating a respective association between each PT-RS port and a corresponding one of a plurality of demodulation reference signal ports. In this example, the first wireless communication device may determine the port association based on the number of PT-RS ports.

In some examples, the first wireless communication device may receive sidelink PT-RS configuration information from a radio access network (RAN) entity in wireless communication with the first wireless communication device. In some examples, the sidelink PT-RS configuration information may include a sidelink PT-RS configuration including at least the number of PT-RS ports and a port association indicating a respective association between each PT-RS port and a corresponding one of a plurality of demodulation reference signal (DM-RS) ports. In some examples, the sidelink PT-RS configuration information may include at least one of the RI or the PMI included in the sidelink CSI report generated by the second wireless communication device. In some examples, the first wireless communication device may transmit the sidelink CSI report received from the second wireless communication device to the RAN entity. In some examples, the first wireless communication device may select the number of PT-RS ports based on at least one of the RI or the PMI. In addition, the first wireless communication device may determine a port association indicating a respective association between each PT-RS port and a corresponding one of a plurality of demodulation reference signal ports based on the number of PT-RS ports.

In some examples, the first wireless communication device may receive the sidelink PT-RS configuration information within an RRC message or DCI. In examples in which the sidelink PT-RS configuration information is included within an RRC message, the RRC message may further include a sidelink identifier identifying a sidelink between the first wireless communication device and the second wireless communication device or a device identifier identifying the second wireless communication device. In some examples, the first wireless communication device may transmit the sidelink PT-RS configuration to the second wireless communication device within second stage sidelink control information (SCI) in a data region of a slot. In some examples, the sidelink PT-RS configuration includes PT-RS port information including the number of PT-RS ports and PT-RS resource element information. In some examples, the first wireless communication device may further transmit a sidelink PT-RS to the second wireless communication device using the sidelink PT-RS configuration. For example, the SL PT-RS manager circuitry 1146, together with the communication and processing circuitry 1142, transceiver 1110, and antenna array(s) 1130, shown and described above in connection with FIG. 11, may provide a means to transmit the sidelink PT-RS configuration to the second wireless communication device.

Figure 17:
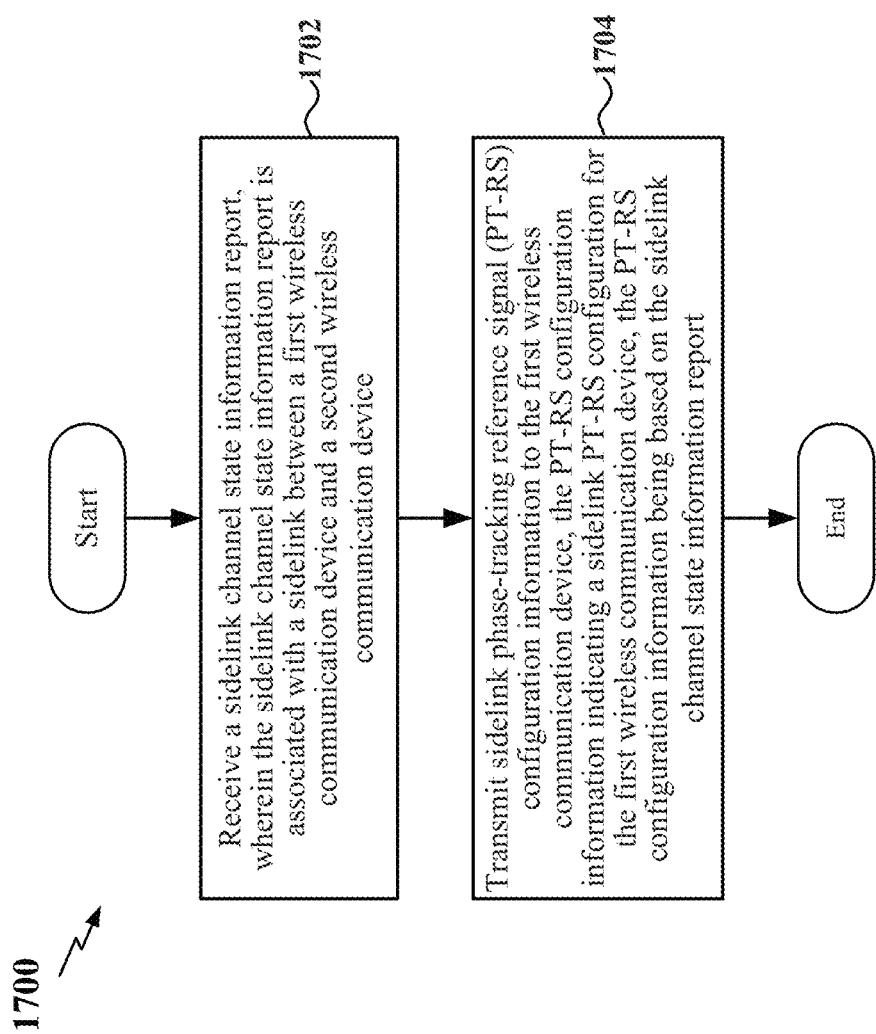
FIG. 17 is a flow chart of another exemplary method for PT-RS configuration in a sidelink network according to some aspects.

FIG. 17 is a flow chart of another exemplary method 1700 for PT-RS configuration in a sidelink network according to some aspects. As described below, some or all illustrated features may be omitted in a particular implementation within the scope of the present disclosure, and some illustrated features may not be required for implementation of all examples. In some examples, the method may be performed by the RAN entity 1400, as described above and illustrated in FIG. 14, by a processor or processing system, or by any suitable means for carrying out the described functions.

At block 1702, the RAN entity may receive a sidelink channel state information (CSI) report associated with a sidelink between a first wireless communication device and a second wireless communication device. In some examples, the RAN entity may receive the sidelink CSI report from the first wireless communication in a MAC-CE or UCI. In some examples, the RAN entity may receive the sidelink CSI report from the second wireless communication device in a MAC-CE or UCI. In some examples, the sidelink channel state information report comprises at least a rank indicator (RI) and a precoding matrix indicator (PMI). For example, the communication and processing circuitry 1444, together with the transceiver 1410 and antenna array(s) 1430, shown and described above in connection with FIG. 14 may provide a means to receive the sidelink CSI report.

At block 1704, the RAN entity may transmit sidelink phase-tracking reference signal (PT-RS) configuration information to the first wireless communication device, the PT-RS configuration information indicating a sidelink PT-RS configuration for the first wireless communication device, the PT-RS configuration information being based on the sidelink channel state information report. In some examples, the sidelink PT-RS configuration information includes the sidelink PT-RS configuration and the sidelink PT-RS configuration includes at least an indication of a number of PT-RS ports. In some examples, the RAN entity may select the number of PT-RS ports based on the sidelink channel state information report. In some examples, the RAN entity may select the number of PT-RS ports based on at least one of the RI or the PMI. In some examples, the RAN entity may optionally determine a port association indicating a respective association between each PT-RS port and a corresponding one of a plurality of demodulation reference signal (DM-RS) ports. In some examples, the port association may be determined based on the number of PT-RS ports.

In some examples, the sidelink PT-RS configuration information includes at least one of the RI or the PMI. In some examples, the RAN entity may transmit the sidelink PT-RS configuration information to the first wireless communication device within an RRC message or DCI. In examples in which the sidelink PT-RS configuration information is transmitted within the RRC message, the RAN entity may further include a sidelink indicator identifying the sidelink between the first wireless communication device and the second wireless communication device or a device identifier identifying the second wireless communication device in the RRC message. For example, the SL PT-RS manager circuitry 1446, together with the communication and processing circuitry 1444, transceiver 1410, and antenna array(s) 1430, shown and described above in connection with FIG. 14, may provide a means to transmit the sidelink PT-RS configuration information to the first wireless communication device.

Figure 18:
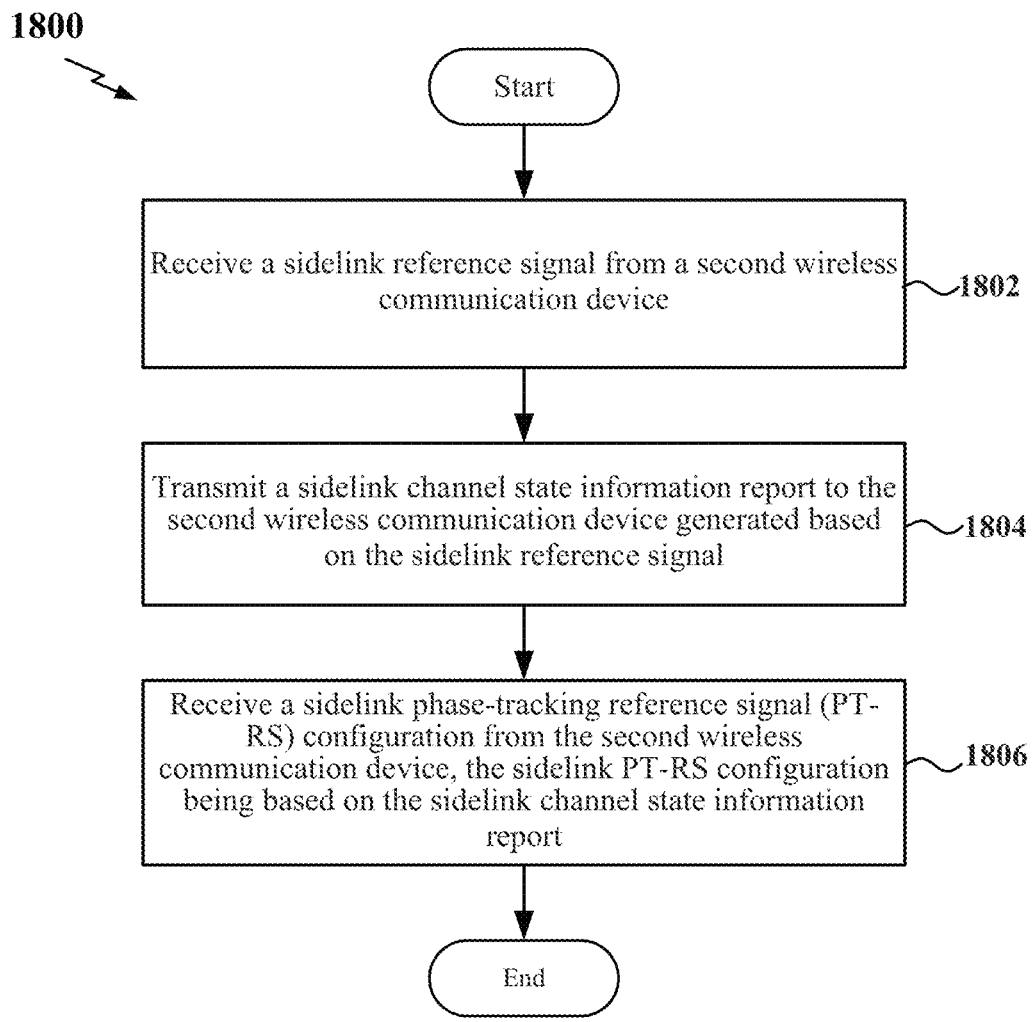
FIG. 18 is a flow chart of another exemplary method for PT-RS configuration in a sidelink network according to some aspects.

FIG. 18 is a flow chart of another exemplary method 1800 for PT-RS configuration in a sidelink network according to some aspects. As described below, some or all illustrated features may be omitted in a particular implementation within the scope of the present disclosure, and some illustrated features may not be required for implementation of all examples. In some examples, the method may be performed by the wireless communication device 1100, as described above and illustrated in FIG. 11, by a processor or processing system, or by any suitable means for carrying out the described functions.

At block 1802, a first wireless communication device may receive a sidelink reference signal from a second wireless communication device. In some examples, the sidelink reference signal may include a sidelink CSI-RS. In some examples, the first wireless communication device may receive a plurality of sidelink CSI-RSs, each associated with a different one of a plurality of sidelink CSI-RS resources. For example, the SL CSI circuitry 1144, together with the communication and processing circuitry 1142, transceiver 1110 and antenna array(s) 1130, shown and described above in connection with FIG. 11 may provide a means to receive the sidelink reference signal from the second wireless communication device.

At block 1804, the first wireless communication device may transmit a sidelink channel state information (CSI) report to the second wireless communication device generated based on the sidelink reference signal. In some examples, the sidelink CSI report may include at least a rank indicator (RI) and precoding matrix indicator (PMI). In some examples, the first wireless communication device may further transmit the sidelink channel state information report to a radio access network (RAN) entity in wireless communication with the first wireless communication device and the second wireless communication device. For example, the sidelink CSI circuitry 1144, together with the communication and processing circuitry 1142, transceiver 1110 and antenna array(s) 1120, shown and described above in connection with FIG. 11 may provide a means to transmit the sidelink CSI report to the second wireless communication device.

At block 1806, the first wireless communication device may receive a sidelink phase-tracking reference signal (PT-RS) configuration from the second wireless communication device, the sidelink PT-RS configuration being based on the sidelink channel state information report. In some examples, the sidelink PT-RS configuration includes an indication of a number of PT-RS ports and a port association indicating a respective association between each PT-RS port and a corresponding one of a plurality of demodulation reference signal ports. In some examples, the first wireless communication device may receive the sidelink PT-RS configuration from the second wireless communication device within second stage sidelink control information (SCI) in a data region of a slot. In some examples, the sidelink PT-RS configuration includes PT-RS port information including the number of PT-RS ports and PT-RS resource element information. In some examples, the first wireless communication device may further receive a sidelink PT-RS from the second wireless communication device based on the sidelink PT-RS configuration. For example, the sidelink CSI circuitry 1144, together with the communication and processing circuitry 1142, transceiver 1110 and antenna array(s) 1130, shown and described above in connection with FIG. 11 may provide a means to receive the sidelink PT-RS configuration from the second wireless communication device.

In 5G NR networks, a base station may be an aggregated base station, in which the radio protocol stack is logically integrated within a single RAN entity, or a disaggregated base station (e.g., a disaggregated RAN entity), in which the radio protocol stack is logically split between a central unit (CU) and one or more distributed units (DUs). The CU hosts the radio resource control (RRC), service data adaptation protocol (SDAP), and packet data convergence protocol (PDCP) layers that control the operation of one or more DUs. The DU hosts the radio link control (RLC), medium access control (MAC) and physical (PHY) layers. The CU may be implemented within an edge RAN node, which may be referred to as a donor node, while the one or more DUs may be co-located with the CU and/or distributed throughout multiple RAN nodes that may be physically separated from one another.

In some examples, the RAN entity 1400 shown and described above in connection with FIG. 14 may be a disaggregated base station. For example, the RAN entity 1400 shown in FIG. 14 may include the CU and optionally one or more DUs of the disaggregated base station. Other DUs associated with the RAN entity 1400 may be distributed throughout the network. In some examples, the DUs may correspond to TRPs associated with the RAN entity. In some examples, the CU and/or DU of the disaggregated base station (e.g., within the RAN entity 1400) may receive a sidelink CSI report associated with a sidelink between a first and second wireless communication device. The sidelink CSI report may be generated by the second wireless communication device and received from either the second wireless communication or the first wireless communication device. The CU and/or DU may then transmit sidelink phase-tracking reference signal (PT-RS) configuration information to the first wireless communication device indicating a sidelink PT-RS configuration for the first wireless communication device based on the CSI report.

Figure 19:
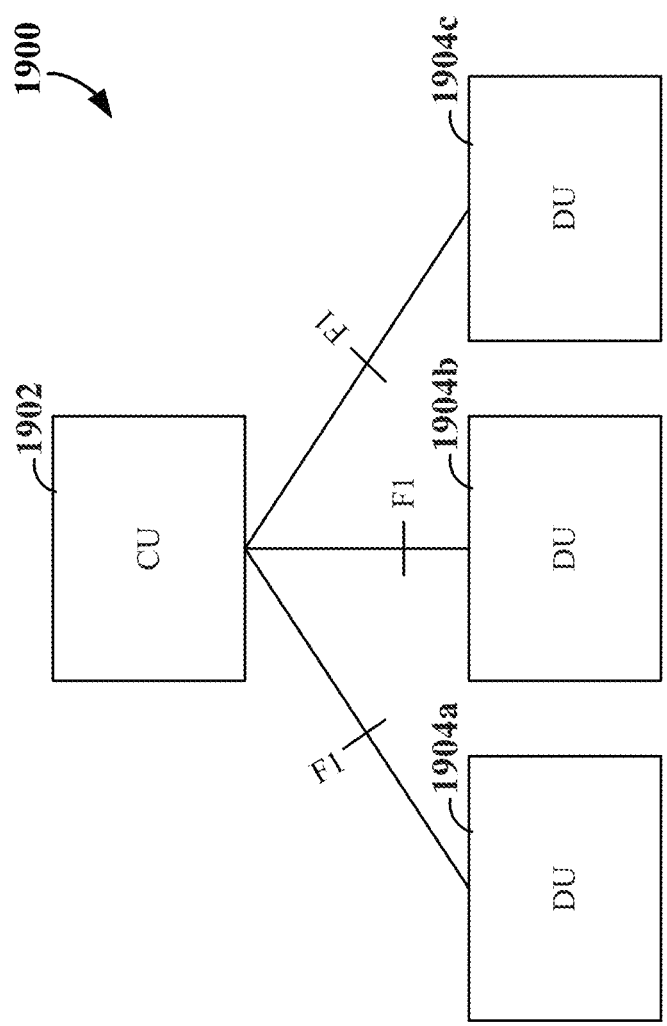
FIG. 19 is a diagram providing a high-level illustration of one example of a configuration of a disaggregated base station according to some aspects.

FIG. 19 is a diagram providing a high-level illustration of one example of a configuration of a disaggregated base station 1900 according to some aspects. The disaggregated base station 1900 includes a CU 1902 and one or more DUs (three of which, 1904a, 1904b, 1904c, are shown for convenience). Each DU 1904a, 1904b, and 1904c supports the PHY, MAC, and RLC layers of the radio protocol stack. The CU 1902 supports the higher layers, such as the PDCP and RRC layers. One of the DUs (e.g., DU 1904a) may be co-located with the CU 1902, while the other DUs 1904b and 1904c may be distributed throughout a network. The CU 1902 and DUs 1904a, 1904b, and 1904c are logically connected via the F1 interface, which utilizes the F1 Application Protocol (F1-AP) for communication of information between the CU 1902 and each of the DUs 1904a, 1904b, and 1904c and for establishing generic tunneling protocol (GTP) tunnels between the DU and CU for each radio bearer.

Disaggregated base stations 1900 may be utilized, for example, in integrated access backhaul (IAB) networks. In such an IAB network, the wireless spectrum may be used for both access links and backhaul links. In some examples, the wireless spectrum may utilize millimeter-wave (mmWave) or sub-6 GHz carrier frequencies.

Figure 20:
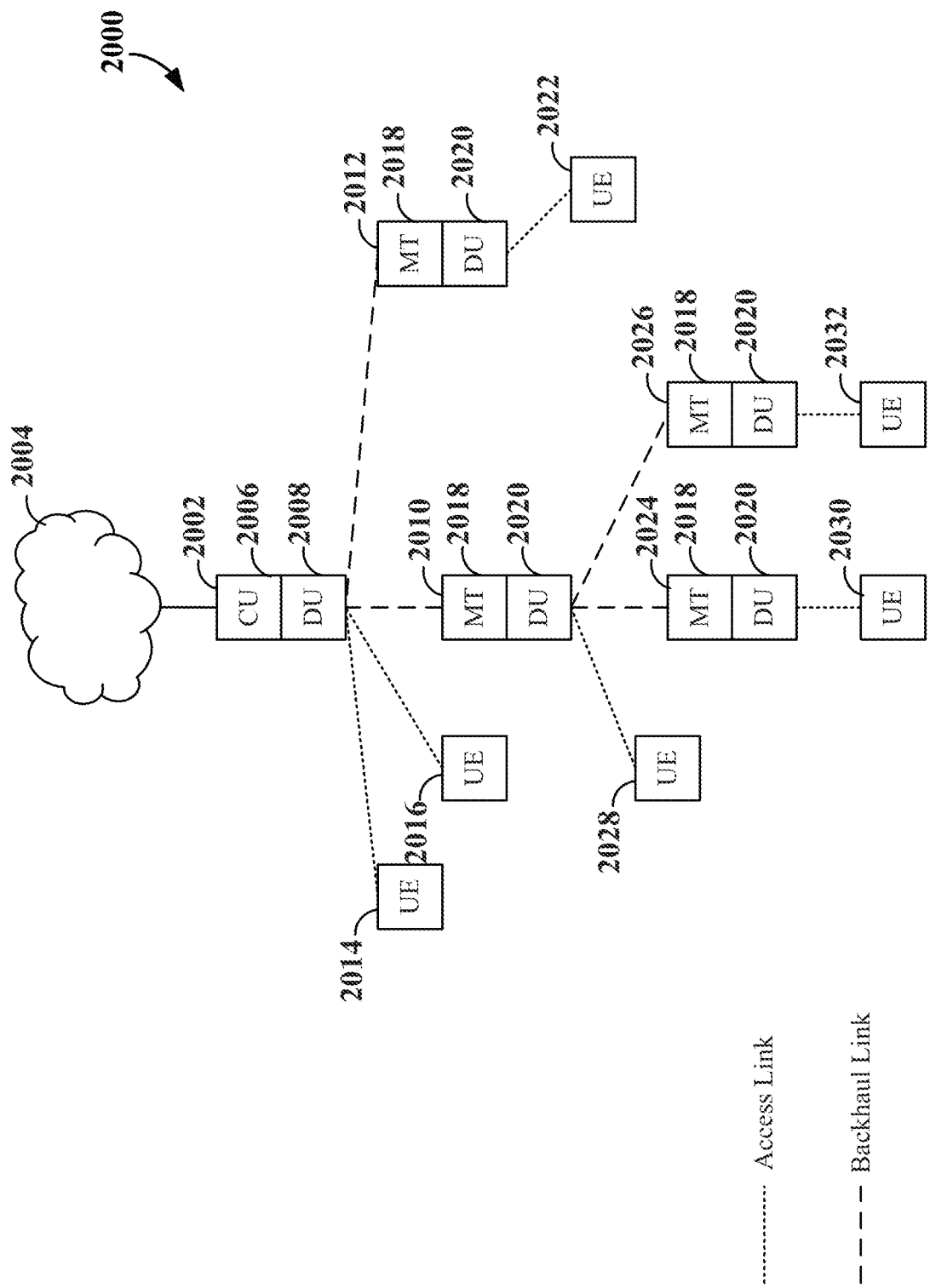
FIG. 20 is a diagram illustrating an example of an integrated access backhaul (IAB) network according to some aspects.

FIG. 20 is a diagram illustrating an example of an integrated access backhaul (IAB) network according to some aspects. In the example shown in FIG. 20, an IAB node 2002 is shown coupled to a core network 2004 via a wireline connection. This IAB node 2002 may be referred to herein as an IAB donor node, which may be, for example, an enhanced gNB including functionality for controlling the IAB network 2000. In some examples, the IAB donor node 2002 may include a central unit (CU) 2006 and a distributed unit (DU) 2008. The CU 2006 is configured to operate as a centralized network node (or central entity) within the IAB network 2000. For example, the CU 2006 may include radio resource control (RRC) layer functionality and packet data convergence protocol (PDCP) layer functionality to control/configure the other nodes (e.g., IAB nodes and UEs) within the IAB network 2000. Thus, the CU 2006 can be configured to implement centralized mechanisms for handover decisions, topology changes, routing, bearer mapping, UE security, and other suitable services.

The DU 2008 is configured to operate as a scheduling entity to schedule scheduled entities (e.g., other IAB nodes and UEs) of the IAB donor node 2002. For example, the DU 2008 of the IAB donor node 2002 may operate as a scheduling entity to schedule IAB nodes 2010 and 2012 and UEs 2014 and 2016. Thus, the DU 2008 of the IAB donor node 2002 may schedule communication with IAB nodes 2010 and 2012 via respective backhaul links and schedule communication with UEs 2014 and 2016 via respective access links. In some examples, the DU 2008 may include the radio link control (RLC), medium access control (MAC), and physical (PHY) layer functionality to enable operation as a scheduling entity.

Each of the IAB nodes 2010 and 2012 may be configured as a Layer 2 (L2) relay node including a respective DU 2020 and a mobile termination (MT) unit 2018 to enable each L2 relay IAB node 2010 and 2012 to operate as a scheduling entity and a scheduled entity. For example, the MT unit 2018 within each of the L2 relay IAB nodes 2010 and 2012 is configured to operate as a scheduled entity that may be scheduled by the IAB donor node 2002. Each MT unit 2018 within the L2 relay IAB nodes 2010 and 2012 further facilitates communication with the IAB donor node 2002 via respective backhaul links. In addition, the DU 2020 within each of the L2 relay IAB nodes 2010 and 2012 operates similar to the DU 2008 within the IAB donor node 2002 to function as a scheduling entity to schedule one or more respective scheduled entities (e.g., other IAB nodes and/or UEs) of the L2 relay IAB nodes 2010 and 2012.

For example, the DU 2020 of L2 relay IAB node 2012 functions as a scheduling entity to schedule communication with a UE 2022 via an access link, while the DU 2020 of L2 relay IAB node 2010 functions as a scheduling entity to schedule communication with the MT units 2018 of L2 relay IAB nodes 2024 and 2026 via respective backhaul links and a UE 2028 via an access link Each of the L2 relay IAB nodes 2024 and 2026 further includes a respective DU 2020 that functions as a scheduling entity to communicate with respective UEs 2030 and 2032.

In some examples, each of the IAB nodes 2002, 2010, 2012, 2024, and 2026 may be interconnected via one or more wireless backhaul links Each of the wireless backhaul links may utilize the same wireless spectrum (e.g., the radio frequency (RF) spectrum) as the access links to backhaul access traffic to/from the core network 2004. This may be referred to as wireless self-backhauling. Such wireless self-backhauling can enable fast and easy deployment of highly dense small cell networks. That is, rather than requiring each new gNB deployment to be outfitted with its own hard-wired backhaul connection, the wireless spectrum utilized for communication between the gNB and UE may be leveraged for backhaul communication between any number of IAB nodes to form the IAB network 2000. In addition, some or all of the IAB nodes 2002, 2010, 2012, 2024, and 2026 may also be connected via wired backhaul links (e.g., fiber, coaxial cable, Ethernet, copper wires, etc.) and/or microwave backhaul links Thus, the IAB network 2000 may support both wired/microwave and wireless backhaul traffic.

In the network topology illustrated in FIG. 20, the IAB donor node 2002, in combination with each of the L2 relay IAB nodes 2010, 2012, 2024 and 2026, can collectively form a disaggregated base station. The disaggregated base station includes the CU 2006 and each of the DUs 2008 and 2020 controlled by the CU 2006. The CU/DU functional split in disaggregated base stations can facilitate the realization of time-critical services, such as scheduling, retransmission, segmentation, and other similar services in the DU 2008/2020, while centralizing the less time-critical services in the CU 2006. In addition, the CU/DU separation enables termination of external interfaces in the CU 2006 instead of each DU, and further supports centralized termination of the PCDP to allow for dual connectivity and handover between the different DUs of the disaggregated base station. It should be understood that disaggregated base stations may be implemented within networks other than IAB networks, and the present disclosure is not limited to any particular type of network configuration.

The following provides an overview of examples of the present disclosure.

Example 1: A method of sidelink wireless communication at a first wireless communication device, the method comprising: transmitting a sidelink reference signal to a second wireless communication device; receiving a sidelink channel state information report from the second wireless communication device in response to the sidelink reference signal; identifying a sidelink phase-tracking reference signal (PT-RS) configuration comprising at least an indication of a number of PT-RS ports based on the sidelink channel state information report; and transmitting the sidelink PT-RS configuration to the second wireless communication device.

Example 2: The method of example 1, wherein the sidelink reference signal comprises a sidelink channel state information reference signal (CSI-RS).

Example 3: The method of example 1 or 2, wherein the transmitting the sidelink reference signal comprises: transmitting a plurality of sidelink CSI-RSs, each associated with a different one of a plurality of sidelink CSI-RS resources.

Example 4: The method of any of examples 1 through 3, wherein the sidelink channel state information report comprises at least a rank indicator (RI) and a precoding matrix indicator (PMI).

Example 5: The method of any of examples 1 through 4, wherein the identifying the sidelink PT-RS configuration comprises: selecting the number of PT-RS ports based on at least one of the RI or the PMI.

Example 6: The method of any of examples 1 through 5, wherein the sidelink PT-RS configuration further comprises a port association indicating a respective association between each PT-RS port and a corresponding one of a plurality of demodulation reference signal ports, and wherein the identifying the sidelink PT-RS configuration further comprises: determining the port association based on the number of PT-RS ports.

Example 7: The method of any of examples 1 through 4, wherein the identifying the sidelink PT-RS configuration further comprises: receiving sidelink PT-RS configuration information from a radio access network (RAN) entity in wireless communication with the first wireless communication device.

Example 8: The method of example 7, wherein the sidelink PT-RS configuration information comprises the sidelink PT-RS configuration, and wherein the sidelink PT-RS configuration comprises at least the number of PT-RS ports and a port association indicating a respective association between each PT-RS port and a corresponding one of a plurality of demodulation reference signal ports.

Example 9: The method of example 7, wherein the sidelink channel state information report comprises at least a rank indicator (RI) and a precoding matrix indicator (PMI), and wherein the PT-RS configuration information comprises at least one of the RI and the PMI.

Example 10: The method of example 9, wherein the identifying the sidelink PT-RS configuration comprises: selecting the number of PT-RS ports based on at least one of the RI or the PMI; and determining a port association indicating a respective association between each PT-RS port and a corresponding one of a plurality of demodulation reference signal ports based on the number of PT-RS ports.

Example 11: The method of example 7, wherein the receiving the sidelink PT-RS configuration information from the RAN entity comprises: receiving the sidelink PT-RS configuration information within a radio resource control (RRC) message or downlink control information.

Example 12: The method of example 11, wherein the RRC message comprises a sidelink identifier identifying a sidelink between the first wireless communication device and the second wireless communication device or a device identifier identifying the second wireless communication device.

Example 13: The method of example 7, wherein the identifying the sidelink PT-RS configuration further comprises: transmitting the sidelink channel state information report received from the second wireless communication device to the RAN entity.

Example 14: The method of any of examples 1 through 13, herein the transmitting the sidelink PT-RS configuration to the second wireless communication device comprises: transmitting the sidelink PT-RS configuration to the second wireless communication device within second stage sidelink control information (SCI) in a data region of a slot.

Example 15: The method of example 14, wherein the sidelink PT-RS configuration comprises PT-RS port information including the number of PT-RS ports and PT-RS resource element information.

Example 16: The method of any of examples 1 through 15, further comprising: transmitting a sidelink PT-RS to the second wireless communication device using the sidelink PT-RS configuration.

Example 17: A method of sidelink wireless communication at a first wireless communication device, the method comprising: receiving a sidelink reference signal from a second wireless communication device; transmitting a sidelink channel state information report to the second wireless communication device generated based on the sidelink reference signal; and receiving a sidelink phase-tracking reference signal (PT-RS) configuration from the second wireless communication device, the sidelink PT-RS configuration comprising at least an indication of a number of PT-RS ports configured based on the sidelink channel state information report.

Example 18: The method of example 17, wherein the sidelink reference signal comprises a sidelink channel state information reference signal (CSI-RS).

Example 19: The method of example 17 or 18, wherein the receiving the sidelink reference signal comprises: receiving a plurality of sidelink CSI-RSs, each associated with a different one of a plurality of sidelink CSI-RS resources.

Example 20: The method of any of examples 17 through 19, wherein the sidelink channel state information report comprises at least a rank indicator (RI) and a precoding matrix indicator (PMI).

Example 21: The method of any of examples 17 through 20, wherein the sidelink PT-RS configuration further comprises a port association indicating a respective association between each PT-RS port and a corresponding one of a plurality of demodulation reference signal ports.

Example 22: The method of any of examples 17 through 21, further comprising: transmitting the sidelink channel state information report to a radio access network (RAN) entity in wireless communication with the first wireless communication device and the second wireless communication device.

Example 23: The method of any of examples 17 through 22, wherein the receiving the sidelink PT-RS configuration from the second wireless communication device comprises: receiving the sidelink PT-RS configuration from the second wireless communication device within second stage sidelink control information (SCI) in a data region of a slot.

Example 24: The method of example 23, wherein the sidelink PT-RS configuration comprises PT-RS port information including the number of PT-RS ports and PT-RS resource element information.

Example 25: The method of any of examples 17 through 24, further comprising: receiving a sidelink PT-RS from the second wireless communication device based on the sidelink PT-RS configuration.

Example 26: A user equipment (UE) configured for wireless communication comprising a processor, and a memory coupled to the processor, the processor and memory configured to perform a method of any one of examples 1 through 25.

Example 27: A method of wireless communication at a radio access network (RAN) entity, the method comprising: receiving a sidelink channel state information report, wherein the sidelink channel state information report is associated with a sidelink between a first wireless communication device and a second wireless communication device; generating sidelink phase-tracking reference signal (PT-RS) configuration information indicating a sidelink PT-RS configuration for the first wireless communication device based on the sidelink channel state information report, the sidelink PT-RS configuration comprising at least an indication of a number of PT-RS ports; and transmitting the sidelink PT-RS configuration information to the first wireless communication device.

Example 28: The method of example 27, wherein the receiving the sidelink channel state information report further comprises: receiving the sidelink channel state information report from the first wireless communication device within a medium access control-control element (MAC-CE) or uplink control information.

Example 29: The method of example 27 or 28, wherein the receiving the sidelink channel state information report further comprises: receiving the sidelink channel state information report from the second wireless communication device within a medium access control-control element (MAC-CE) or uplink control information.

Example 30: The method of any of examples 27 through 29, wherein the sidelink PT-RS configuration information comprises the sidelink PT-RS configuration, and wherein the generating the sidelink PT-RS configuration information further comprises: selecting the number of PT-RS ports based on the sidelink channel state information report.

Example 31: The method of any of examples 27 through 30, wherein the sidelink channel state information report comprises at least a rank indicator (RI) and a precoding matrix indicator (PMI), and wherein the selecting the number of PT-RS ports further comprises: selecting the number of PT-RS ports based on at least one of the RI or the PMI.

Example 32: The method of any of examples 27 through 31, wherein the sidelink PT-RS configuration further comprises a port association indicating a respective association between each PT-RS port and a corresponding one of a plurality of demodulation reference signal ports and wherein the generating the sidelink PT-RS configuration information further comprises: determining the port association based on the number of PT-RS ports.

Example 33: The method of any of examples 27 through 32, wherein the sidelink channel state information report comprises at least a rank indicator (RI) and a precoding matrix indicator (PMI), and wherein the sidelink PT-RS configuration information comprises at least one of the RI or the PMI.

Example 34: The method of any of examples 27 through 33, wherein the transmitting the sidelink PT-RS configuration information to the first wireless communication device comprises: transmitting the sidelink PT-RS configuration information within a radio resource control (RRC) message or downlink control information.

Example 35: The method of example 34, wherein the RRC message comprises a sidelink indicator identifying the sidelink between the first wireless communication device and the second wireless communication device or a device identifier identifying the second wireless communication device.

Example 36: A radio access network (RAN) entity configured for wireless communication comprising a processor, and a memory coupled to the processor, the processor and memory configured to perform a method of any one of examples 27 through 35.

Example 37: An apparatus configured for wireless communication comprising at least one means for performing a method of any one of examples 1 through 25 and 27 through 35.

Example 38: A non-transitory computer-readable medium storing computer-executable code, comprising code for causing an apparatus to perform a method of any one of examples 1 through 25 and 27 through 35.

Example 39: A method of sidelink wireless communication at a first wireless communication device, the method comprising: transmitting a sidelink reference signal to a second wireless communication device; receiving a sidelink channel state information report from the second wireless communication device in response to the sidelink reference signal; and transmitting a sidelink phase-tracking reference signal (PT-RS) configuration to the second wireless communication device, the sidelink PT-RS configuration being based on the sidelink channel state information report.

Example 40: The method of example 39, wherein the sidelink PT-RS configuration comprises at least an indication of a number of PT-RS ports, the number of PT-RS ports being based on the sidelink channel state information report.

Example 41: The method of example 40, wherein the sidelink channel state information report comprises at least a rank indicator (RI) and a precoding matrix indicator (PMI), and further comprising: selecting the number of PT-RS ports based on at least one of the RI or the PMI.

Example 42: The method of example 41, wherein the sidelink PT-RS configuration further comprises a port association indicating a respective association between each PT-RS port and a corresponding one of a plurality of demodulation reference signal ports, and further comprising: determining the port association based on the number of PT-RS ports.

Example 43: The method of example 40, further comprising: receiving sidelink PT-RS configuration information from a radio access network (RAN) entity in wireless communication with the first wireless communication device.

Example 44: The method of example 43, wherein the sidelink PT-RS configuration information comprises the sidelink PT-RS configuration, the sidelink PT-RS configuration comprising at least the number of PT-RS ports and a port association indicating a respective association between each PT-RS port and a corresponding one of a plurality of demodulation reference signal ports.

Example 45: The method of example 43, wherein the sidelink channel state information report comprises at least a rank indicator (RI) and a precoding matrix indicator (PMI), the PT-RS configuration information comprising at least one of the RI and the PMI, and further comprising: selecting the number of PT-RS ports based on at least one of the RI or the PMI; and determining a port association indicating a respective association between each PT-RS port and a corresponding one of a plurality of demodulation reference signal ports based on the number of PT-RS ports.

Example 46: The method of any of examples 43 through 45, wherein the receiving the sidelink PT-RS configuration information from the RAN entity comprises: receiving the sidelink PT-RS configuration information within a radio resource control (RRC) message or downlink control information, wherein the RRC message comprises a sidelink identifier identifying a sidelink between the first wireless communication device and the second wireless communication device or a device identifier identifying the second wireless communication device.

Example 47: The method of any of examples 43 through 46, further comprising: transmitting the sidelink channel state information report received from the second wireless communication device to the RAN entity.

Example 48: The method of any of examples 40 through 47, wherein the transmitting the sidelink PT-RS configuration to the second wireless communication device comprises: transmitting the sidelink PT-RS configuration to the second wireless communication device within second stage sidelink control information (SCI) in a data region of a slot.

Example 49: The method of example 48, wherein the sidelink PT-RS configuration comprises PT-RS port information including the number of PT-RS ports and PT-RS resource element information.

Example 50: The method of any of examples 39 through 49, further comprising: transmitting a sidelink PT-RS to the second wireless communication device using the sidelink PT-RS configuration.

Example 51: The method of any of examples 39 through 50, wherein the transmitting the sidelink reference signal comprises: transmitting a plurality of sidelink CSI-RSs, each associated with a different one of a plurality of sidelink CSI-RS resources.

Example 52: A first wireless communication device configured for wireless communication comprising a processor and a memory coupled to the processor, the processor and memory configured to perform a method of any one of examples 39 through 51.

Example 53: An apparatus configured for wireless communication comprising at least one means for performing a method of any one of examples 39 through 51.

Example 54: A non-transitory computer-readable medium having stored therein instructions executable by one or more processors of a first wireless communication device to perform a method of any one of examples 39 through 51.

Example 55: A method of wireless communication at a radio access network (RAN) entity, the method comprising: receiving a sidelink channel state information report, wherein the sidelink channel state information report is associated with a sidelink between a first wireless communication device and a second wireless communication device; and transmitting sidelink phase-tracking reference signal (PT-RS) configuration information to the first wireless communication device, the sidelink PT-RS configuration information indicating a sidelink PT-RS configuration for the first wireless communication device, the PT-RS configuration information being based on the sidelink channel state information report.

Example 56: The method of example 55, wherein the sidelink PT-RS configuration information comprises the sidelink PT-RS configuration and the sidelink PT-RS configuration comprises at least an indication of a number of PT-RS ports, and further comprising: selecting the number of PT-RS ports based on the sidelink channel state information report.

Example 57: The method of example 56, wherein the sidelink channel state information report comprises at least a rank indicator (RI) and a precoding matrix indicator (PMI), and wherein the selecting the number of PT-RS ports further comprises: selecting the number of PT-RS ports based on at least one of the RI or the PMI.

Example 58: The method of example 56 or 57, wherein the sidelink PT-RS configuration further comprises a port association indicating a respective association between each PT-RS port and a corresponding one of a plurality of demodulation reference signal ports, and further comprising: determining the port association based on the number of PT-RS ports.

Example 59: The method of any of examples 55 through 58, wherein the receiving the sidelink channel state information report comprises: receiving the sidelink channel state information report from the first wireless communication device within a medium access control-control element (MAC-CE) or uplink control information.

Example 60: The method of any of examples 55 through 58, wherein the receiving the sidelink channel state information report comprises: receiving the sidelink channel state information report from the second wireless communication device within a medium access control-control element (MAC-CE) or uplink control information.

Example 61: The method of any of examples 55 through 60, wherein the sidelink channel state information report comprises at least a rank indicator (RI) and a precoding matrix indicator (PMI), and wherein the sidelink PT-RS configuration information comprises at least one of the RI or the PMI.

Example 62: The method of any of examples 55 through 61, wherein the transmitting the sidelink PT-RS configuration information to the first wireless communication device comprises: transmitting the sidelink PT-RS configuration information within a radio resource control (RRC) message or downlink control information, wherein the RRC message comprises a sidelink indicator identifying the sidelink between the first wireless communication device and the second wireless communication device or a device identifier identifying the second wireless communication device.

Example 63: A radio access network (RAN) entity configured for wireless communication comprising a processor and a memory coupled to the processor, the processor and memory configured to perform a method of any one of examples 55 through 62.

Example 64: An apparatus configured for wireless communication comprising at least one means for performing a method of any one of examples 55 through 62.

Example 65: A non-transitory computer-readable medium having stored therein instructions executable by one or more processors of a radio access network (RAN) entity to perform a method of any one of examples 55 through 62.

Example 66: A method of sidelink wireless communication at a second wireless communication device, the method comprising: receiving a sidelink reference signal from a first wireless communication device; transmitting a sidelink channel state information report to the first wireless communication device generated based on the sidelink reference signal; and receiving a sidelink phase-tracking reference signal (PT-RS) configuration from the first wireless communication device, the sidelink PT-RS configuration being based on the sidelink channel state information report.

Example 67: The method of example 66, wherein the sidelink PT-RS configuration comprises an indication of a number of PT-RS ports and a port association indicating a respective association between each PT-RS port and a corresponding one of a plurality of demodulation reference signal ports.

Example 68: The method of example 66 or 67, wherein the sidelink channel state information report comprises at least a rank indicator (RI) and a precoding matrix indicator (PMI).

Example 69: The method of any of examples 66 through 68, further comprising: transmitting the sidelink channel state information report to a radio access network (RAN) entity in wireless communication with the first wireless communication device and the second wireless communication device.

Example 70: The method of any of examples 66 through 69, wherein the receiving the sidelink PT-RS configuration from the first wireless communication device comprises: receiving the sidelink PT-RS configuration from the first wireless communication device within second stage sidelink control information (SCI) in a data region of a slot.

Example 71: The method of example 70, wherein the sidelink PT-RS configuration comprises PT-RS port information including a number of PT-RS ports and PT-RS resource element information.

Example 72: The method any of examples 66 through 71, further comprising: receiving a sidelink PT-RS from the first wireless communication device based on the sidelink PT-RS configuration.

Example 73: The method of any of examples 66 through 72, wherein the receiving the sidelink reference signal comprises: receiving a plurality of sidelink CSI-RSs, each associated with a different one of a plurality of sidelink CSI-RS resources.

Example 74: A second wireless communication device configured for wireless communication comprising a processor and a memory coupled to the processor, the processor and memory configured to perform a method of any one of examples 66 through 73.

Example 75: An apparatus configured for wireless communication comprising at least one means for performing a method of any one of examples 66 through 73.

Example 76: A non-transitory computer-readable medium having stored therein instructions executable by one or more processors of a second wireless communication device to perform a method of any one of examples 66 through 73.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-20 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-5, 8, 9, 11, 14, 19, and/or 20 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first wireless communication device configured for wireless communication, comprising:
    one or more processors; and
    one or more memories coupled to the one or more processors, wherein the one or more processors are configured to cause the first wireless communication device to:
        transmit a sidelink reference signal to a second wireless communication device;
        receive a sidelink channel state information report from the second wireless communication device in response to the sidelink reference signal, wherein the sidelink channel state information report comprises at least a precoding matrix indicator (PMI); and
        transmit a sidelink phase-tracking reference signal (PT-RS) configuration to the second wireless communication device, wherein the sidelink PT-RS configuration is based on the sidelink channel state information report, wherein the sidelink PT-RS configuration comprises an indication of a number of PT-RS ports selected based on at least the PMI.

2. The first wireless communication device of claim 1, wherein the sidelink channel state information report comprises at least a rank indicator (RI) and the PMI, wherein the one or more processors are further configured to:
    select the number of PT-RS ports based on at least the RI and the PMI.

3. The first wireless communication device of claim 2, wherein the sidelink PT-RS configuration further comprises a port association indicating a respective association between each PT-RS port and a corresponding one of a plurality of demodulation reference signal ports, wherein the one or more processors are further configured to:
    determine the port association based on the number of PT-RS ports.

4. The first wireless communication device of claim 1, wherein the one or more processors are further configured to:
    receive sidelink PT-RS configuration information from a radio access network (RAN) entity in wireless communication with the first wireless communication device.

5. The first wireless communication device of claim 4, wherein the sidelink PT-RS configuration information comprises the sidelink PT-RS configuration, wherein the sidelink PT-RS configuration comprises at least the number of PT-RS ports and a port association, wherein the port association indicates a respective association between each PT-RS port and a corresponding one of a plurality of demodulation reference signal ports.

6. The first wireless communication device of claim 4, wherein the sidelink channel state information report comprises at least a rank indicator (RI) and the PMI, the sidelink PT-RS configuration information comprising at least one of the RI and the PMI, wherein the one or more processors are further configured to:
   select the number of PT-RS ports based on at least the RI and the PMI; and
   determine a port association, wherein the port association indicates a respective association between each PT-RS port and a corresponding one of a plurality of demodulation reference signal ports based on the number of PT-RS ports.

7. The first wireless communication device of claim 4, wherein the one or more processors are further configured to:
   receive the sidelink PT-RS configuration information within a radio resource control (RRC) message or downlink control information, wherein the RRC message comprises a sidelink identifier to identify a sidelink between the first wireless communication device and the second wireless communication device or a device identifier to identify the second wireless communication device.

8. The first wireless communication device of claim 4, wherein the one or more processors are further configured to:
   transmit the sidelink channel state information report received from the second wireless communication device to the RAN entity.

9. The first wireless communication device of claim 1, wherein the one or more processors are further configured to:
   transmit the sidelink PT-RS configuration to the second wireless communication device within second stage sidelink control information (SCI) in a data region of a slot.

10. The first wireless communication device of claim 9, wherein the sidelink PT-RS configuration comprises PT-RS port information, wherein the PT-RS port information includes the number of PT-RS ports and PT-RS resource element information.

11. The first wireless communication device of claim 1, wherein the one or more processors are further configured to:
   transmit a sidelink PT-RS to the second wireless communication device based on the sidelink PT-RS configuration.

12. The first wireless communication device of claim 1, wherein the one or more processors are further configured to:
   transmit a plurality of sidelink CSI-RSs, each associated with a different one of a plurality of sidelink CSI-RS resources.

13. A radio access network (RAN) entity configured for wireless communication, comprising:
   one or more processors; and
   one or more memories coupled to the one or more processors, wherein the one or more processors are configured to cause the RAN entity to:
      receive a sidelink channel state information report, wherein the sidelink channel state information report is associated with a sidelink between a first wireless communication device and a second wireless communication device, wherein the sidelink channel state information report comprises at least a precoding matrix indicator (PMI); and
      transmit sidelink phase-tracking reference signal (PT-RS) configuration information to the first wireless communication device, wherein the sidelink PT-RS configuration information indicates a sidelink PT-RS configuration for the first wireless communication device, wherein the sidelink PT-RS configuration is based on the sidelink channel state information report, wherein the sidelink PT-RS configuration comprises an indication of a number of PT-RS ports selected based on at least the PMI.

14. The RAN entity of claim 13, wherein the sidelink PT-RS configuration information comprises the sidelink PT-RS configuration, wherein the one or more processors are further configured to:
   select the number of PT-RS ports based on the sidelink channel state information report.

15. The RAN entity of claim 14, wherein the sidelink channel state information report comprises at least a rank indicator (RI) and the PMI, wherein the one or more processors are further configured to:
   select the number of PT-RS ports based on at least the RI and the PMI.

16. The RAN entity of claim 14, wherein the sidelink PT-RS configuration further comprises a port association, wherein the port association indicates a respective association between each PT-RS port and a corresponding one of a plurality of demodulation reference signal ports, wherein the one or more processors are further configured to:
   determine the port association based on the number of PT-RS ports.

17. The RAN entity of claim 13, wherein the one or more processors are further configured to:
   receive the sidelink channel state information report from the first wireless communication device within a medium access control-control element (MAC-CE) or uplink control information.

18. The RAN entity of claim 13, wherein the one or more processors are further configured to:
   receive the sidelink channel state information report from the second wireless communication device within a medium access control-control element (MAC-CE) or uplink control information.

19. The RAN entity of claim 13, wherein the sidelink channel state information report comprises at least a rank indicator (RI) and the PMI, and wherein the sidelink PT-RS configuration information comprises at least one of the RI or the PMI.

20. The RAN entity of claim 13, wherein the one or more processors are further configured to:
   transmit the sidelink PT-RS configuration information within a radio resource control (RRC) message or downlink control information, wherein the RRC message comprises a sidelink indicator to identify the sidelink between the first wireless communication device and the second wireless communication device or a device identifier to identify the second wireless communication device.

21. A second wireless communication device configured for wireless communication, comprising:
   one or more processors; and
   one or more memories coupled to the one or more processors, wherein the one or more processors are configured to cause the second wireless communication device to:

receive a sidelink reference signal from a first wireless communication device;

transmit a sidelink channel state information report to the first wireless communication device generated based on the sidelink reference signal, wherein the sidelink channel state information report comprises at least a precoding matrix indicator (PMI); and receive a sidelink phase-tracking reference signal (PT-RS) configuration from the first wireless communication device, wherein the sidelink PT-RS configuration is based on the sidelink channel state information report, wherein the sidelink PT-RS configuration comprises an indication of a number of PT-RS ports selected based on at least the PMI.

22. The second wireless communication device of claim 21, wherein the sidelink PT-RS configuration comprises a port association, wherein the port association indicates a respective association between each PT-RS port and a corresponding one of a plurality of demodulation reference signal ports.

23. The second wireless communication device of claim 21, wherein the sidelink channel state information report comprises at least a rank indicator (RI) and the PMI.

24. The second wireless communication device of claim 21, wherein the one or more processors are further configured to:
transmit the sidelink channel state information report to a radio access network (RAN) entity in wireless communication with the first wireless communication device and the second wireless communication device.

25. The second wireless communication device of claim 21, wherein the one or more processors are further configured to:
receive the sidelink PT-RS configuration from the first wireless communication device within second stage sidelink control information (SCI) in a data region of a slot.

26. The second wireless communication device of claim 25, wherein the sidelink PT-RS configuration comprises PT-RS port information, wherein the PT-RS port information includes the number of PT-RS ports and PT-RS resource element information.

27. The second wireless communication device of claim 21, wherein the one or more processors are further configured to:
receive a sidelink PT-RS from the first wireless communication device based on the sidelink PT-RS configuration.

28. The second wireless communication device of claim 21, wherein the one or more processors are further configured to:
receive a plurality of sidelink CSI-RSs, each associated with a different one of a plurality of sidelink CSI-RS resources.

29. A method of sidelink wireless communication at a first wireless communication device, the method comprising:
transmitting a sidelink reference signal to a second wireless communication device;
receiving a sidelink channel state information report from the second wireless communication device in response to the sidelink reference signal, wherein the sidelink channel state information report comprises at least a precoding matrix indicator (PMI); and
transmitting a sidelink phase-tracking reference signal (PT-RS) configuration to the second wireless communication device, wherein the sidelink PT-RS configuration is based on the sidelink channel state information report, wherein the sidelink PT-RS configuration comprises an indication of a number of PT-RS ports selected based on at least the PMI.

30. The method of claim 29, wherein the sidelink PT-RS configuration further comprises a port association, wherein the port association indicates a respective association between each PT-RS port and a corresponding one of a plurality of demodulation reference signal ports, and further comprising:
determining the port association based on the number of PT-RS ports.

31. The method of claim 29, further comprising:
receiving sidelink PT-RS configuration information from a radio access network (RAN) entity in wireless communication with the first wireless communication device.

32. The method of claim 31, wherein the sidelink PT-RS configuration information comprises the sidelink PT-RS configuration, wherein the sidelink PT-RS configuration comprises at least the number of PT-RS ports and a port association, wherein the port association indicates a respective association between each PT-RS port and a corresponding one of a plurality of demodulation reference signal ports.

33. A method of wireless communication at a radio access network (RAN) entity, the method comprising:
receiving a sidelink channel state information report, wherein the sidelink channel state information report is associated with a sidelink between a first wireless communication device and a second wireless communication device, wherein the sidelink channel state information report comprises at least a precoding matrix indicator (PMI); and
transmitting sidelink phase-tracking reference signal (PT-RS) configuration information to the first wireless communication device, wherein the sidelink PT-RS configuration information indicates a sidelink PT-RS configuration for the first wireless communication device, wherein the sidelink PT-RS configuration information is based on the sidelink channel state information report, wherein the sidelink PT-RS configuration comprises an indication of a number of PT-RS ports selected based on at least the PMI.

34. The method of claim 33, wherein the sidelink PT-RS configuration information comprises the sidelink PT-RS configuration, and further comprising:
selecting the number of PT-RS ports based on the sidelink channel state information report.

35. The method of claim 33, wherein the sidelink PT-RS configuration further comprises a port association, wherein the port association indicates a respective association between each PT-RS port and a corresponding one of a plurality of demodulation reference signal ports, and further comprising:
determining the port association based on the number of PT-RS ports.

36. The method of claim 33, wherein the sidelink channel state information report comprises at least a rank indicator (RI) and the PMI, and wherein the sidelink PT-RS configuration information comprises at least one of the RI or the PMI.

37. An apparatus for wireless communication at a first wireless communication device, the apparatus comprising:
means for transmitting a sidelink reference signal to a second wireless communication device;
means for receiving a sidelink channel state information report from the second wireless communication device in response to the sidelink reference signal, wherein the sidelink channel state information report comprises at least a precoding matrix indicator (PMI); and means for transmitting a sidelink phase-tracking reference signal (PT-RS) configuration to the second wireless communication device, wherein the sidelink PT-RS configuration is based on the sidelink channel state information report, wherein the sidelink PT-RS configuration comprises an indication of a number of PT-RS ports selected based on at least the PMI.

38. The apparatus of claim 37, wherein the sidelink PT-RS configuration further comprises a port association, wherein the port association indicates a respective association between each PT-RS port and a corresponding one of a plurality of demodulation reference signal ports, and further comprising:

means for determining the port association based on the number of PT-RS ports.

39. The apparatus of claim 37, further comprising:

means for receiving sidelink PT-RS configuration information from a radio access network (RAN) entity in wireless communication with the first wireless communication device.

40. The apparatus of claim 39, wherein the sidelink PT-RS configuration information comprises the sidelink PT-RS configuration, wherein the sidelink PT-RS configuration comprises at least the number of PT-RS ports and a port association, wherein the port association indicates a respective association between each PT-RS port and a corresponding one of a plurality of demodulation reference signal ports.

41. An apparatus for wireless communication at a radio access network (RAN) entity, the apparatus comprising:

means for receiving a sidelink channel state information report, wherein the sidelink channel state information report is associated with a sidelink between a first wireless communication device and a second wireless communication device, wherein the sidelink channel state information report comprises at least a precoding matrix indicator (PMI); and means for transmitting sidelink phase-tracking reference signal (PT-RS) configuration information to the first wireless communication device, wherein the sidelink PT-RS configuration information indicates a sidelink PT-RS configuration for the first wireless communication device, wherein the sidelink PT-RS configuration information is based on the sidelink channel state information report, wherein the sidelink PT-RS configuration comprises an indication of a number of PT-RS ports selected based on at least the PMI.

42. The apparatus of claim 41, wherein the sidelink PT-RS configuration information comprises the sidelink PT-RS configuration, and further comprising:

means for selecting the number of PT-RS ports based on the sidelink channel state information report.

43. The apparatus of claim 41, wherein the sidelink PT-RS configuration further comprises a port association, wherein the port association indicates a respective association between each PT-RS port and a corresponding one of a plurality of demodulation reference signal ports, and further comprising:

means for determining the port association based on the number of PT-RS ports.

44. The apparatus of claim 41, wherein the sidelink channel state information report comprises at least a rank indicator (RI) and the PMI, and wherein the sidelink PT-RS configuration information comprises at least one of the RI or the PMI.

45. A non-transitory computer-readable medium having stored therein instructions executable by one or more processors of a first wireless communication device to:

transmit a sidelink reference signal to a second wireless communication device;

receive a sidelink channel state information report from the second wireless communication device in response to the sidelink reference signal, wherein the sidelink channel state information report comprises at least a precoding matrix indicator (PMI); and transmit a sidelink phase-tracking reference signal (PT-RS) configuration to the second wireless communication device, wherein the sidelink PT-RS configuration is based on the sidelink channel state information report, wherein the sidelink PT-RS configuration comprises an indication of a number of PT-RS ports selected based on at least the PMI.

46. The non-transitory computer-readable medium of claim 45, wherein the sidelink PT-RS configuration further comprises a port association, wherein the port association indicates a respective association between each PT-RS port and a corresponding one of a plurality of demodulation reference signal ports, and wherein the non-transitory computer-readable medium further comprises instructions executable by the one or more processors of the first wireless communication device to:

determine the port association based on the number of PT-RS ports.

47. The non-transitory computer-readable medium of claim 45, wherein the non-transitory computer-readable medium further comprises instructions executable by the one or more processors of the first wireless communication device to:

receive sidelink PT-RS configuration information from a radio access network (RAN) entity in wireless communication with the first wireless communication device.

48. The non-transitory computer-readable medium of claim 47, wherein the sidelink PT-RS configuration information comprises the sidelink PT-RS configuration, wherein the sidelink PT-RS configuration comprises at least the number of PT-RS ports and a port association, wherein the port association indicates a respective association between each PT-RS port and a corresponding one of a plurality of demodulation reference signal ports.

49. A non-transitory computer-readable medium having stored therein instructions executable by one or more processors of a radio access network (RAN) entity to:

receive a sidelink channel state information report, wherein the sidelink channel state information report is associated with a sidelink between a first wireless communication device and a second wireless communication device, wherein the sidelink channel state information report comprises at least a precoding matrix indicator (PMI); and transmit sidelink phase-tracking reference signal (PT-RS) configuration information to the first wireless communication device, wherein the sidelink PT-RS configuration information indicates a sidelink PT-RS configuration for the first wireless communication device, wherein the sidelink PT-RS configuration information is based on the sidelink channel state information report, wherein the sidelink PT-RS configuration comprises an indication of a number of PT-RS ports selected based on at least the PMI.

50. The non-transitory computer-readable medium of claim 49, wherein the sidelink PT-RS configuration information comprises the sidelink PT-RS configuration, and wherein the non-transitory computer-readable medium further comprises instructions executable by the one or more processors of the RAN entity to:
  select the number of PT-RS ports based on the sidelink channel state information report.

51. The non-transitory computer-readable medium of claim 49, wherein the sidelink PT-RS configuration further comprises a port association, wherein the port association indicates a respective association between each PT-RS port and a corresponding one of a plurality of demodulation reference signal ports, and wherein the non-transitory computer-readable medium further comprises instructions executable by the one or more processors of the RAN entity to:
  determine the port association based on the number of PT-RS ports.

52. The non-transitory computer-readable medium of claim 51, wherein the sidelink channel state information report comprises at least a rank indicator (RI) and the PMI, and wherein the sidelink PT-RS configuration information comprises at least one of the RI or the PMI.

53. A method of wireless communication at a second wireless communication device, the method comprising:
  receiving a sidelink reference signal from a first wireless communication device;
  transmitting a sidelink channel state information report to the first wireless communication device generated based on the sidelink reference signal, wherein the sidelink channel state information report comprises at least a precoding matrix indicator (PMI); and
  receiving a sidelink phase-tracking reference signal (PT-RS) configuration from the first wireless communication device, wherein the sidelink PT-RS configuration is based on the sidelink channel state information report, wherein the sidelink PT-RS configuration comprises an indication of a number of PT-RS ports selected based on at least the PMI.

54. The method of claim 53, wherein the sidelink PT-RS configuration comprises a port association, wherein the port association indicates a respective association between each PT-RS port and a corresponding one of a plurality of demodulation reference signal ports.

55. The method of claim 53, wherein the sidelink channel state information report comprises at least a rank indicator (RI) and the PMI.

56. A non-transitory computer-readable medium having stored therein instructions executable by one or more processors of a second wireless communication device to:
  receive a sidelink reference signal from a first wireless communication device;
  transmit a sidelink channel state information report to the first wireless communication device generated based on the sidelink reference signal, wherein the sidelink channel state information report comprises at least a precoding matrix indicator (PMI); and
  receive a sidelink phase-tracking reference signal (PT-RS) configuration from the first wireless communication device, wherein the sidelink PT-RS configuration is based on the sidelink channel state information report, wherein the sidelink PT-RS configuration comprises an indication of a number of PT-RS ports selected based on at least the PMI.

* * * * *